US006833856B2

(12) United States Patent
Maeda

(10) Patent No.: US 6,833,856 B2
(45) Date of Patent: Dec. 21, 2004

(54) LIGHT BEAM MAGNIFICATION ERROR AUTO CORRECTING APPARATUS AND METHOD

(75) Inventor: Katsuhiko Maeda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 230 days.

(21) Appl. No.: 09/749,541

(22) Filed: Dec. 28, 2000

(65) Prior Publication Data
US 2001/0028387 A1 Oct. 11, 2001

(30) Foreign Application Priority Data

Dec. 28, 1999 (JP) ............................................. 11-374378

(51) Int. Cl.[7] .............................. B41J 2/435; B41J 2/47
(52) U.S. Cl. ...................................... 347/248; 347/234
(58) Field of Search ................................. 347/234, 231, 347/233, 235, 237, 247, 248, 250, 249, 116, 243, 244, 258, 259; 358/401

(56) References Cited

U.S. PATENT DOCUMENTS 5,450,211 A * 9/1995 Kanai et al. ................. 358/401
5,610,651 A * 3/1997 Yamakawa et al. .......... 347/250
5,933,184 A * 8/1999 Ishigami et al. ............. 347/249

FOREIGN PATENT DOCUMENTS

| JP | 61-32029 | * | 2/1986 | ............ G02B/26/10 |
| JP | 4-352119 | | 12/1992 | |
| JP | 07-74897 | | 3/1995 | |
| JP | 8-62522 | * | 3/1996 | ............ G02B/26/10 |
| JP | 09-058053 | | 3/1997 | |
| JP | 10-136171 | * | 5/1998 | ............ B41J/2/485 |

OTHER PUBLICATIONS

U.S. patent application Ser. No. 09/749,541, Maeda, filed Dec. 28, 2000.
U.S. patent application Ser. No. 10/618,733, Maeda, filed Jul. 15, 2003.

* cited by examiner

Primary Examiner—Hai Pham
(74) Attorney, Agent, or Firm—Oblon, Spivak, McClelland, Maier & Neustadt, P.C.

(57) ABSTRACT

An image forming apparatus including a light beam generating and modulating device that generates and modulates a light beam based on an image signal, and a light beam deflecting device that deflects the modulated light beam and scans an image carrier to form an image. A pair of light beam detecting devices detects the deflected light beam at two separate positions on a main scanning line. A time difference measuring device measures a time difference between time periods when the light beam is detected by one of the light beam detecting devices and by the other of the light beam detecting devices. An image magnification correcting device changes write clock frequency of the light beam and rotation number of the light deflecting device based on the time difference to correct magnification error in the main scanning direction of the image on the image carrier.

72 Claims, 43 Drawing Sheets

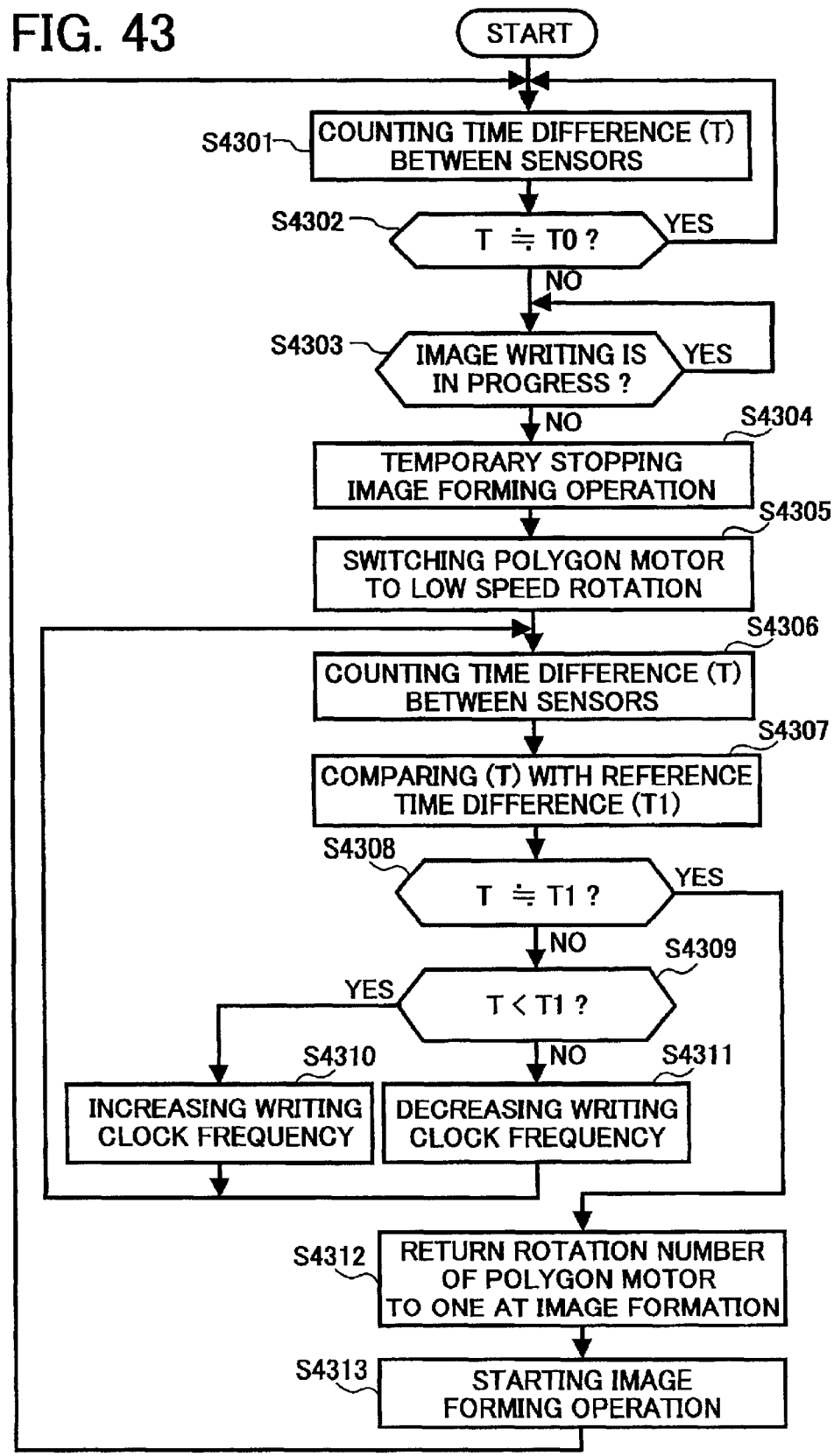

LIGHT BEAM MAGNIFICATION ERROR AUTO CORRECTING APPARATUS AND METHOD

CROSS REFERENCE TO RELATED APPLICATIONS

The present application claims priority, under 35 U.S.C. § 119, to Japanese Patent Application No. 11-374378, filed on Dec. 28, 1999, the entire contents of which are incorporated by reference herein.

BACKGROUND OF THE INVENTION

1. Field of the Invention

The present invention generally relates to an image forming apparatus, such as a copier, a facsimile, a printer, and a monochrome and color duplicating machine, which includes an optical beam scanning device that generates a plurality of optical beams, and in particular, relates to an optical beam scanning device capable of correcting magnification of an image in a main scanning direction of the optical beam.

2. Discussion of the Background

Image forming apparatuses employing a laser beam scanning device are described, for example, in Japanese Patent Application Laid Open Nos. 9-58053 and 8-136838. The Japanese Patent Application Laid Open No. 9-58053 has, as one of its objects, obtain an image forming apparatus capable of producing a high quality image by maintaining equal magnification performance, while suppressing color deviation. A plurality of beams is generated using a plurality of laser drive circuits and laser diodes.

Each of the plurality of beams is detected by two-laser beam detecting sensors arranged at two separate positions on one main scanning line of the laser beam. The detected signals are output to a write clock generating circuit.

The write clock generating circuit counts the number of clocks responsive to the detected signal.

The number of the clocks is compared with a reference count number, and a write clock frequency is corrected and output so that the number of clocks substantially coincides with the reference count number. The write clock frequency generally controls lighting control of a laser diode, and increases image density when the number of clocks are increased.

Thus, when using such a device, a change in a scanning speed, which occasionally is caused by a change in temperature, can be corrected.

Further, Japanese Patent Application Laid Open No. 8-136838 proposes, as one of its objects to automatically correct magnification when a laser beam optical unit changes its refractive index. Accordingly magnification is responsive to a change in circumstances or similar.

To this end, a pair of light detectors is provided to detect a start and an end of scanning of a photoconductive member (hereinafter referred to as a PC member) of the laser beam.

A polygon mirror is rotated by a polygon motor that is driven under control of a polygon motor driving circuit.

A rotation speed of the polygon mirror is controlled by a magnification correcting circuit via the polygon motor driving circuit.

The control of the rotational speed of the polygon mirror is executed based on each detection signals, detected by the pair of light detectors, so that a deflection speed of the light beam between two prescribed, separate positions is constant.

The magnification correcting circuit also controls a phase of the laser beam by a laser driving circuit via a phase synchronization circuit.

A body side driving circuit controls a rotational speed of the PC member.

Further, a light beam (hereinafter referred to as a laser beam) is generally modulated by image data and is deflected at the same angular speed by a deflection device (hereinafter referred to as a polygon mirror) that rotates in a prescribed direction. The light beam, of the same angular speed deflection, is corrected by an fθ lens into the same speed deflection, and executes scanning of a PC member.

However, it has been known in an image forming apparatus employing a plastic lens as a laser beam optical unit that the plastic lens changes its shape and refractive index responsive to both changes in circumstances and changes in ambient temperatures.

In addition, these changes introduce a change in a scanning position on an imaging surface of the PC member. Such a change also introduces an error of magnification in a main scanning direction, thereby resulting in a low quality image. Similarly, color deviation occurs and a color image is remarkably deteriorated due to magnification error in each color image formation.

To this end, Japanese Patent Application Laid Open Nos. 9-58053 and 8-136838 propose correcting magnification error and suppressing the color deviation occurring due to a change in the circumstances temperature or ambient temperature, respectively. In Japanese Patent Application Laid Open No. 9-58053, each laser beam of plurality of a laser beam, is detected at least at two separate positions on one main scanning line. The number of clocks generated, from when one of the laser beam detecting devices detects each of the plurality of laser beams to when the other detects each of the plurality of laser beams is counted. A write modulation frequency of each of the laser beams and the timing of the writing on a write position of each of the laser beams, which is determined from a synchronization sensor are corrected responsive to the number of clocks counted.

Thus, a high quality image can always be obtained by maintaining an equal magnification performance, while being prevented from the influence of a change in a scanning speed, which is created due to a change in the temperature.

Further, the Japanese Patent Application Laid Open No. 8-136838 proposes that a laser beam is detected at two prescribed, separate positions on a main scanning line, and a polygon mirror (i.e., a polygon motor) is controlled so that a deflection speed, detected at the two prescribed, separate positions of the laser beam, can be constant.

Thus, according to the Japanese Patent Application Laid Open No. 8-136838, magnification error in a main scanning direction can automatically be corrected (adjusted) in accordance with a change of a scanner optical unit, which is produced by a change in environment or similar.

Thus, both of the above-described conventional methods detect a laser beam at two separate positions and calculate a time difference therebetween by counting a prescribed number of clocks so as to correct (adjust) the magnification. Thus, a pair of laser beam detection sensors and a time difference calculating section are required to be provided in the two conventional devices. In addition, it has been confirmed that image magnification error occurs in the main scanning direction due to a change in a temperature of a laser beam scanning apparatus, in particular, an fθ lens.

To improve accuracy of magnification correction in the main scanning direction and avoid color deviation, detection accuracy of both of the number of clocks to be counted and detection of a time difference is required to be improved. To this end, the above-described conventional methods necessarily generate the clocks to be counted at high speed (i.e., as high speed as possible, while still allowing the clocks to be counted). In such situation, even if the time difference is measured during the high speed generation of clocks, a write clock is to be changed by only a small step in order to correct a prescribed amount corresponding to one cycle (i.e., one count) of the high speed generation of clocks. The higher speed the clocks are generated at and counted, the more difficult the correction of the write clock is. In such a situation, a number of rotations of the polygon mirror can be changed by a small step.

However, even so, magnification in a sub scanning direction is changed, and color deviation occurs in a multi color image that is formed using a plurality of laser beams and plastic lenses. This forces a PC member to change its moving speed (i.e., a rotation speed) and affects an entire image formation system. In addition, in a multi color image formation, a write timing for each color is required to be changed.

Further, since an increase in a clock speed generally produces problems of stability and noise or similar, an increase in clock speed is hardly ever employed. In addition, if a write clock of an image signal is utilized as a clock to be counted, one cannot expect to obtain a higher precision than the minimum number of countable clocks.

SUMMARY OF THE INVENTION

Accordingly, an object of the present invention is to address and solve the above-noted and other problems and to provide a new image forming apparatus.

The above and other object are achieved according to the present invention by providing a novel image forming apparatus, including: a pair of light beam detecting devices that detect the light beam deflected by a deflecting device at two separate positions on a main scanning line, wherein the pair of light beam detecting devices generate both a reference time difference at a prescribed temperature and a time difference to be compared with the reference time difference in a prescribed time during image formation; a time difference measuring device that measures a time difference between time periods when the light beam is detected by one of the light beam detecting devices and when the light beam is detected by the other of the light beam detecting devices; and an image magnification correcting device that changes a write clock frequency of the light beam and the rotation number of the light deflecting device in accordance with the time difference so as to correct magnification error in the main scanning direction of the image on the image carrier.

In another embodiment, the image magnification correcting device may change the rotation number of the light beam deflecting device if magnification error is not completely corrected by changing the write clock frequency.

In yet another embodiment, an image write start position adjusting device may be provided to adjust an image write start position in the main scanning direction on the image carrier in accordance with the time difference detected by the time difference measuring device.

In yet another embodiment, an optical unit including an fθ lens, and a temperature detecting device for detecting temperature of the optical unit may be included, wherein an image magnification correcting device may change the write clock frequency and the rotation number in accordance with the temperature.

In yet another embodiment, temperature of the fθ lens may be directly detected.

In yet another embodiment, the time difference measuring device may measure the time difference after lowering a light beam deflection speed so as to precisely obtain a reference time difference by counting prescribed pulses.

In yet another embodiment, the time difference measuring device may measure the time difference after lowering a light beam deflection speed so as to precisely obtain a reference time difference by counting prescribed pulses.

In yet another embodiment, the light beam deflecting device may include a polygon mirror.

In yet another embodiment, the light beam deflection speed may be only lowered when the time difference is detected, and returned to a level used for image formation.

In yet another embodiment, the light beam deflection speed may be low when starting light beam deflection so as to precisely obtain a reference time difference.

In yet another embodiment, the time difference may be measured without lowering the light beam deflection speed when continuous printing is executed and time difference is detected so as to only detect needs of image magnification correction, and the magnification correction may then be executed based on a time difference detected after lowering the light beam deflection speed in a prescribed time corresponding to an interval of sheets.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 43 is a flow diagram illustrating an operational procedure of the magnification correcting section of the thirteenth embodiment.

DETAILED DESCRIPTION OF THE PREFERRED EMBODIMENT

Figure 1:
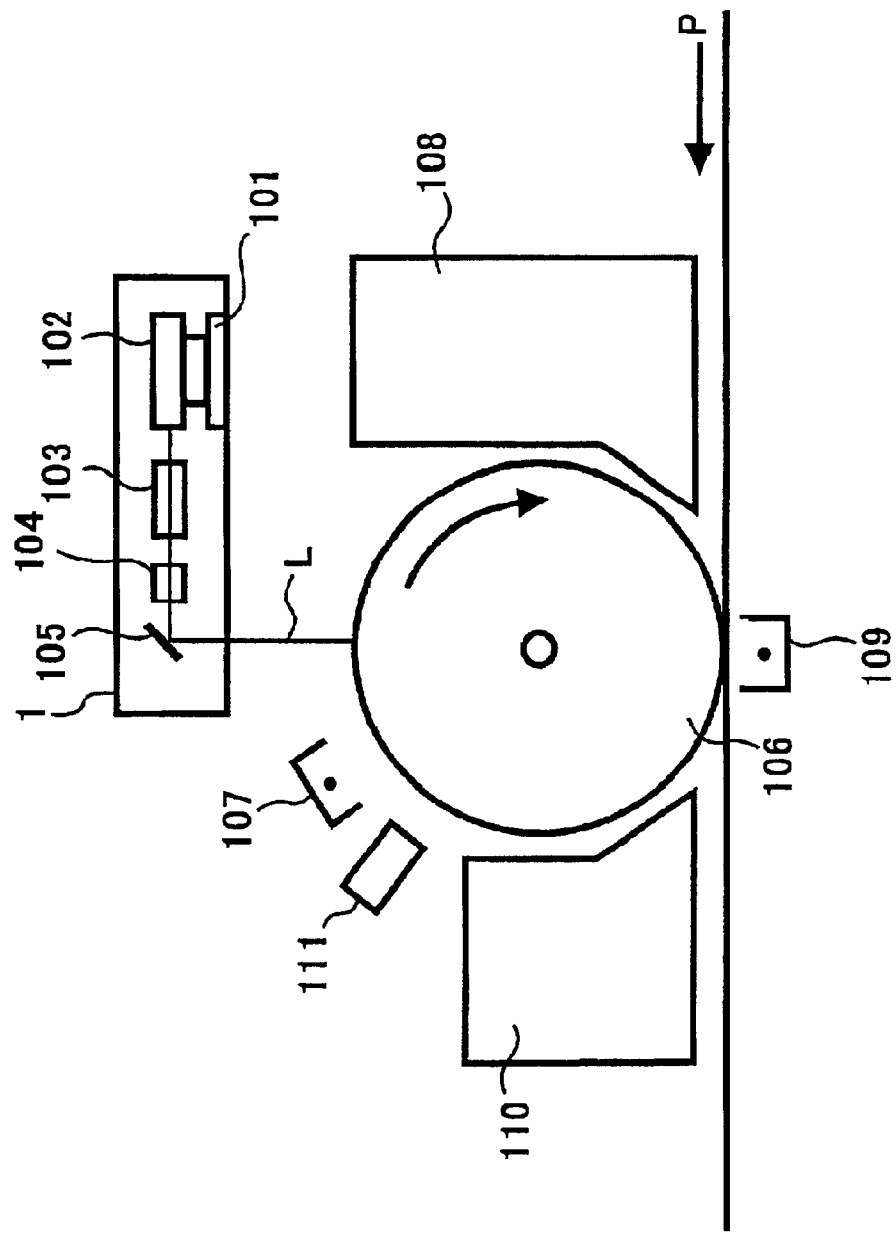
FIG. 1 is a schematic diagram illustrating an image forming section of an image forming apparatus of the first embodiment according to the present invention.

Referring now to the drawings, wherein like reference numerals designate identical or corresponding parts throughout the several view, and in particular to FIGS. 1-43 which illustrate various embodiments of the present invention, as will now be described.

A construction of an image forming apparatus according to the first embodiment of the present invention is now described referring to FIG. 1. A laser beam scanning device 1 may be provided to function as a laser beam deflecting device.

In the laser beam scanning device 1, a laser diode (LD) unit 203 (see FIG. 2) may generate a laser beam L by lighting in accordance with image data. A collimate lens (not shown) may convert the laser beam L into a parallel luminous flux. The laser beam L may then pass through a cylindrical lens (not shown), and be deflected by a polygon mirror 102 which is rotated by a polygon motor 101. The laser beam may then pass through both of an fθ lens and a barrel toroidal lens (BTL) 104, and then be reflected by a mirror 105. The laser beam L may then expose the PC member 106.

The BTL 104 may execute pint adjustment in a sub scanning direction (i.e., a condensing function and positional adjustment in a sub scanning direction), for example, correcting surface tilt.

A charger 107, a developing unit 108, a transferring device 109, a cleaning unit 110, and a charge-removing device 111 all may be provided around the PC member 106. These devices may complement an image forming device and cooperatively form an image on a recording sheet P by executing charging, exposing, developing, and transferring in a conventional electro-photographic process. The image on the recording sheet P may then be fixed by a fixing device (not shown).

Figure 2:
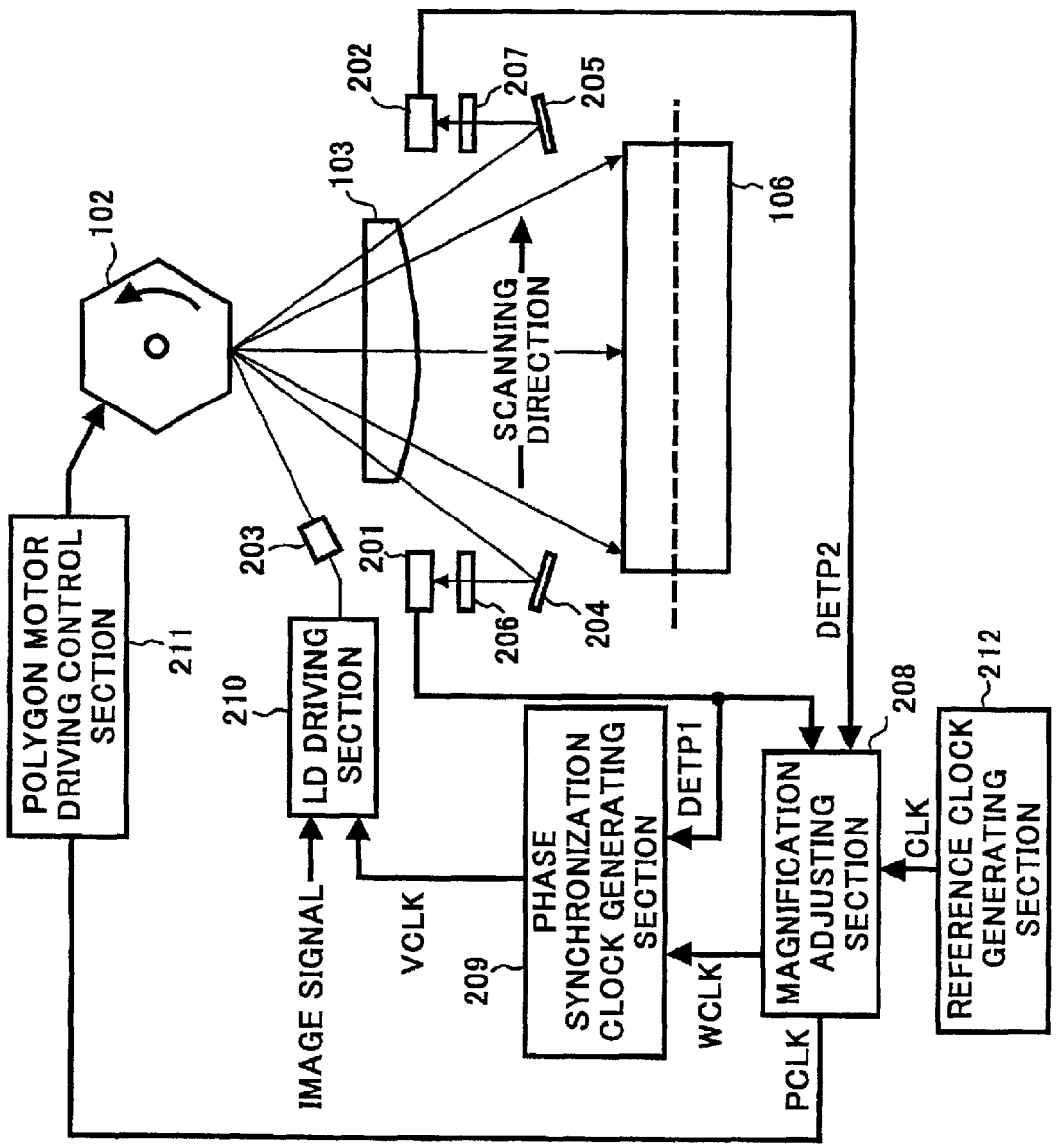
FIG. 2 is a schematic diagram illustrating a construction of an image writing section of the image forming apparatus illustrated in FIG. 1.

FIG. 2 illustrates a construction of an image writing section of the image forming apparatus. This is a plan view of the laser beam scanning apparatus 1 illustrated in FIG. 1 and includes a plurality of control units for a plurality of peripheries. A magnification correcting section 208 that functions as a correcting device for correcting magnification, a phase synchronization clock generating section 209, an LD driving section 210, a polygon motor drive-controlling section 211, and a reference clock generating section 212 may be provided. At both of ends in the main scanning direction, a pair of sensors 201 and 202 may be provided for functioning as an optical beam-detecting device that detects the laser beam L. The laser beam L may pass through the fθ lens 103 and be reflected by a pair of mirrors 204 and 205. Each of the laser beams L may then be condensed by a pair of lenses 206 and 207, and enter into the sensors 201 and 202, respectively. The sensor 201 may also function to detect a laser beam scanning-synchronization signal as a synchronization detection signal.

In this construction, when the laser beam L scans both of the sensors 201 and 202, the sensors 201 and 202 may output synchronization detection signals DETP (detector pulse signal) 1 and DETP 2, respectively.

The synchronization detection signals DETP 1 and DETP 2 may then be sent to the magnification correcting section 208. The magnification correcting section 208 may function to determine and generate a prescribed clock frequency for modulating a laser beam. The magnification correcting section 208 may also function to determine and generate a prescribed clock frequency for determining a rotation number of the polygon mirror 102.

The magnification correcting section 208 may also function to change each of the clock frequencies based on a result of measuring a time difference between the synchronization detection signals DETP 1 and DETP 2 so as to change image magnification in the main scanning direction in accordance with the above-described clock frequencies.

Both a clock WCLK, generated by the magnification correcting section 208, and the synchronization detection signal DETP 1, sent from the sensor 201, may be sent to the phase synchronization clock generating section 209. Then, a clock VCLK may be generated in synchronism with the synchronization detection signal DETP 1. The clock VCLK may be sent to the LD driving section 210 for controlling lighting of a laser beam generated by the laser diode unit 203. On the other hand, the clock PCLK generated by the magnification correction may be sent to the polygon motor drive controlling section 211.

The polygon mirror 102 may then be rotate at a prescribed rotation number in accordance with the clock PCLK.

The LD driving section 210 may control lighting of the laser in accordance with an image signal in synchronism with the clock VCLK. Thus, the LD unit 203 may generate a laser beam L. The laser beam L may be deflected by the polygon mirror 102, pass through the fθ lens 103 and scan the PC member 106.

Figure 3:
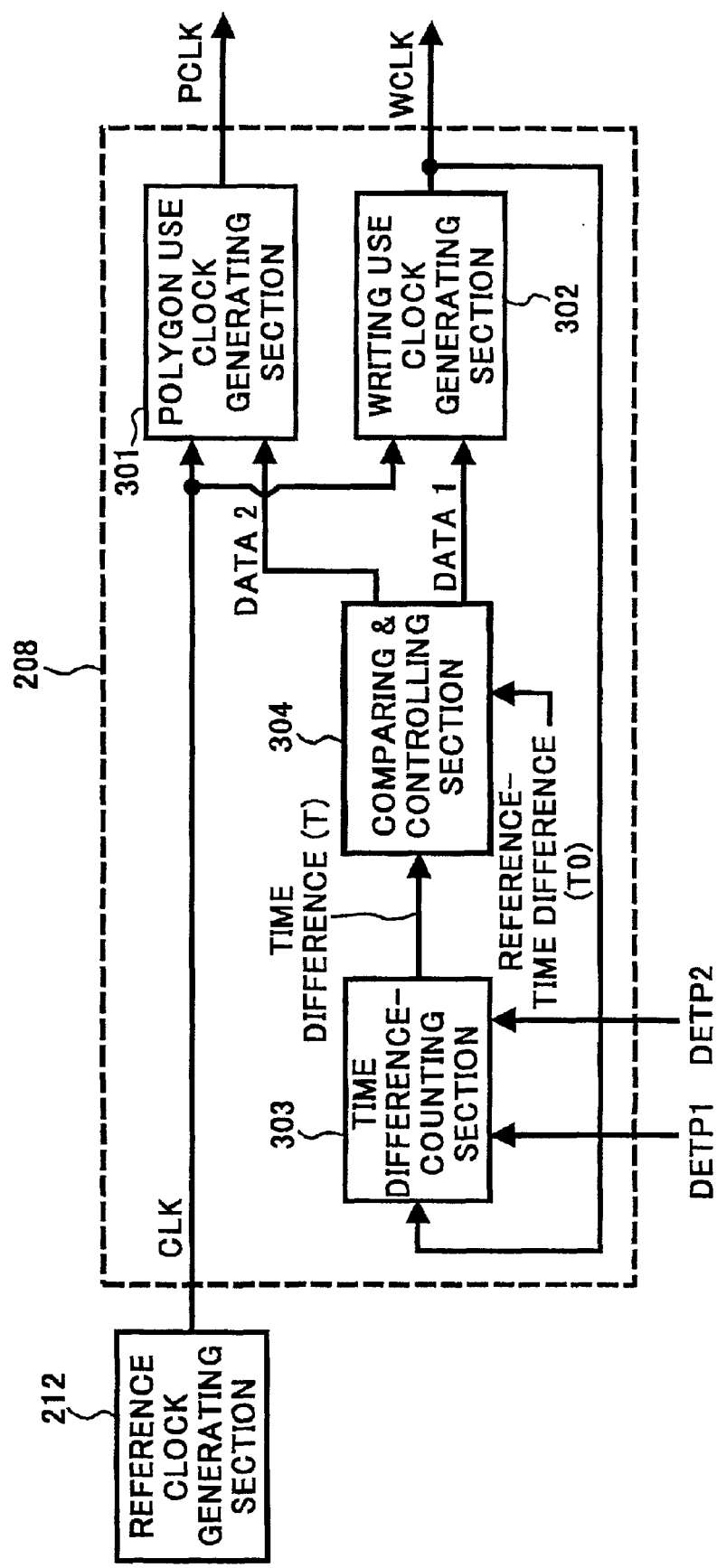
FIG. 3 is a block diagram illustrating a construction of a magnification correcting section of the image forming apparatus illustrated in FIG. 2.
Figure 5:
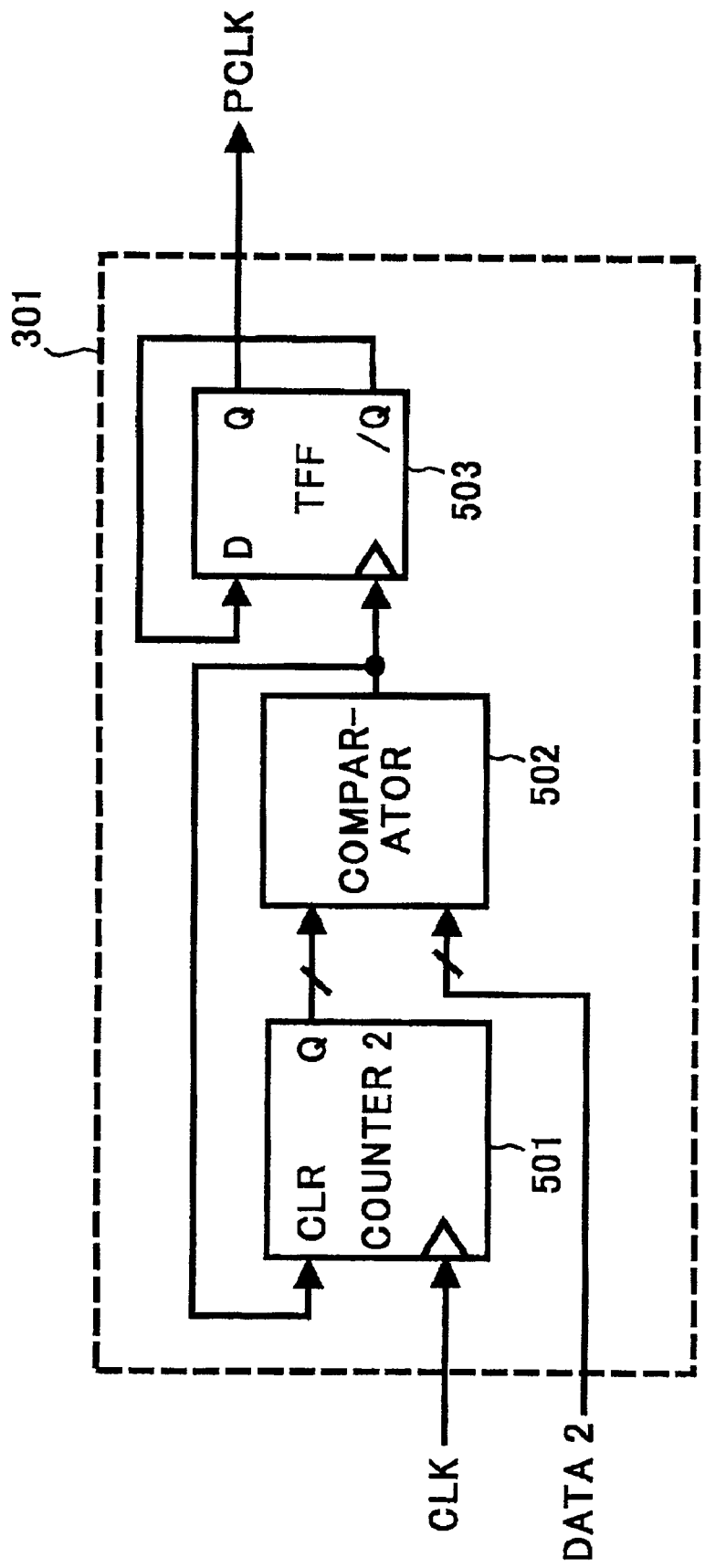
FIG. 5 is a block diagram illustrating a construction of a polygon use clock generating section included in the magnification correcting section illustrated in FIG. 3.

FIG. 3 is a block diagram for illustrating a construction of the magnification correcting section 208. A clock CLK, sent from the reference clock generating section 212, may be sent to both of the polygon use clock generating section 301 and the write clock generating section 302, so that clocks PCLK and WCLK may be generated. As illustrated in FIG. 5, the polygon use clock generating section 301 may include a counter 501, a comparator 502, and a T-type flip flop 503. The polygon use clock generating section 301 can generate the clock PCLK by setting the number of clocks having a half cycle of a necessary frequency minus one to the comparator 502. To this end, the data 2 output may be given a value from the comparing and controlling section 304.

Figure 4:
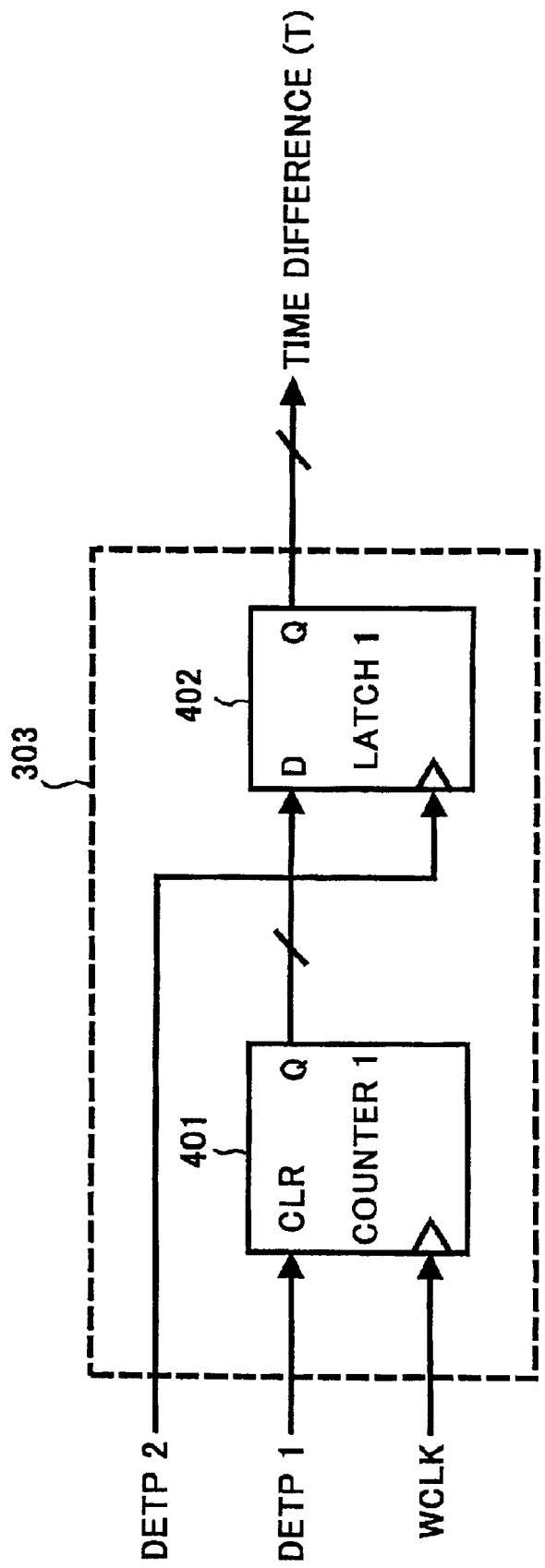
FIG. 4 is a block diagram illustrating a construction of a time difference counting section included in the magnification correcting section illustrated in FIG. 3.
Figure 6:
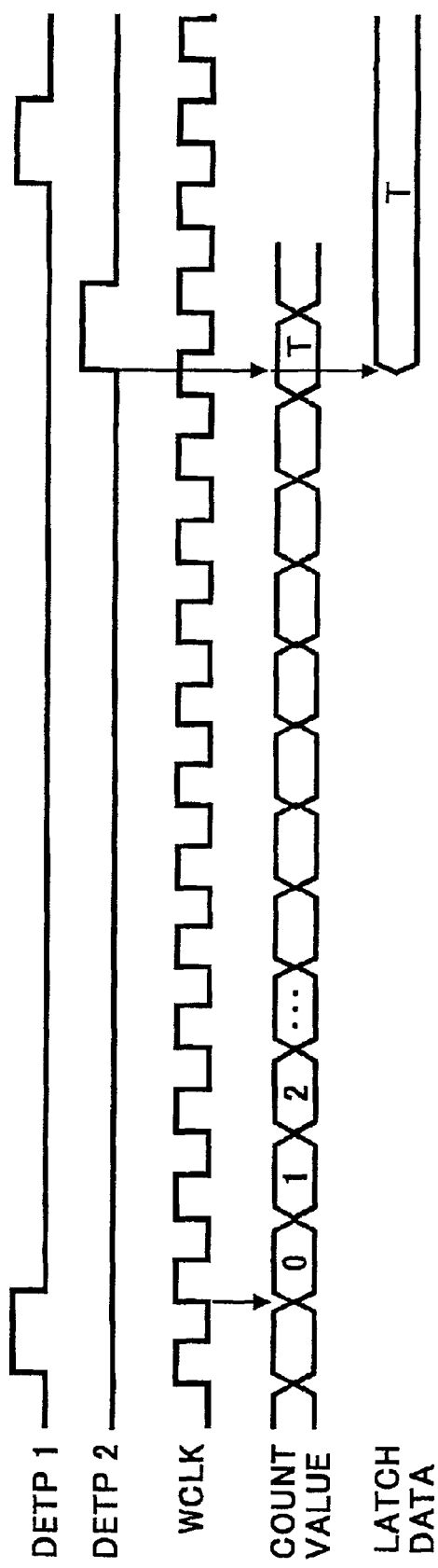
FIG. 6 is a timing diagram illustrating signal generation timings in the time difference counting section illustrated in FIG. 4.

Further, as illustrated in FIG. 4, a construction of a time difference counting section 303, that measures a time difference between the DETP 1 and DETP 2 generation time periods is shown. The time difference counting section 303 such a measurement result to the comparing and controlling section 304. The time difference counting section 303 may include a counter 401 and a latch 402. The counter 401 may be reset by the synchronization detection signal DETP 1 and start counting clocks WCLK (output from the write clock generating section 302). A counted value may be sent to the latch 402, and the counted value is latched by a standing-up edge of the synchronization detection signal DETP 2 as illustrated in FIG. 6 which shows a timing chart. Such a latched counted value may then be sent to the comparing and controlling section 304 as a time difference (T) and compared with a reference time difference (T0).

Then, a pair of correction data 1 and 2 may be determined (and obtained) based on such a comparing result and sent to both of the write clock generating section 302 and the polygon use clock generating section 301, so that both of clocks WCLK and PCLK are generated. Such a pair of correction data 1 and 2 may be separately generated for roughly correcting magnification error by the write clock WCLK in a unit of one cycle and finely correcting remaining magnification error by the polygon use clock PCLK. The reference time difference (T0) may be a time difference detected at a time of normal rotation (of the polygon 102).

Figure 7:
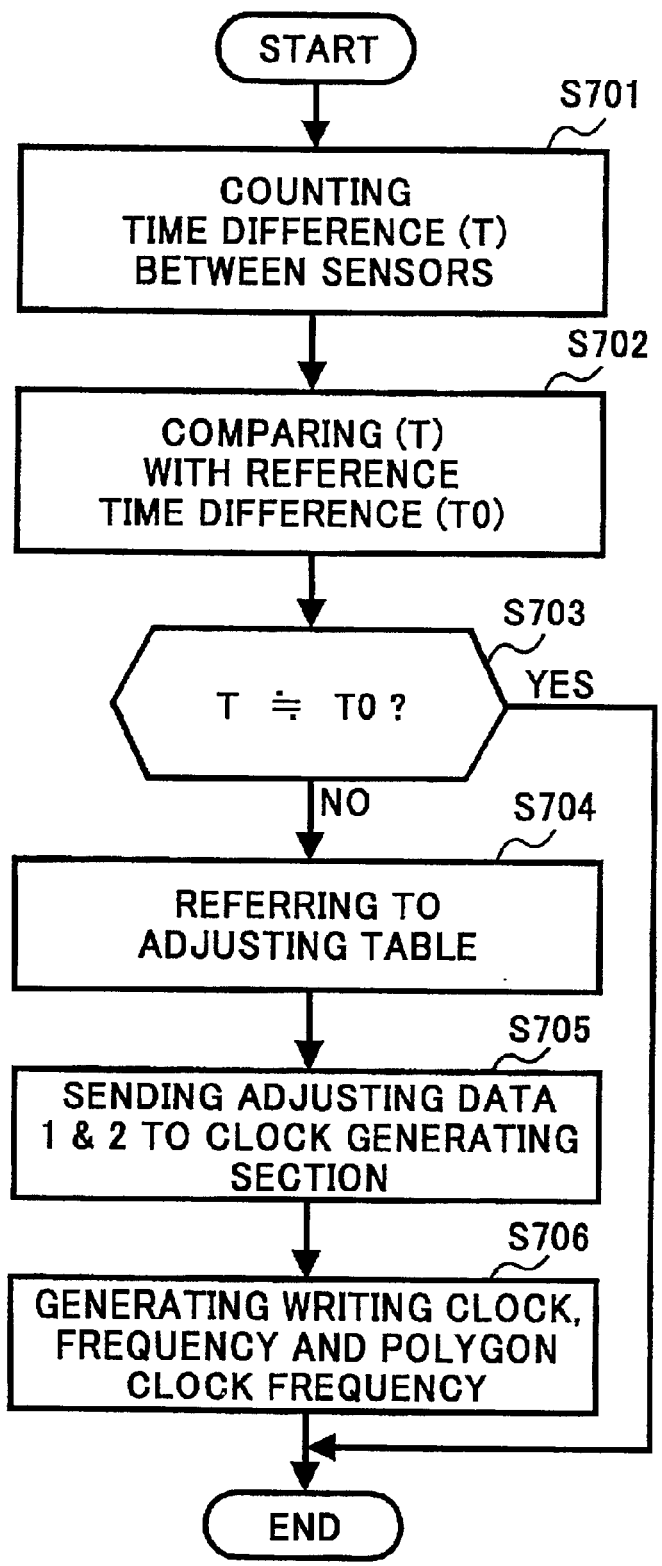
FIG. 7 is a flow diagram illustrating an operational procedure executed in the magnification correcting section illustrated in FIG. 2.

FIG. 7 is a flowchart illustrating an operational process executed in the magnification correcting section 208.

Before executing an operation, a prescribed amount may be set on the write clock WCLK and the polygon use clock PCLK so that a time difference (T) can substantially be equal to a reference time difference (T0). Accordingly, magnification in the main scanning direction can be substantially precise.

Firstly, a time difference (T) between detecting times of sensors 201 and 202 is counted (in step S701). Then, the time difference (T) may be compared with the reference time difference (T0) (in step S702). If the time difference (T) is substantially equal to the reference time difference (T0) (Yes, in step S703), the operation is completed and both of the write clock WCLK and polygon use clock PCLK do not vary. If the time difference (T) is not equal to the reference time difference (T0) (i.e., T≠T0) (No, in step S703), a correction use table stored in the comparing and controlling section 304 is referred to (in step S704). A pair of correction data 1 and 2 may be obtained corresponding to the difference therebetween, and are sent to the polygon use clock generating sections 301 and write clock generating section 302 (in step S705).

Since the difference therebetween does not perfectly accord with data in the correction use table, the nearest data may be selected.

A write clock WCLK and a polygon use clock PCLK may then be generated by the polygon use clock generating sections 301 and write clock generating section 302 corresponding to the pair of correction data 1 and 2, respectively (in step S706). When comparing the time difference (T) and reference time difference (T0) in the comparing and control section 304, it is generally required to be determined whether the time difference (T) is perfectly equal to the reference time difference (T0).

However, it may be determined to be normal, if the difference between the time difference (T) and the reference time difference (T0) is within an allowable range. Thus, both the write clock WCLK and polygon use clock PCLK may be changed only when the difference between the timed difference (T) and the reference time difference (T0) is not within the allowable range.

Figure 13:
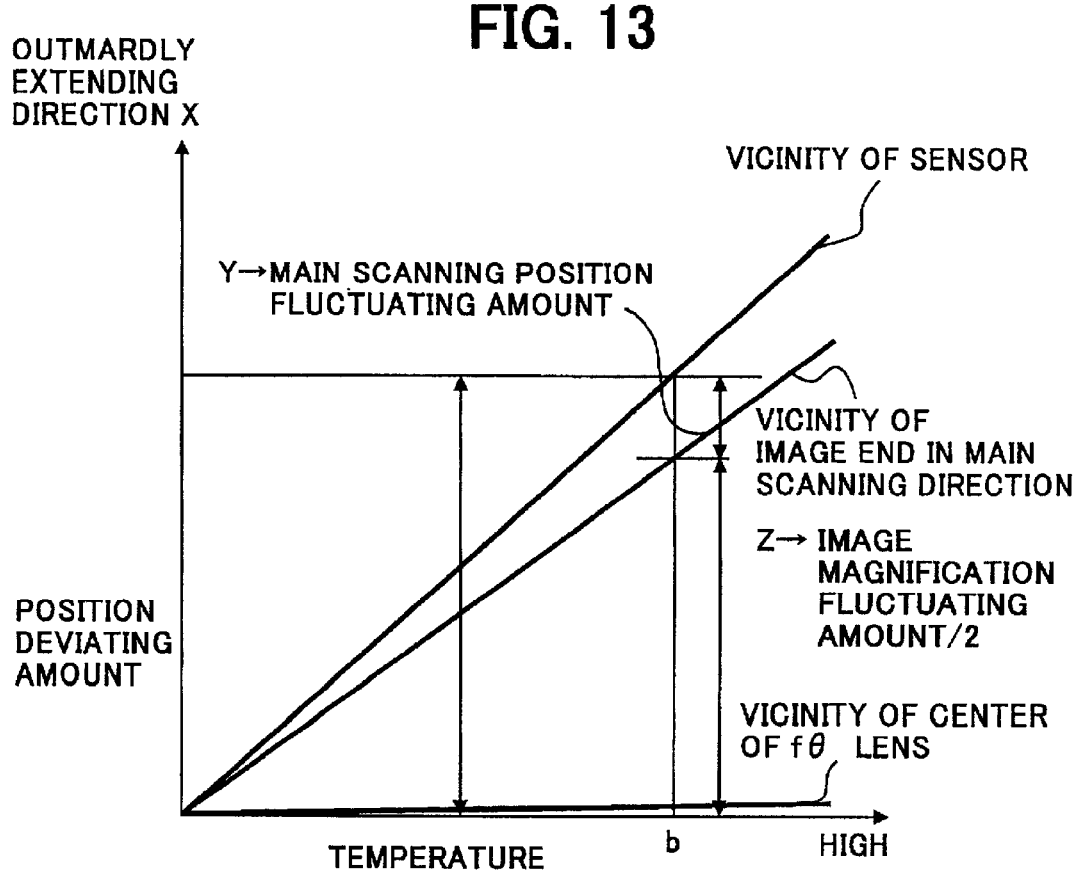
FIG. 13 is a graph illustrating a relationship between a positional deviation amount of a laser beam and temperature in the first embodiment.

FIG. 13 illustrates a relationship between an amount of positional deviation of a laser beam, which deviation is generated by a change in temperature. It is noted therefrom that the laser beam may expand in the main scanning direction, and as a result, an image may be enlarged as temperature rises.

Figure 14:
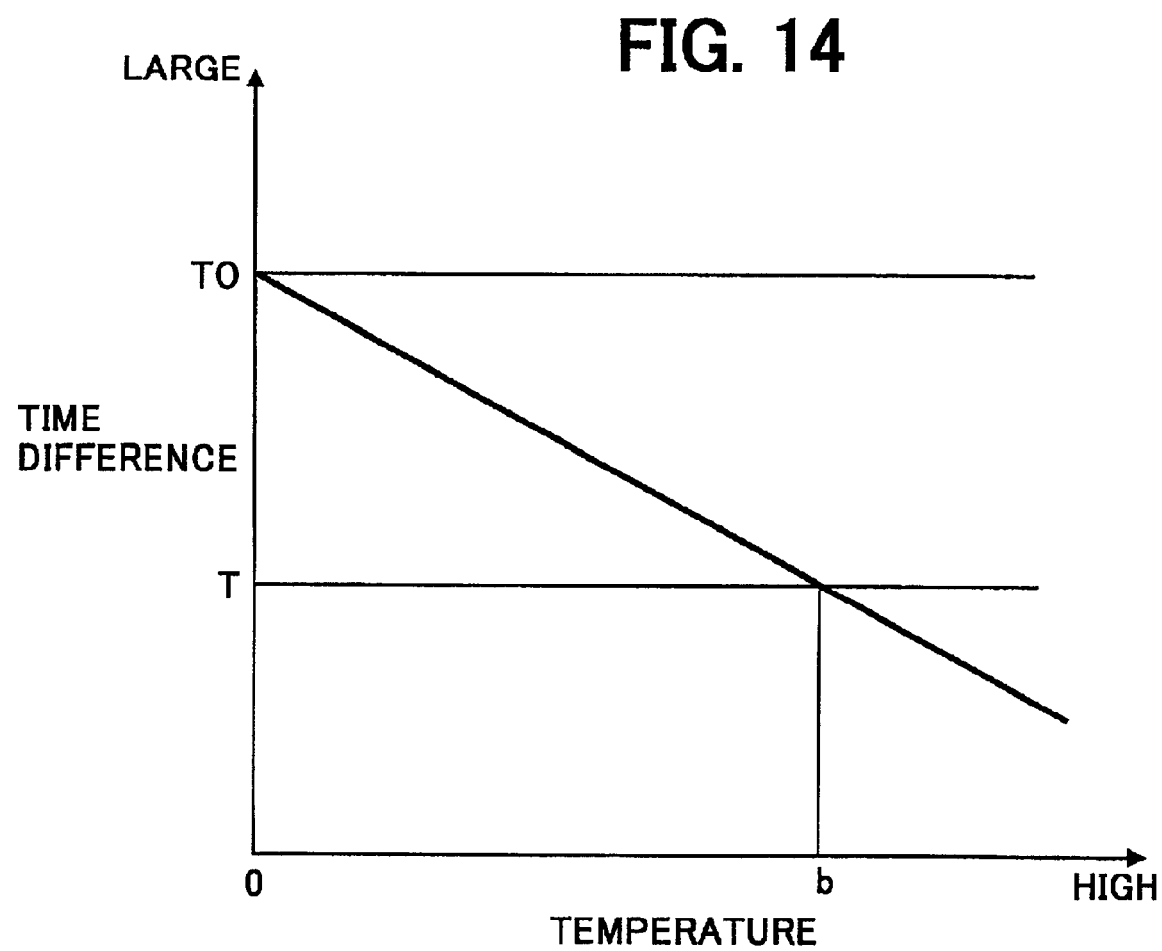
FIG. 14 is a graph also illustrating a relationship between a time difference between sensors and temperature in the first embodiment.

FIG. 14 illustrates a relationship between a time difference between laser beam detection times, which are detected by both of the sensors 201 and 202, and temperature. As noted from the drawing, the time difference becomes smaller as temperature rises. Since a magnification changing amount (counter) corresponding to the time difference comparing result can be known from the relationship between the positional deviation and the time difference as shown in FIGS. 13 and 14, respectively, the correction use table may preferably be formed therefrom.

Such a relationship may only slightly vary depending upon a lens and an image forming apparatus, it is sufficient to measure a representative amount beforehand. Thus, according to the first embodiment, the reference clock to be counted may not be required to be excessively fine because the polygon use clock finely changes its frequency to control the image magnification.

The second embodiment will now, be described. The second embodiment may differ from the first embodiment by firstly, correcting magnification by either increasing or decreasing a frequency of the write clock, and secondly correcting magnification by either increasing or decreasing that of the polygon use clock, if increasing or decreasing a frequency of the write clock is impossible to perfectly correct a prescribed amount.

Figure 8:
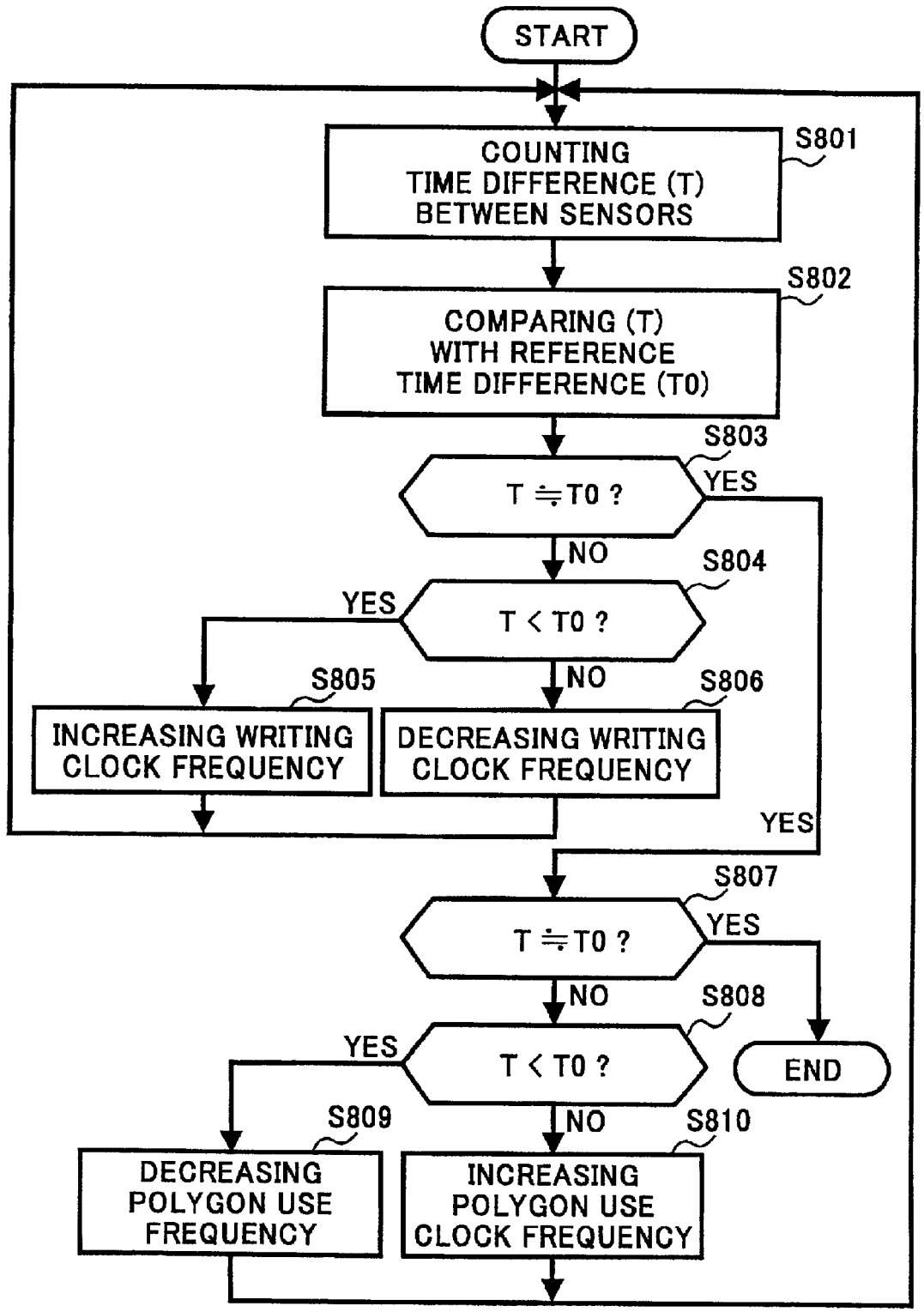
FIG. 8 is a flow diagram illustrating an operational procedure executed in a magnification correcting section of the second embodiment according to the present invention.

FIG. 8 is a flowchart illustrating an operational procedure executed by the magnification correcting section 208. In this operation, a time difference (T) between the sensors 201 and 202 may initially be counted (in step 801). The time difference (T) is compared with the reference time difference (T0) (in step 802). This comparison may determine if it is within a level in which roughness manner change of a write clock frequency is suitable due to its clock unit roughness. If the (T) is substantially equal to the reference time difference (T0) (Yes, in step 803), namely, if it is at a level in which correction by changing the write clock frequency is impossible at this time, the time difference (T) is compared again with the reference time difference (T0) (in step 807). In this case, the comparison result may determine if it is at a level in which correction is possible by changing the polygon use clock frequency. If the time difference (T) is substantially equal to the reference time difference (T0) (Yes, in step 807), namely, if it is at a level in which correction is impossible any more by changing the polygon use clock frequency, such an operation is completed. Thus, the write clock WCLK and the polygon use clock PCLK may be maintained unchanged.

If the time difference (T) is smaller than the reference time difference (T0) (i.e., T<T0) (in step 808), since an image is enlarged in the main scanning direction, the polygon use clock frequency and accordingly, a number of rotation of the polygon mirror, may be decreased (in step S809). If the time difference (T) is larger than the reference time difference (T0) (i.e., T>T0) (No, in step S808), since an image is reduced in the main scanning direction, the polygon use clock frequency and accordingly the number of rotation of the polygon mirror may be increased (in-step S810). Then, a time difference (T) may be counted (in step S801) and compared with the reference time difference (T0) (in step S802) again. Such operations are repeated until a prescribed level is reached in which correction is impossible any more by changing the polygon use clock frequency.

On the other hand, if it is determined that correction is possible by changing a write clock frequency (No, in step S808), and a time difference (T) is smaller than (T0) (T<T0) (Yes, in step S804), a write clock frequency may be increased (in step S805) because an image is enlarged in the main scanning direction. To the contrary, if the time difference (T) is larger than the reference time difference (T0) (T<T0) (No, in step S804), since an image is reduced in the main scanning direction, the write clock frequency is decreased (in step S806). Then, the flow returns to step S801, and a time difference (T) is counted (in step S801) and compared with the reference time difference (T0) again. Such operations may be repeated until a prescribed level in which correction is impossible any more by changing a write clock frequency. After reaching the prescribed level, the flow goes to stop following step S807, wherein the polygon use clock frequency is changed.

Since a magnification changing amount corresponding to a time difference comparison result can be determined from a relationship between the magnification deviation amount and the time difference, magnification correction efficiency may be improved if increased and decreased widths of the write clock frequency and polygon use clock frequency are predetermined in accordance with the magnification changing amount. Since such a relationship is not largely changed depending upon a lens and an image forming apparatus, a prescribed representative amount may preferably be determined.

If the write clock WCLK has 24 MHZ, the polygon rotation number is 20,000 rpm, and the polygon use clock PCLK has 666,67 Hz to obtain the polygon rotation number 20,000 rpm, the reference clock CLK has 24 MHZ and magnification is precise, an amount of T0 is used as a reference time difference and has 8160 degree (T0=8160), and an amount of T becomes 8161 (T=8161), the write clock WCLK may be required to have 23,997 MHZ to correct the magnification. Such correction can be achieved only when the write clock generation section 302 can execute fine tuning of the frequency by a step of 0.0123%.

The polygon use clock PCLK having 666.67 MHZ can be generated by setting (18000−1) degree to the comparator 502.

The polygon rotation number should be around 20,002.4 rpm to correct magnification. Similarly, when (17998−1) degree is set to the comparator 502, the polygon use clock PCLK becomes 666.74 MHZ and the polygon rotation number becomes 20,002.2 rpm.

A slight magnification error is indeed produced.

However, if a frequency of the reference clock CLK 212 is optimized, width of rotation number change corresponding to a setting amount of the comparator 502 may vary and the magnification error can be minimized. Thus, magnification correction by changing the polygon use clock can be easier when compared with that by executing fine-tuning for the write clock.

The third embodiment will be now described. This embodiment may be different from the second embodiment by once initializing the polygon rotation number when either the write clock frequency and the polygon use clock frequency is changed. The initial condition may include the polygon rotation number with which the magnification has substantially been precise.

Figure 9:
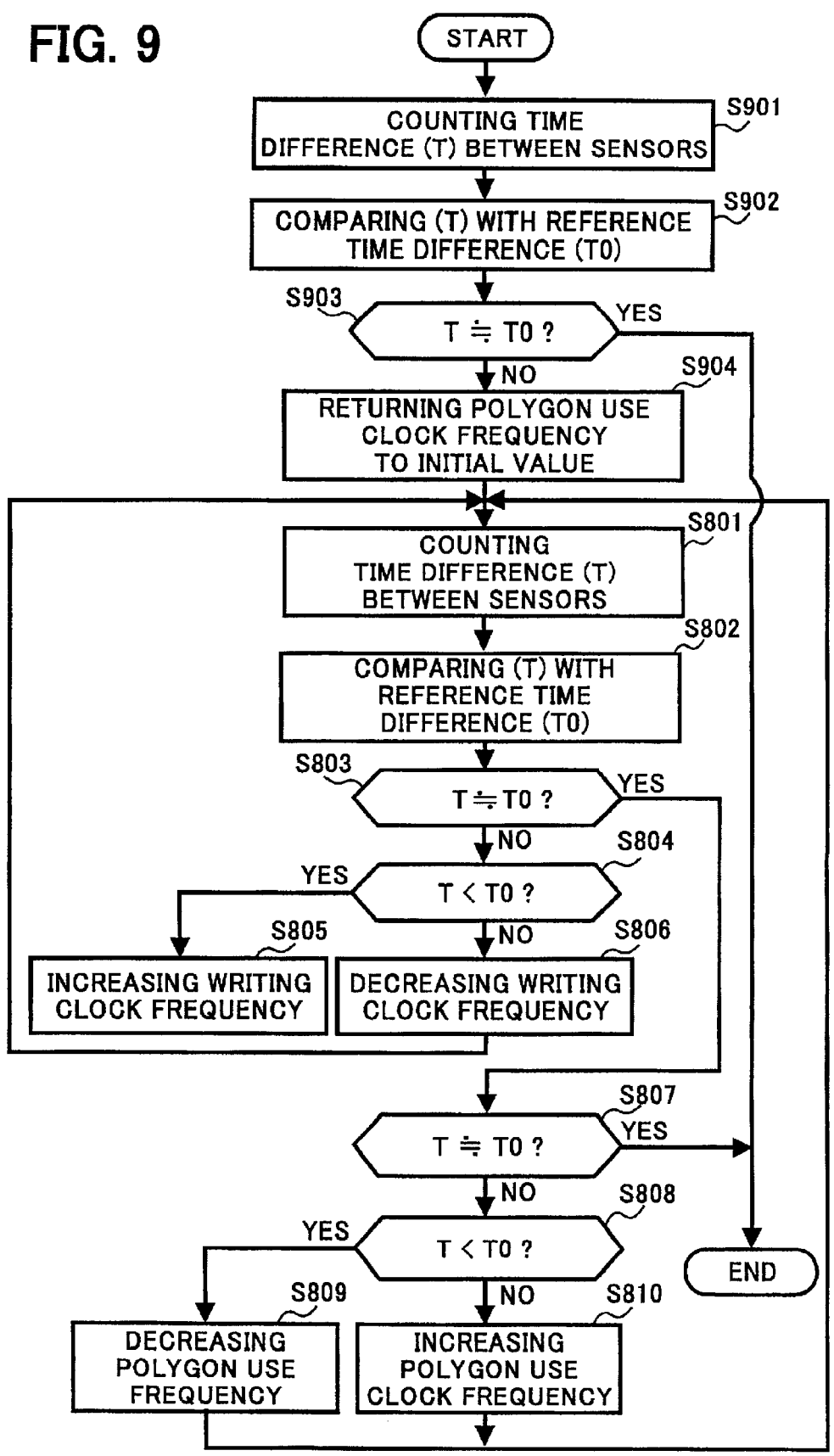
FIG. 9 is a flow diagram illustrating an operational procedure executed in a magnification correcting section of the third embodiment according to the present invention.

FIG. 9 is a flowchart illustrating an operational procedure of the above-described situation. Before executing steps of from S801 to S810 illustrated in FIG. 8, steps of from S901 to S904 may be inserted. Namely, if the T is not substantially equal to the T0 (i.e. T≠T0) (in step S903), the polygon use clock frequency may be returned to an initial value (in step S904). Since an operation executed in each of subsequent steps is substantially the same, details are omitted.

Figure 10:
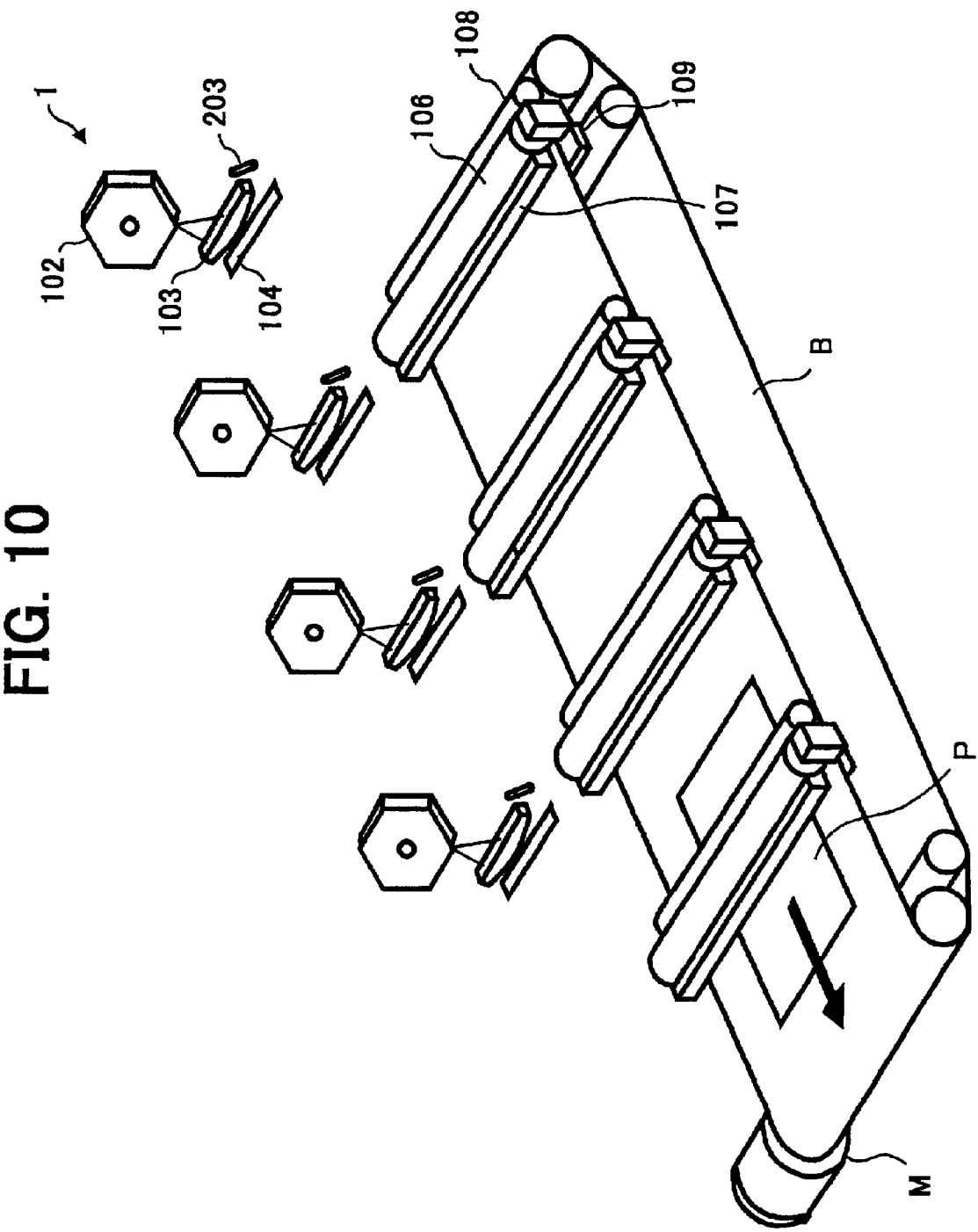
FIG. 10 is a schematic perspective view illustrating a construction of an image forming apparatus employing a four drum system of the fourth embodiment according to the present invention.

The fourth embodiment will now be described. FIG. 10 illustrates an image forming apparatus employing a four-drum system. The image forming apparatus may includes four image formation units and four laser beam scanning units so as to form a color image by superimposing four images (e.g. yellow, magenta, cyan, and black). The image forming apparatus may be composed by arranging each of four units of the image forming apparatus illustrated in FIG. 1. The first, second, third, and fourth color images may consequently be formed and transferred on a printing sheet P fed by a transfer belt B in a direction as shown by an arrow illustrated therein. Thus, a color image composed of the four-color images which have been superimposed may be formed.

A transfer motor M may drive the transfer belt B.

Image magnification correction in the main scanning direction for each color may be executed substantially in the same manner as described in the first to third embodiments.

In this embodiment, a pair of sensors that detects a laser beam L may be provided for each laser beam scanner as one example. In another example, a pair of sensors may be provided in any one of the laser beam scanners, and only one sensor for detecting a synchronization signal may be provided in the remaining laser beam scanners. In still another example, a pair of sensors may be provided in any couple of laser beam scanners, and only one sensor, for detecting a synchronization signal, may be provided in the remaining laser beam scanners.

When a difference in temperature between laser beam scanners (i.e., fθ lenses 103) is relatively small, a pair of sensors can be provided in any one of laser beam scanners 1, and magnification error of each laser beam scanner can be corrected based on a time difference between detection times detected by the pair of the sensors.

Otherwise, if a difference in temperature between laser beam scanners (i.e., fθ lenses 103) neighboring to each other is relatively small, a pair of sensors can be provided in laser beam scanners 1, not neighboring each other. Magnification error of laser beam scanners neighboring each other may be corrected based on a time difference between detection times detected by the pair of the sensors.

Figure 11:
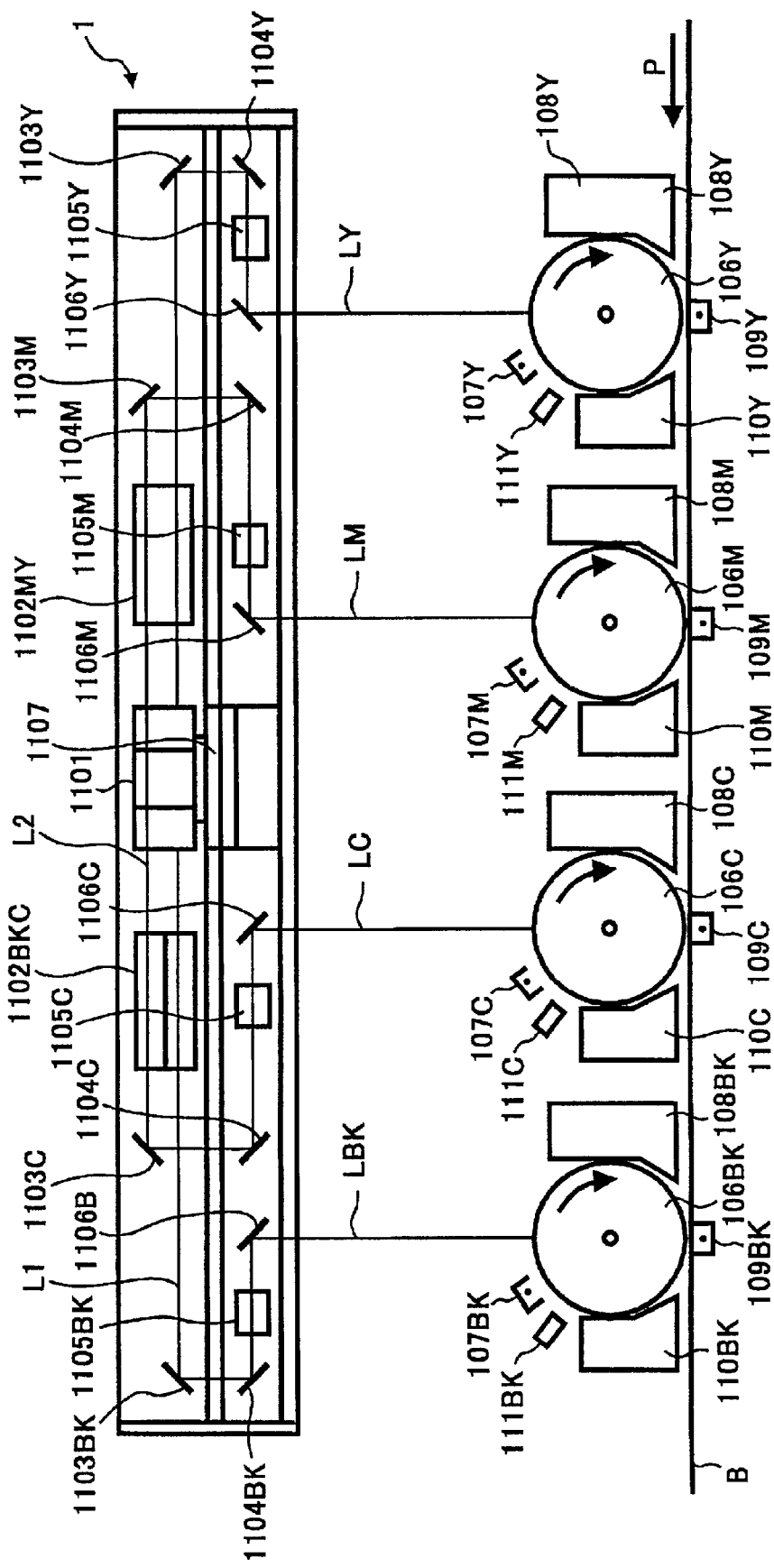
FIG. 11 is a cross-sectional view of an image forming apparatus employing a four-drum system of the fifth embodiment according to the present invention.

The fifth embodiment will now be described. FIG. 11 illustrates an image forming apparatus also employing a four-drum system. A laser beam scanner in this image forming apparatus is different from that illustrated in FIG. 10, but image forming units arranged around the PC member are similar to those illustrated in FIG. 10. The laser beam scanner 1 in this embodiment may use only one polygon mirror 1101.

Both of an upper surface and a lower surface of the polygon mirror 1101 may deflect and scan different color laser beams L1 and L2. Further, the color laser beams may be distributed widthwise from the polygon mirror 1101 as a swinging center of the distribution, so that the four-color laser beams L scan PC members 106 for black (106BK), cyan (106C), magenta (106M), and yellow (106Y). Each color laser beam, deviated by the polygon mirror 1101, may pass through the fθ lenses 1102BK, 1102C, 1102M, and 1102Y and is reflected by first and second mirrors 1103BK, 1103C, 1103M, and 1103Y and 1104BK, 1104C, 1104M, and 1104Y. Each color laser beam may pass through BTLs 1105BK, 1105C, 1105M, and 1105Y and is reflected by third mirrors 1106BK, 1106C, 1106M, and 1106Y, and finally scan the PC members 106 BK, 106C, 106M, and 106Y.

Around the PC member 106BK, a charger 107BK, a developing unit 108BK, a cleaning unit 110BK, and a charge-removing device 111BK, may be arranged. The remaining color unit may include substantially the same devices as described above around an applicable PC member.

Figure 12:
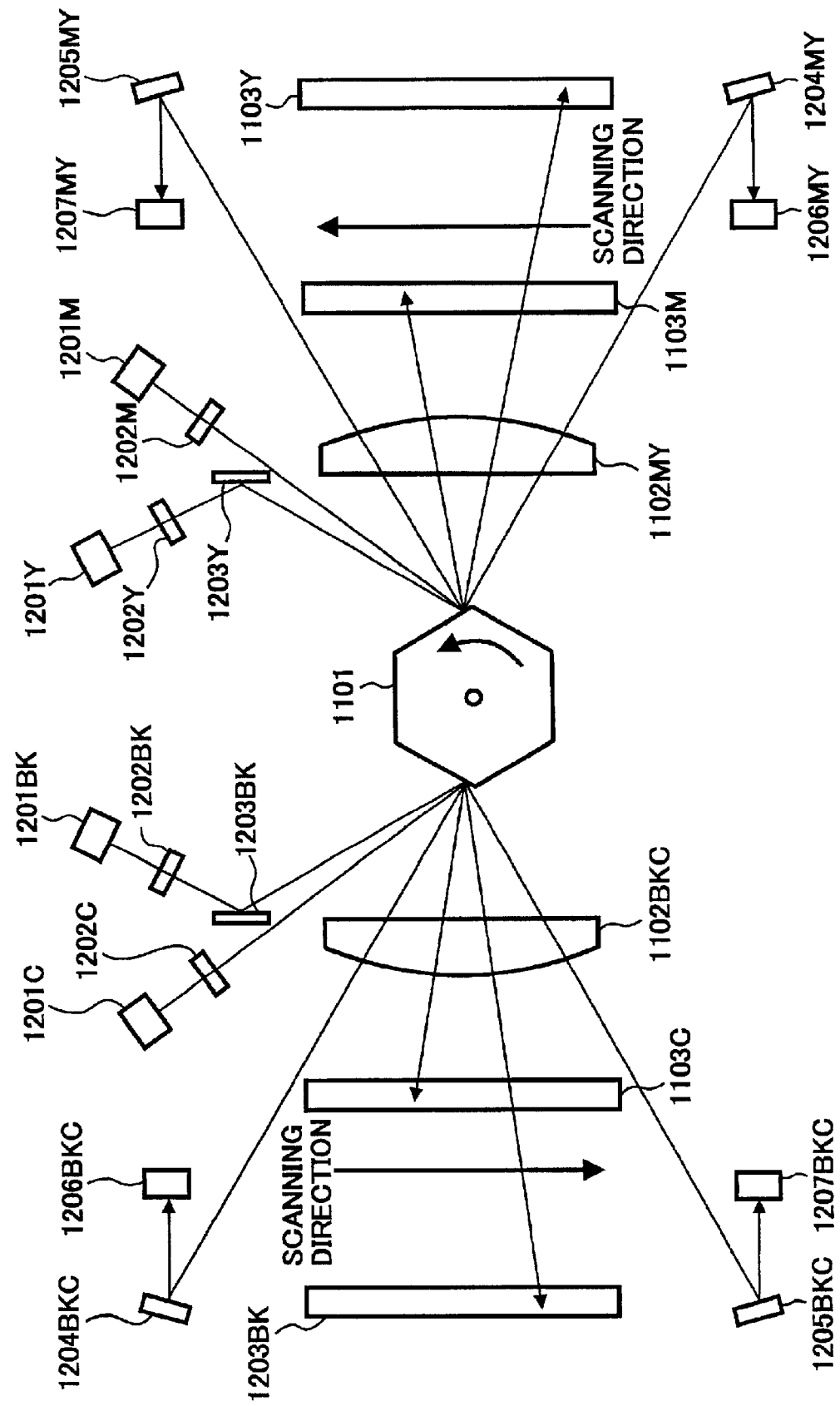
FIG. 12 is a cross-sectional view of a laser beam scanning device included in the image forming apparatus illustrated in FIG. 11.

FIG. 12 is a plan view of the laser beam scanner 1 illustrated in FIG. 11. As noted from FIG. 12, a pair of laser beams L1 from an LD unit 1201BK and an LD unit 1201Y may pass through cylinder lenses (CYL) 1202BK and 1202Y, respectively, and directed to a lower surface of the polygon mirror 1101 after reflected by reflection mirrors 1203BK and 1203Y, respectively. The pair of laser beams L1 may then be deviated by the polygon mirror 1101 that is rotating, pass through the fθ lenses 1102BK and 1102Y, and then is reflected by the first mirrors 1103BK and 1103Y, respectively. A pair of laser beams L2 from an LD unit 1201C and an LD unit 1201M may pass through cylindrical lenses (CYL) 1202C and 1202M, respectively, and then be directed to a higher reflection surface of the polygon mirror 1101.

The pair of laser beams L2 may then be deflected by the rotating polygon mirror 1101, pass through the fθ lenses 1102C and 1102M, and then be reflected by the first mirrors 1103C and 1103M, respectively. At both ends of the main scanning range, cylindrical mirrors (hereinafter referred to as CYMs) 1204BKC and 1204MY, CYMs 1205BKC and 1205MY, and sensors 1206BKC and 1206MY and 1207BKC and 1207MY may be provided so that the pair of laser beams L1 and L2 can be reflected and condensed by the CYMs 1204BKC and 1204MY and 1205BKC and 1205MY, respectively, and then enter into the sensors 1206BKC and 1206MY and 1207BKC and 1207MY, respectively. Each of the sensors 1206BKC and 1206MY may function as a synchronization detection sensor that detects a laser beam as a synchronization detection signal.

Thus, both of the laser beams L1 and L2 from the LD units 1201BK and 1201C may commonly utilize the CYM 1204BKC, the CYM 1205BKC, and the sensors 1206BKC and 1207BKC. Similarly, both of the laser beams L1 and L2 from the LD units 1201Y and 1201M may commonly utilize the CYM 1204MY, the CYM 1205MY, and the sensors 1206MY and 1207MY. Since two laser beams enter into the common sensor, timings for the laser beams to enter thereinto may be differentiated from another so that the laser beams can separately be detected.

However, two sensors can be provided to detect the pair of laser beams. As noted from FIG. 12, the scannings for the Y and M processes may oppositely be performed to those for the BK and C processes.

As noted from FIG. 13, even if temperature rises from (a) as a reference to (b), a beam position does not substantially change in the vicinity of the center of the fθ lens. Whereas, the laser beam outwardly deviates in the main scanning direction, the larger being the nearer to both ends of the fθ lens. FIG. 13 illustrates the relationship appearing only on one half of the lens, and substantially the same relationship may appear on another half from the center of the main scanning direction. Thus, when comparing with image magnification appearing when temperature is (a), an image may be enlarged by two times of a deviation amount Z at both of its ends when temperature is (b). In addition, a difference Y between the vicinity of the sensor and that of the image end may be a positional shifting amount in the main scanning direction, which is to be corrected by adjusting write start timing in the main scanning direction.

As noted from FIG. 14, if the time difference is T0 when temperature is (a) and the temperature rises to (b), since the beam passed through the lens may spread outwardly, the time difference may become T shorter than the T0.

Figure 15:
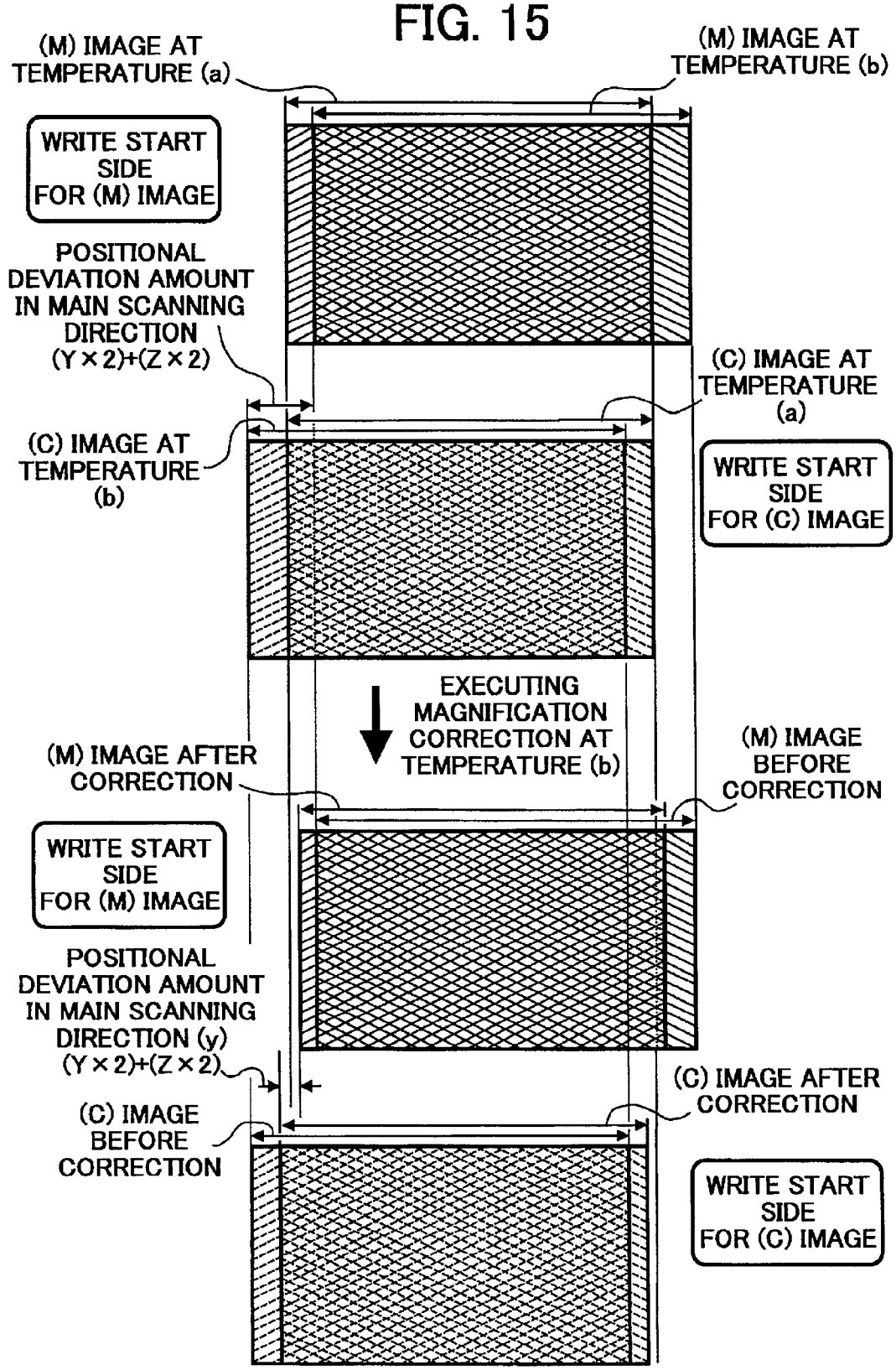
FIG. 15 is a diagram illustrating a moving amount of an image in a main scanning direction when magnification error is corrected in the fifth embodiment.

FIG. 15 illustrates image movement in the main scanning direction when magnification error is corrected. Since each of the laser beams L1 and L2 may be distributed and scanned using the polygon mirror 1101 as a swinging center, the magnification change described with reference to FIG. 13 may cause image positional movement in the main scanning direction.

Hereinbelow, both of a magenta image (M) and a cyan image (C) may be described as an example. Scanning directions on the PC member for two color processes may be opposite to each other.

Even if each color image is separately indicated over and under the drawing for the purpose of easy comprehension, those may be overlapped at practical use. In addition, it is supposed that the M image starts to be written from a left side, and the C image is from a right side. In addition, it is premised that magnification and a write position may be changed by substantially the same amount in both of the M and C color images.

When temperature is (a), both of the magnification and the main scanning position of respective of the M and C images may coincide with each other. If the temperature rises to (b), as described with reference to FIG. 13, the M image may be enlarged by double of the z, and the main scanning direction write start position may be deviated to the right by the Y. In addition, the C image may be enlarged by double of the Z, and the main scanning direction write start position may be deviated left by the Y. As a result, there is a positional deviation between the M and C images in the main scanning direction by (Y×2)+(Z×2).

Then, the magnification error may be corrected by the following method. Since the magnification error is corrected based on a result of measuring a time difference between the pair of sensors 1206BKC (1206MY) and 1207BKC (1207MY), a particularly serious problem does not occur if a width of an image in the main scanning direction is wide so as to extend to a position in the vicinity of the sensors. This is because as illustrated in FIG. 13, the line representing the vicinity sensor is relatively adjacent to that representing the vicinity of image ends in the main scanning direction, and accordingly, a large amount of write start adjustment may not be required.

However, as noted from FIG. 13, if image width is narrow in a prescribed level and magnification error is corrected based on the time difference between the sensors 1206 and 1207, an image may practically excessively be corrected. This is because, beam expansion (i.e. beam enlargement rate) may be the larger at the closer to an outer side of the main scanning range due to an increase in temperature. To this end, since an amount of beam positional deviation at each position of the lens caused by temperature rise is substantially known as illustrated in FIG. 13, a magnification error can be suppressed if the time difference between the sensors 1206 and 1207 is measured, and is converted into a prescribed amount by multiplying a prescribed coefficient to a practical image width, and then the magnification error is corrected based on the prescribed amount.

According to the above-described manner, enlarged portions of both of the M and C images can be corrected, but each of the write start positions in the main scanning direction is not perfectly corrected (i.e., deviation remains by the y).

Since this deviation amount changes depending upon an image width, correction precision may be improved by changing the correction amount in accordance with which a practical image width is similar to the magnification correction.

Hereinbelow, one example of a correction manner for correcting a write start position will be described.

Figure 16:
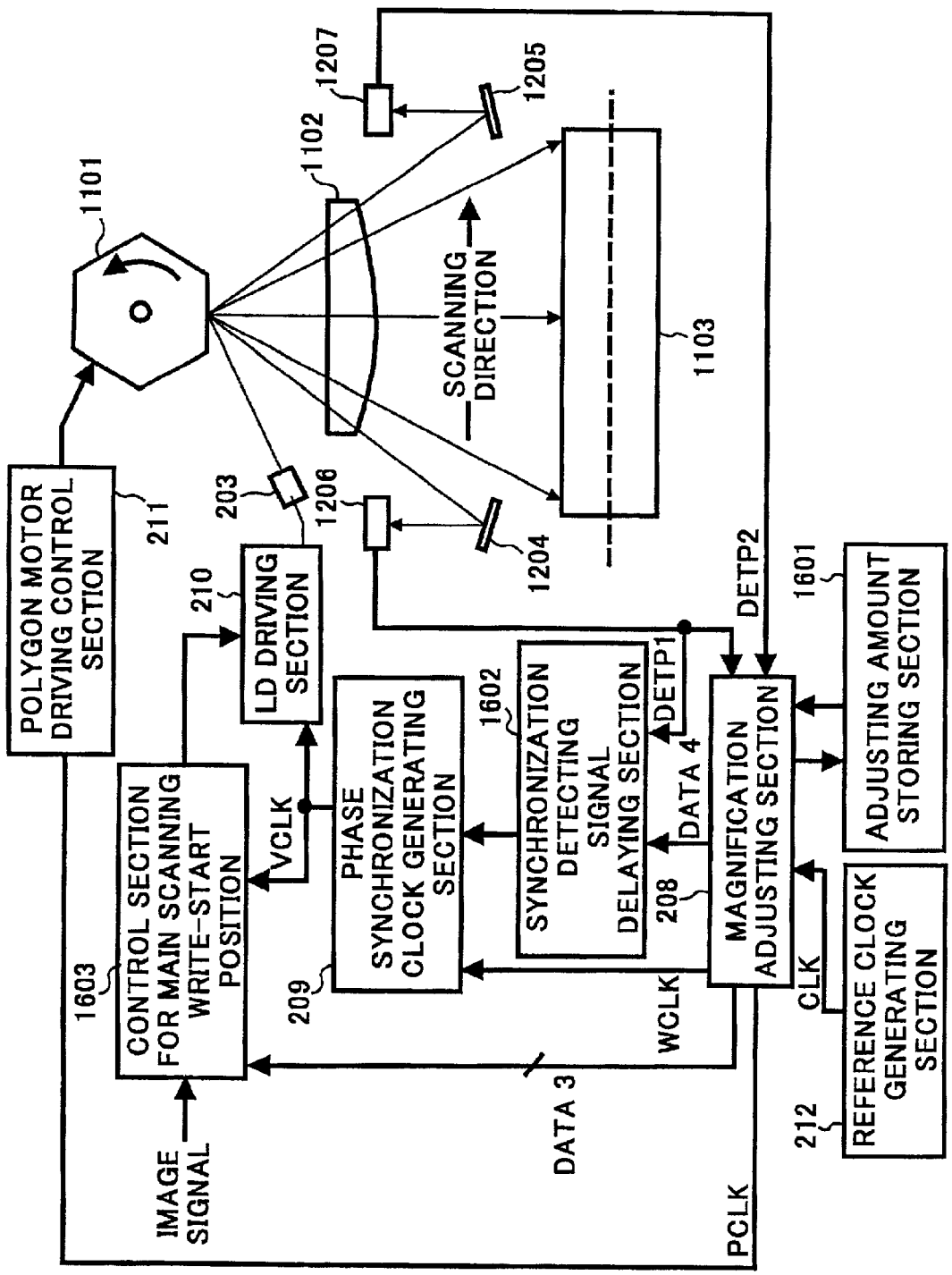
FIG. 16 is a cross-sectional view of an image writing section and a block diagram illustrating magnification control executed in the fifth embodiment.

FIG. 16 illustrates an image writing unit that corresponds to one of the color image writing units illustrated in FIG. 12.

The image writing unit may be different from the control unit of the first embodiment by including a correction amount storage section 1601 for storing data related to a positional deviation correction amount in the main scanning direction corresponding to the time difference. In addition, a synchronization detection signal delaying section 1602 that delays the synchronization detection signal DETP1 by a correcting amount read from the correction amount storage section 1601 may be included as the difference. Also included as the difference may be a main scanning direction-write start position-control section 1603 that controls a write start position in the main scanning direction in a unit of one cycle of a VCLK (video clock) in accordance with the correcting amount read from the correction amount storage section 1601. An optical unit may correspond to that illustrated in FIG. 12.

Figure 17:
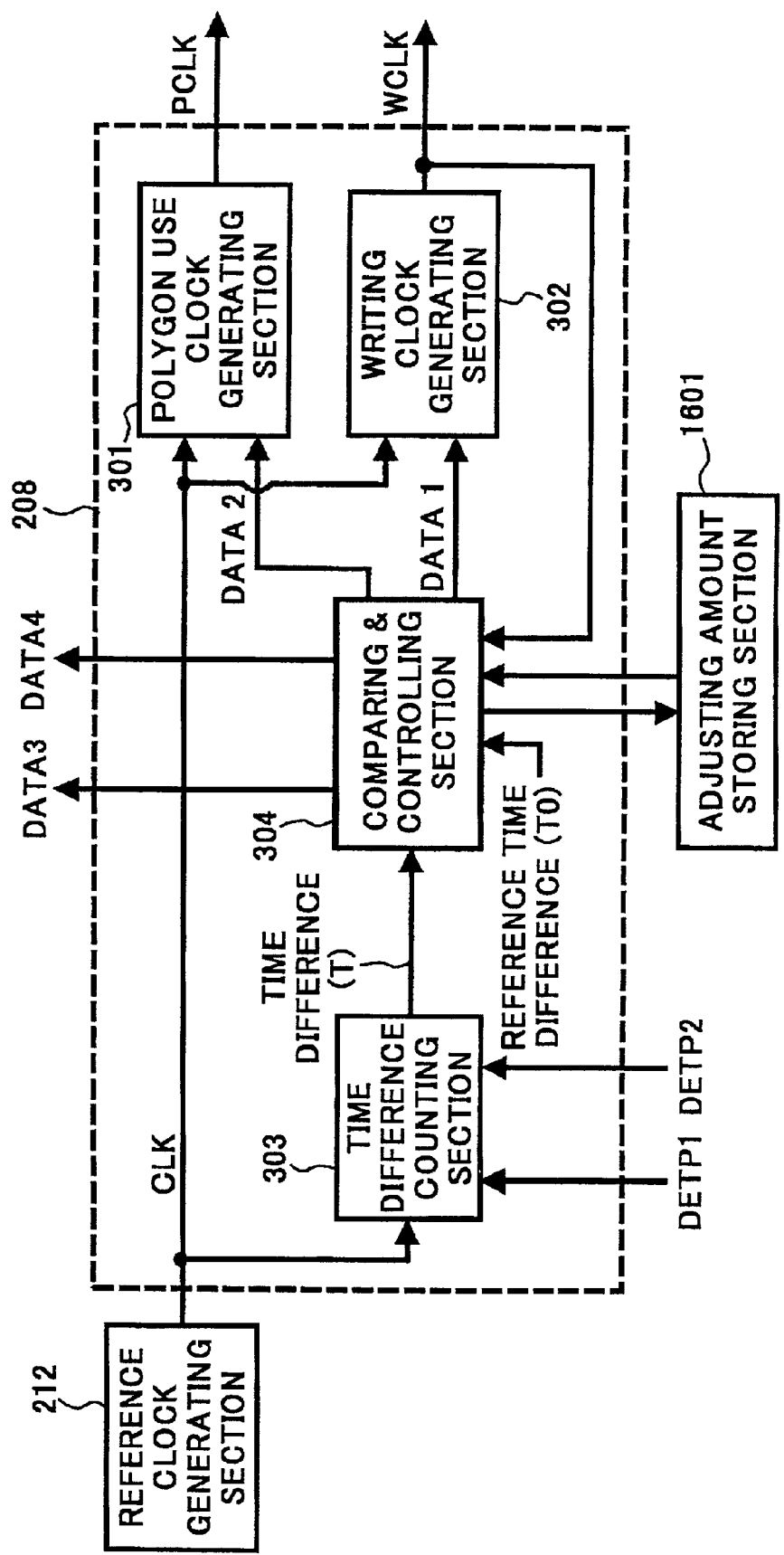
FIG. 17 is a block diagram illustrating a construction of the magnification correcting section on the fifth embodiment.

FIG. 17 is a block chart illustrating a construction of a magnification correcting section 208 in this embodiment.

The magnification correcting section 208 may be different from that in the first embodiment by counting the time difference using a reference clock CLK. Both of the write clock WCLK and the polygon use clock PCLK may be generated from the time difference (T) in a manner similar to the first embodiment by employing a correction use table that stores correction data 1 and 2 corresponding to the time difference (T) in the comparing and controlling section 304.

The main scanning direction positional correction may be executed by comparing the time difference T with the reference time difference T0, and reading a main scanning positional correction amount stored corresponding to the comparison result. Specifically, as illustrated in FIG. 16, as to a correction amount of integer multiple of one cycle of WCLK, it may be sent to the main scanning direction write start position controlling section 1603 as data 3. In addition, as to a correction amount less than one cycle of the WCLK, it may be sent to the synchronization detection signal delaying section 1602 as data 4.

Figure 18:
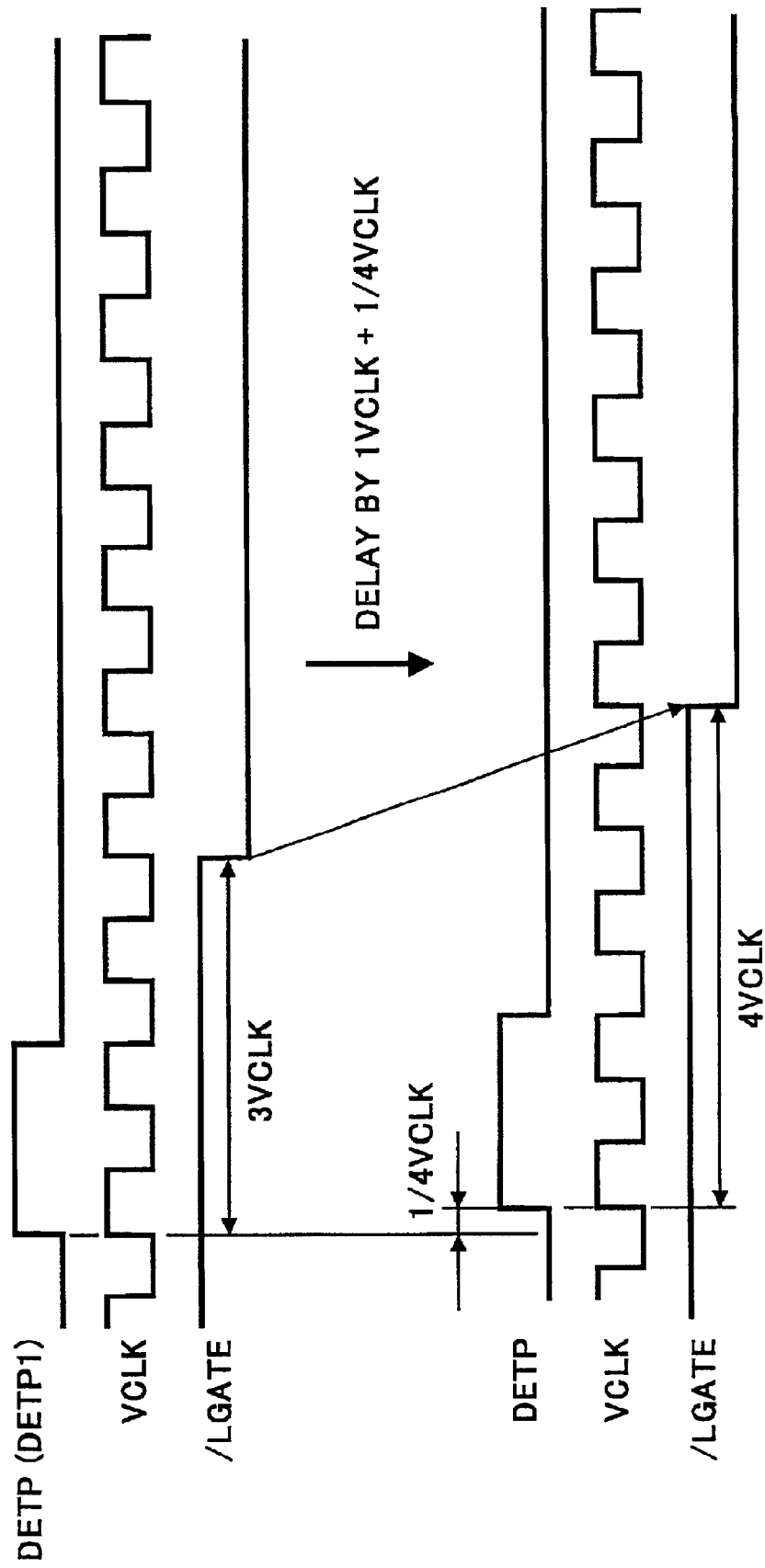
FIG. 18 is a timing diagram illustrating a timing of executing write start position correction in a main scanning direction of the fifth embodiment.

FIG. 18 is a timing chart illustrating correction timing for correcting the write start position in the main scanning direction. As noted therefrom, a standing up edge of DETP (DETP 1) may be a write start reference in the main scanning direction.

If writing is started from the third clock of the write clock VCLK appearing after the standing up edge, the synchronization detection signal delaying section 1602 does not delay the DETP 1 (i.e. DETP 1=DETP). "/LGATE" may represent a gate signal for activating the LD unit 203 to generate a laser beam in the main scanning direction. An image data may be sent to the LD driving section 210 when the signal is at the low level as illustrated in an upper side of FIG. 18.

If a frequency is changed so as to correct magnification and a write start position in the main scanning direction is delayed by one and a quarter cycles of a clock pulse in the write clock generation section 302, the synchronization detection signal delaying section 1602 may delay DETP 1 by a quarter cycle of the VCLK so that the write start timing is delayed by a prescribed amount. The synchronization detection signal delaying section 1602 may then send the signal of DETP to the phase synchronization clock generation section 209. In addition, a timing of "/LGATE" may be delayed by one cycle of the VCLK in the main scanning direction write start position controlling section 1603. As a result, although "/LGATE" is validated when delayed by three clocks from the DETP 1 before executing the correction, it is validated when delayed by four and a quarter clocks after the correction as illustrated in FIG. 18. Thus, correction may be executed by one and a quarter clocks as a result.

Figure 19:
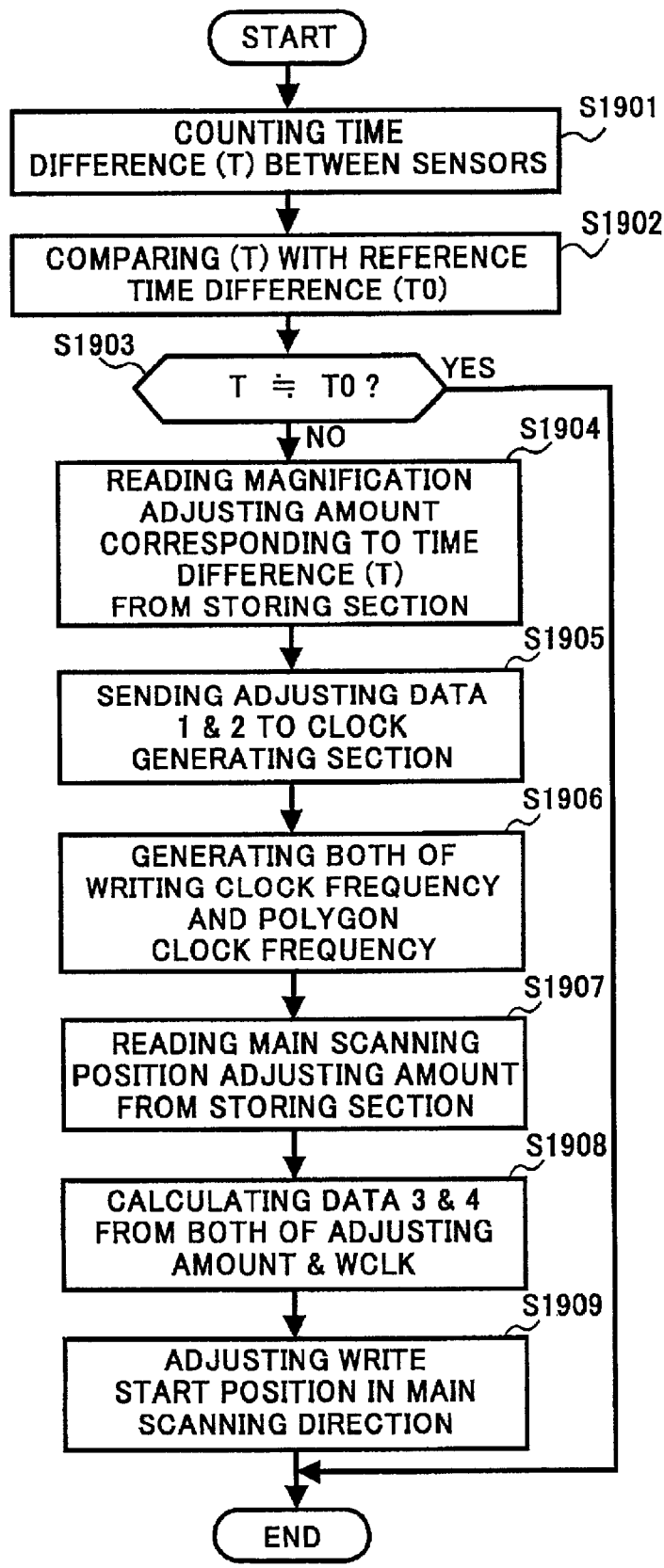
FIG. 19 is a flow diagram illustrating an operational procedure of main scanning direction positional correction and magnification correction executed in the fifth embodiment.

FIG. 19 is a flowchart for illustrating an operational procedure of both of magnification correction and main scanning direction positional correction. Before the operations, both of a prescribed write clock and a prescribed polygon use clock may be set so that a reference time difference T0 can be obtained. Thus, magnification in the main scanning direction on an image may be precise in this situation. Based on such preconditions, a time difference between sensors (i.e., the sensor 1206BKC (1206MY) and sensor 1207 BKC (1207MY)) may be counted (in step S1901). The time difference T may then be compared with the reference dime difference T0 (in step S1902). If the time difference T is substantially equal to the reference time difference T0 (Yes, in step S1903), the operation is completed, and both of the write clock WCLK and the polygon use clock PCLK may remain unchanged. If the time difference T is not equal to the reference time difference T0 (T≠T0) (No, in step S1903), the correction use table in the comparing and controlling section 304 may be referred to, and a prescribed magnification correction amount may be read (in step S1904). In addition, both of correction data 1 and 2 against the time difference T may be sent to the polygon use clock generation sections 301 and write clock generation section 302 (in step S1905). Since, the time difference T rarely coincides with data of the correction use table, the closest data may necessarily be selected.

Then, the polygon use clock generation section 301 and write clock generation section 302 may generate both of a prescribed write clock WCLK and polygon use clock PCLK in accordance with the correction data 1 and 2, respectively (in step S1906).

Further, a main scanning direction positional correction amount may be read from the storage section 1601 in accordance with the time difference T (in step 1907). A pair of data 3 and 4 may then be calculated from the main scanning direction correction amount and the write clock WCLK by the comparing and control section 304 (in step S1908). The pair of data 3 and 4 may then be sent to both of the main scanning direction write start position control section 1603 and the synchronization detection signal delaying section 1602, respectively. Thereby, the write start position in the main scanning direction may be corrected (in step S1909). When comparing the time difference T with the reference time T0, even if it is essential to determine if both are perfectly equal to each other, it can be determined as normal if a difference therebetween is within an allowable magnification error range. Thus, when the difference is more than the allowable, both of a write clock frequency and a polygon use clock frequency may be changed.

The sixth embodiment will now be explained. An image forming apparatus of the sixth embodiment may be similar to that described in the first embodiment. The sixth embodiment may be different form the first embodiment by employing a temperature sensor for detecting temperature of a fθ lens 103 and correcting magnification based on the temperature.

Figure 20:
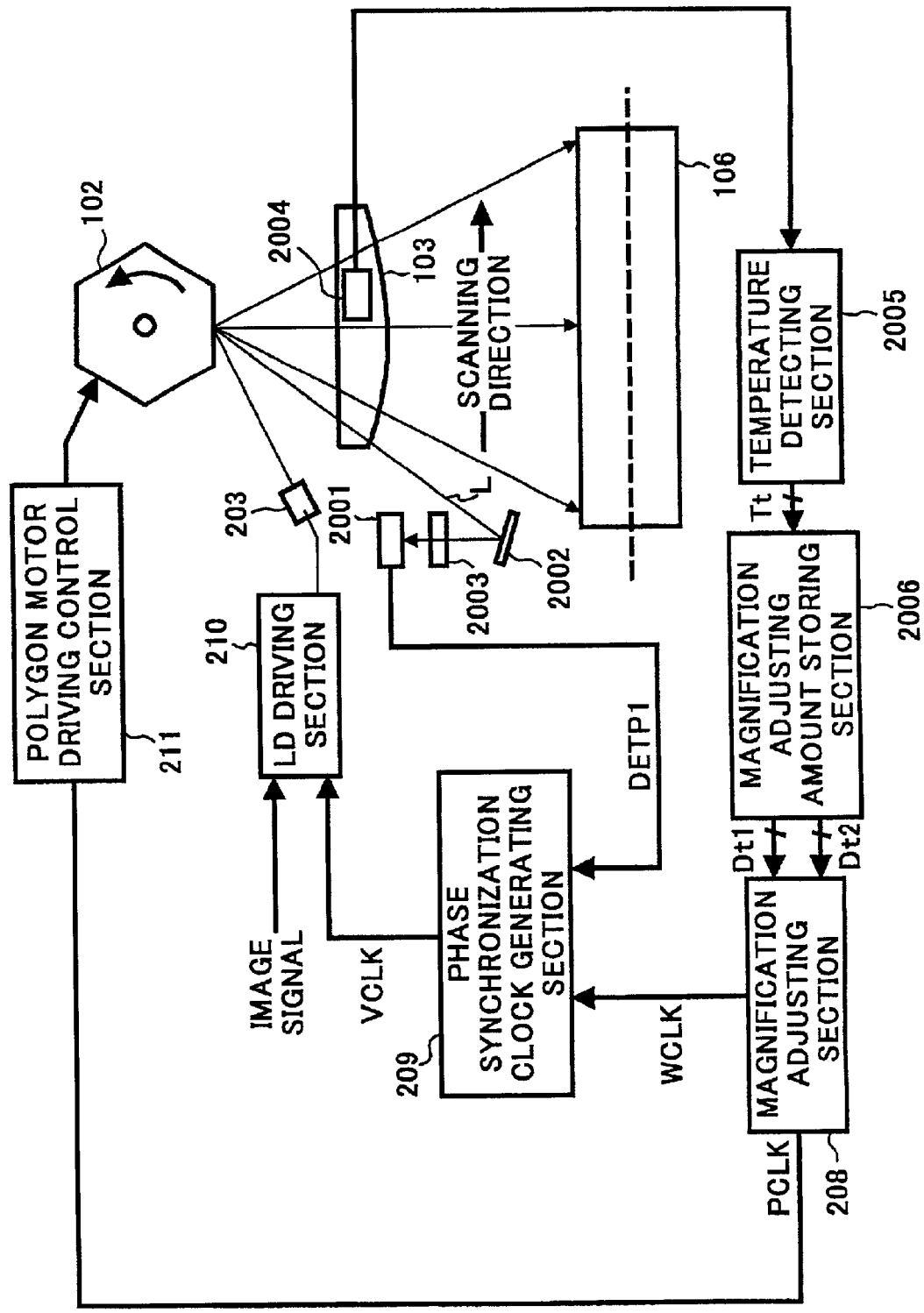
FIG. 20 is a cross-sectional view of an image writing section included in the image forming apparatus of the sixth embodiment, which is accompanied by a block diagram illustrating magnification control.

FIG. 20 illustrates an image writing unit in the image forming apparatus of this embodiment. FIG. 20 is a plan view of the laser beam scanning apparatus illustrated in FIG. 1, and illustrates a plurality of peripheral control units.

A synchronization sensor 2001 may be disposed in front of an image formation start position in the main scanning direction so as to detect a laser beam. The laser beam may pass through the fθ lens 103 and then be reflected by the mirror 2002. The laser beam may be condensed by the lens 2003 and enter into the synchronization sensor 2001 that detects a laser beam scanning synchronization signal as a synchronization detection signal.

When the laser beam L is scanned by the polygon mirror 102, a synchronization signal DETP 1 may be output from the synchronization sensor 2001 and then sent to the phase synchronization clock generation section 209. The magnification correcting section 208 may determine and generate a clock frequency for modulating the laser beam. Also, a clock frequency for determining a number of rotations of the polygon mirror 102 may be determined and generated by the magnification correction section 208. The magnification correcting section 208 may also include a magnification correction function of changing each of the clock frequencies based on a result of detecting temperature of the fθ lens 103 using a principle wherein an image magnification changes in accordance with clock frequency change in a main scanning direction.

Both of a clock WCLK generated in the magnification correcting section 208 and a synchronization detection signal DETP 1 from the synchronization sensor 2001 are sent to the phase synchronization clock generation section 209, so that a clock VCLK may be generated in synchronism with the DETP 1.

The clock VCLK may be sent to the LD driving section 210 that controls lighting of a laser unit 203. The clock PCLK generated by the magnification correcting section 208 may be sent to the polygon motor drive controlling section 211. The polygon mirror 102 may rotate at a prescribed number of rotations corresponding to the frequency of the clock PLCK. The lighting of the laser beam may be responsive to an image signal and synchronized with the clock VCLK. The polygon mirror 102 may then deflect the laser beam. The laser beam may then pass through the fθ lens 103 and scan the PC member 106.

Figure 22:
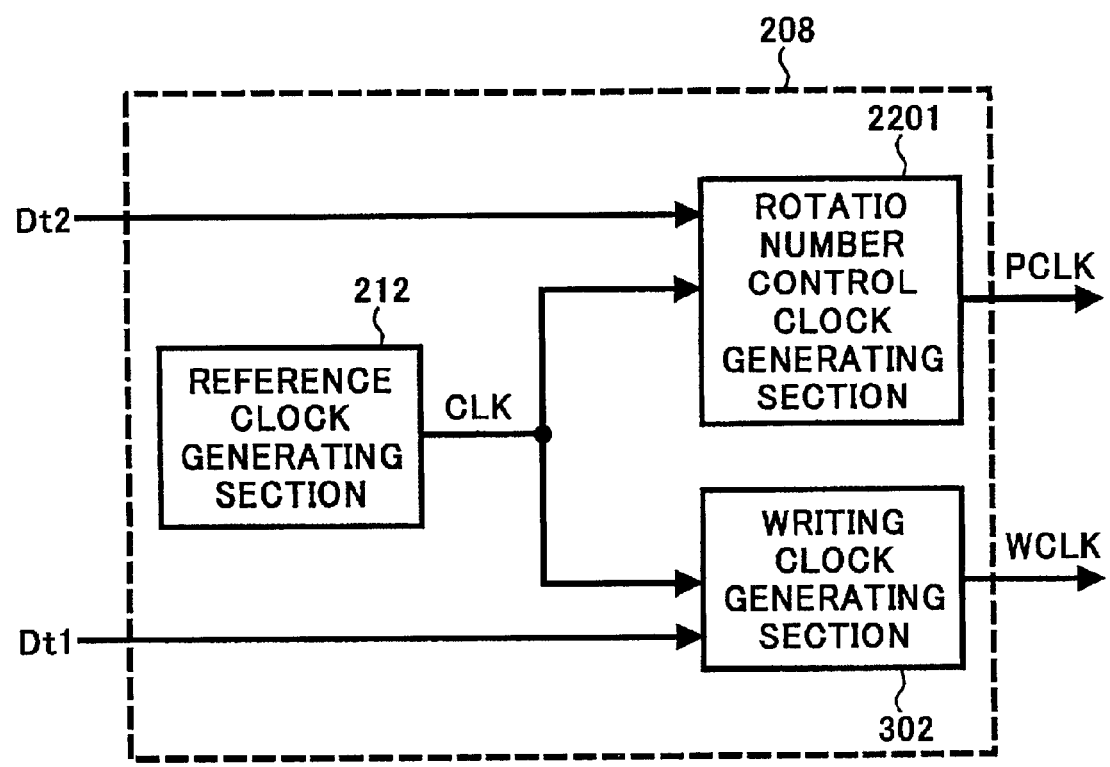
FIG. 22 is a block diagram illustrating a construction of the magnification correcting section of the sixth embodiment.
Figure 23:
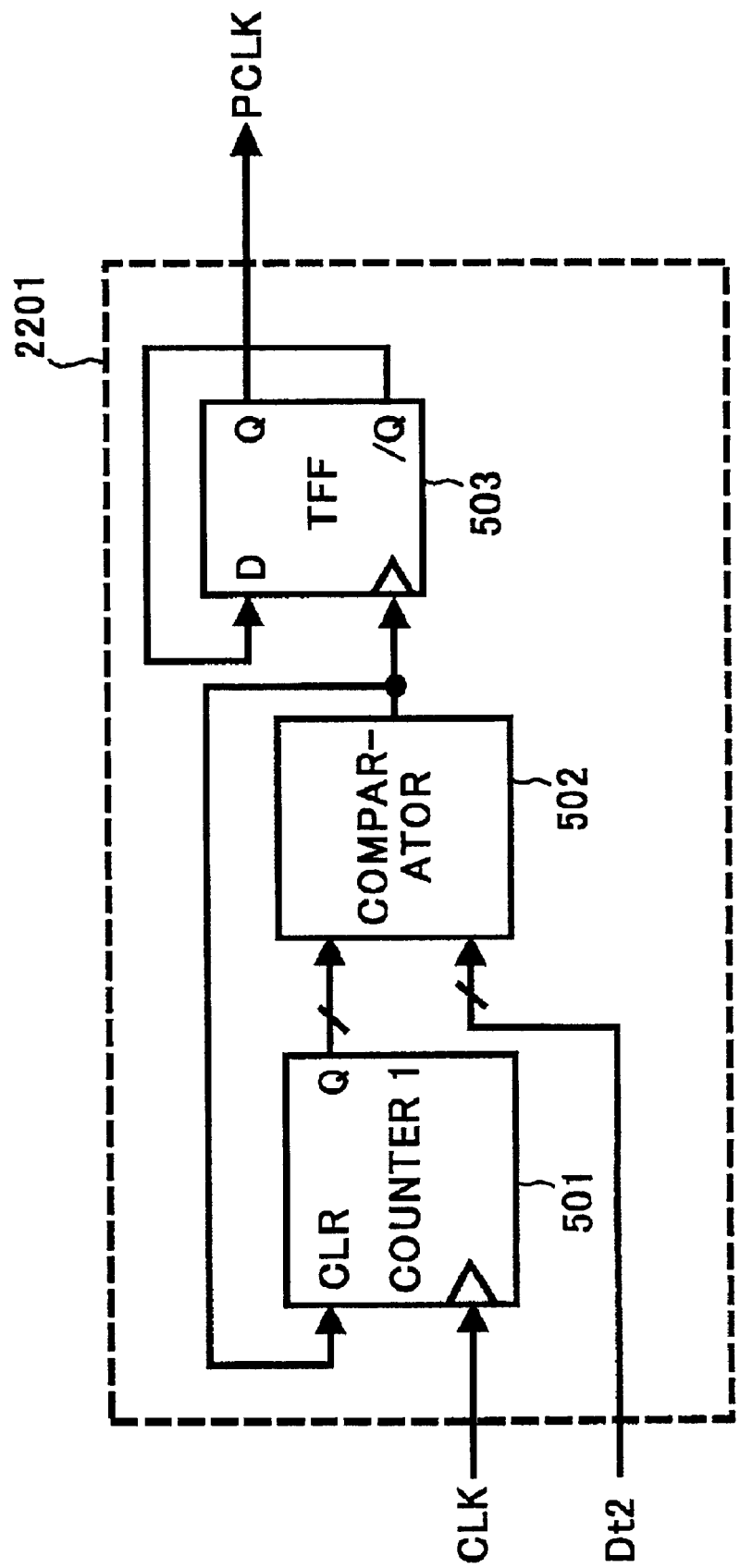
FIG. 23 is a block diagram illustrating a construction of a rotation number control clock generating section of the sixth embodiment.

FIG. 22 is a block diagram illustrating a construction of the magnification correcting section 208 of this embodiment illustrated in FIG. 20. A clock CLK may be sent from a reference clock generating section 212 to both of the write clock generating section 302 and the rotation number controlling clock generation section 2201. Both of correction data Dt1 and Dt2 may be set and clocks WCLK and PCLK may be generated to and from the reference clock generating section 212 and write clock generating section 302, respectively. As illustrated in FIG. 23, the rotation number control clock generating section 2201 may include a counter 501, a comparator 502, and a T-flip flop 503. The clock PCLK may be generated by setting a half cycle of a necessary frequency minus 1 to the comparator 502. Thus, such an amount may necessarily be included in the correction data Dt2.

Figure 26:
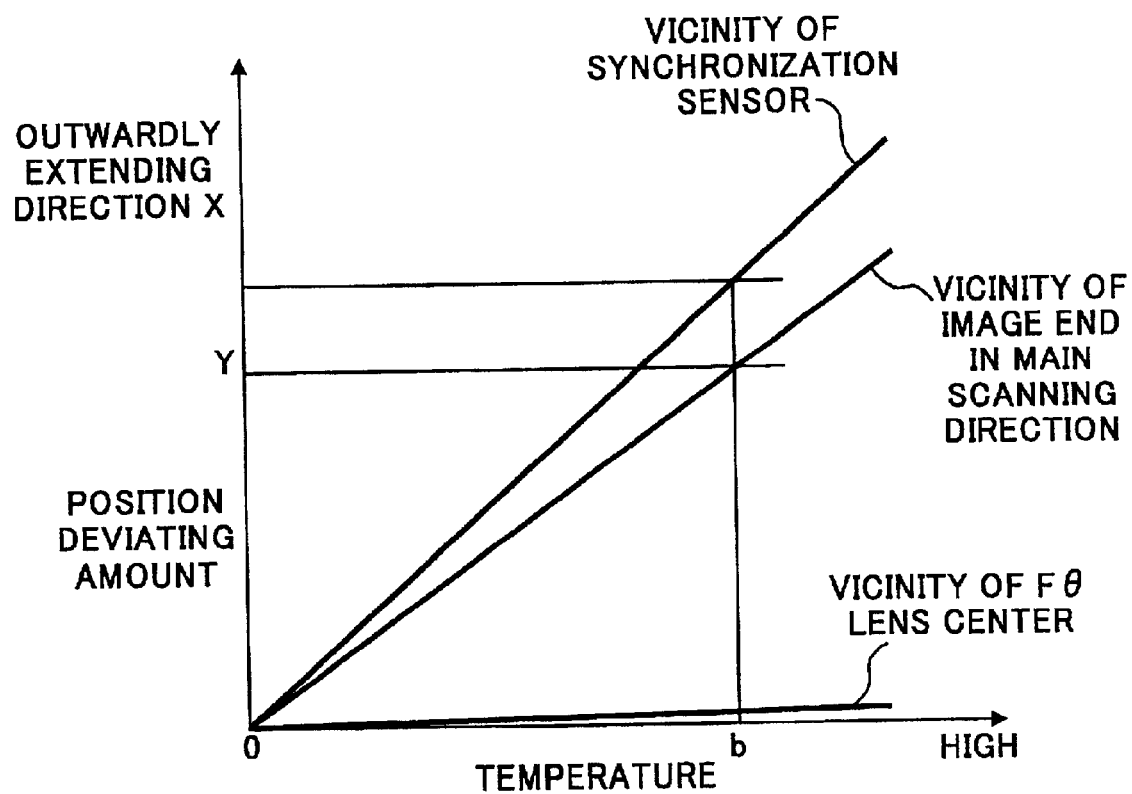
FIG. 26 is a graph illustrating a relationship between a positional deviation amount of the laser beam and temperature in the sixth embodiment.

Now, back to FIG. 20, the fθ lens 103 may include a temperature detection sensor 2004 for detecting temperature of the fθ lens. Temperature data Tt may be generated when an output of the temperature detection sensor 2004 is sent to the temperature detection section 2005. The magnification correction amount storage section 2006 may store a plurality of pairs of frequency setting data for clocks WCLK and PCLK corresponding to the temperature of the fθ lens 103. The frequency setting data may be obtained as listed below from a positional deviation amount of a laser beam L which is caused by a change in temperature of the fθ lens 103 as illustrated in FIG. 26. Each of the frequency setting data may be stored as correction data with temperature Tt as an address.

TABLE

| Temperature | Correction | Data |
|---|---|---|
| T1 | D11 | D12 |
| T2 | D21 | D22 |
| ... | ... | ... |
| Tt | Dt1 | Dt2 |

The correction data may also be determined so that a changing width of a rotation number control clock can be as small as possible. This is especially because less color deviation in the sub scanning direction appears when a multi color image is formed. When temperature data Tt is sent to the magnification correction storage section 2006, the pair of frequency setting data Dt1 and Dt2 may be output corresponding to the temperature data Tt for clocks WCLK and PCLK, respectively. Subsequently, these data may be sent to the magnification correcting section 208, and both of the clocks WCLK and PCLK may be generated.

Figure 21:
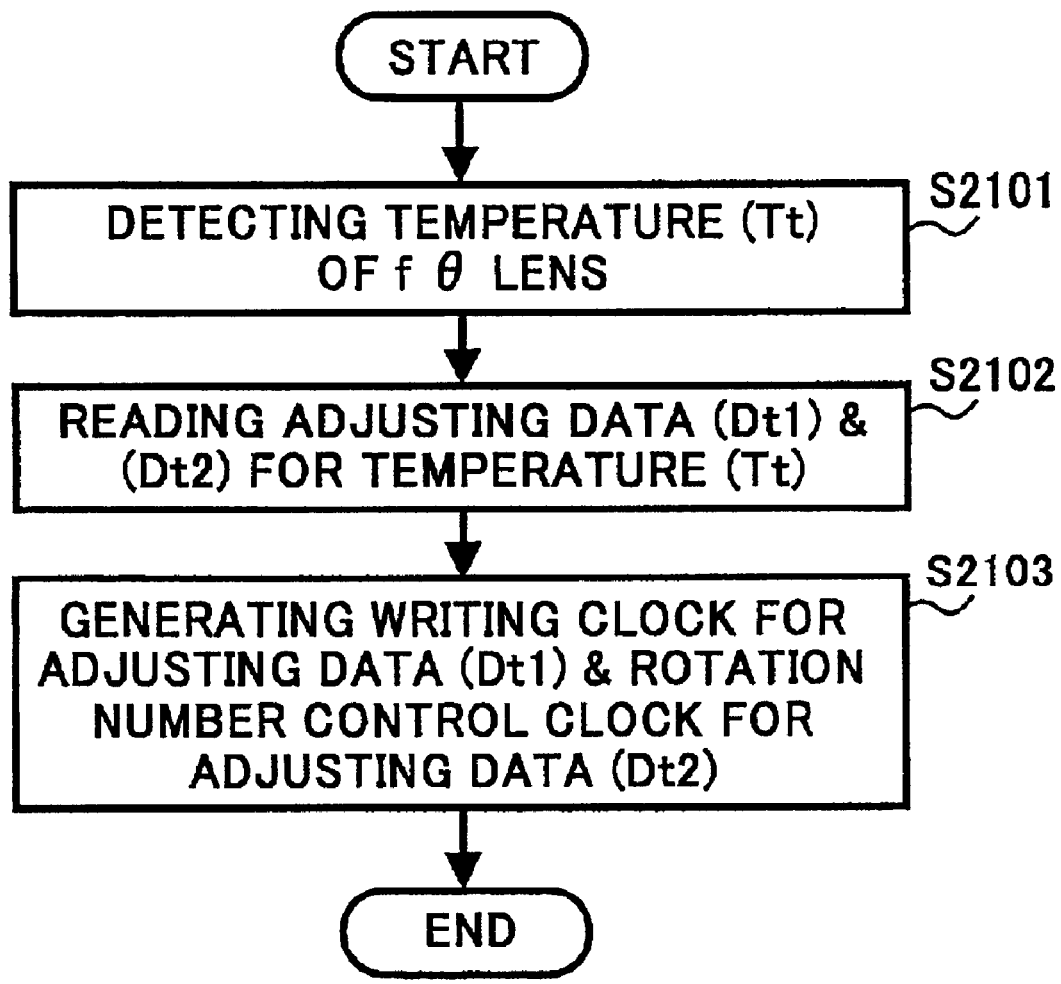
FIG. 21 is a flow diagram illustrating an operational procedure of the magnification correction executed in the sixth embodiment.

FIG. 21 is a flow diagram illustrating an operational procedure for magnification correction executed in the magnification correcting section 208. In the operation, temperature Tt of the fθ lens 103 may be initially detected (in step S2101). The pair of correction data Dt1 and Dt2 corresponding to the temperature Tt may be read from the correction amount storage section 2006 (in step s2102) and are sent to the magnification correcting section 208. Both of the write clock generation section 302 and rotation number control use clock generation section 2201, in the magnification correcting section 208, may generate the write clock frequency WCLK and the rotation number control clock PCLK according to the correction data Dt1 and Dt2, respectively (in step 2103).

Such operational steps may be executed just before an image formation. When a plurality of prints are continuously made, the correction may preferably be executed between sheets (i.e., between image formations) because it is supposed that temperature, and accordingly magnification, changes during printing. If an ordinal sheet gap is too narrow to execute the correction, the gap may be extended only during the correction.

The seventh embodiment will now be described with reference to FIGS. 24 and 25. A construction of an image forming apparatus of the seventh embodiment may substantially be the same as that of the first embodiment illustrated in FIG. 1.

Figure 24:
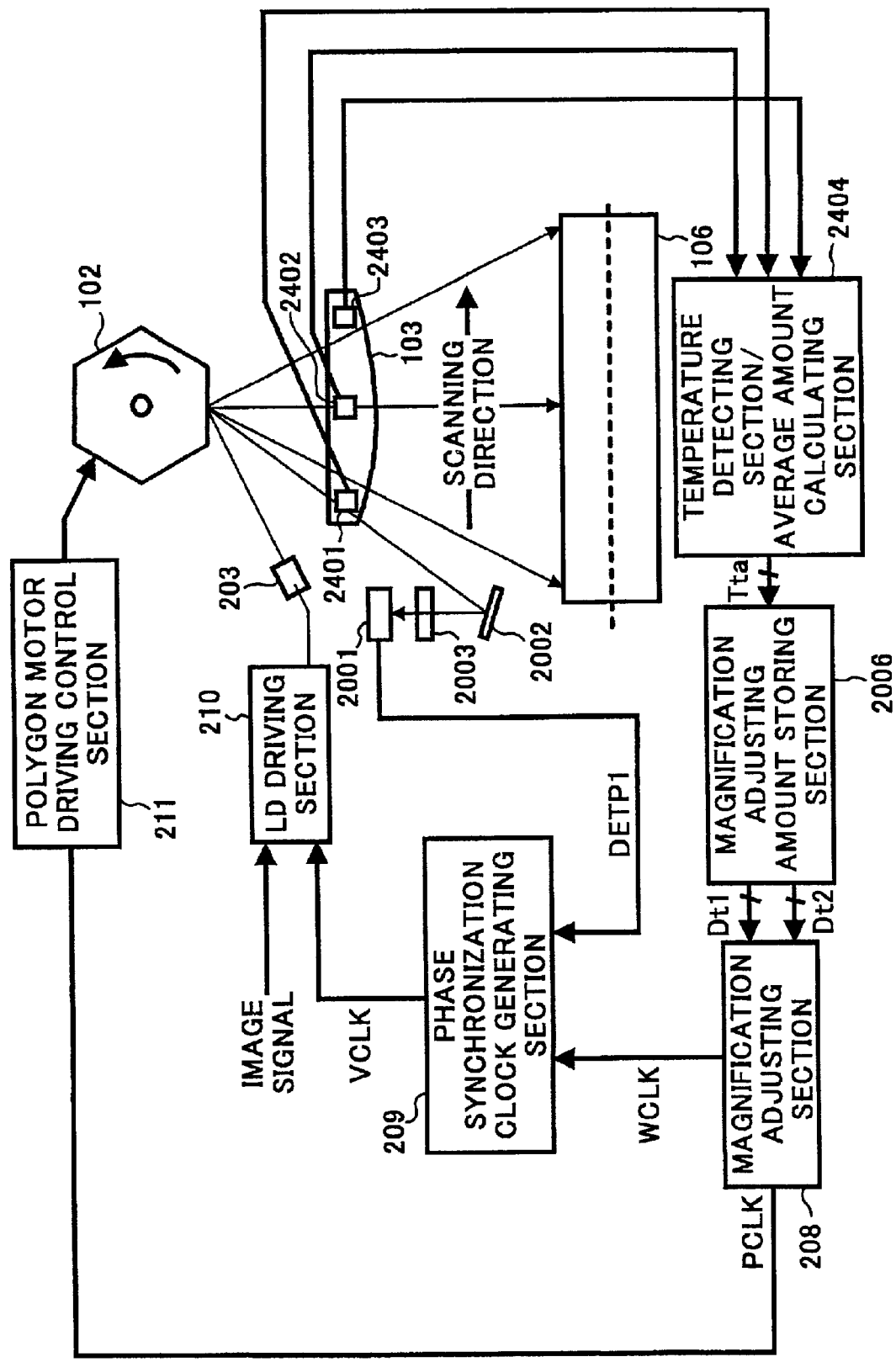
FIG. 24 is a cross-sectional view of an image writing section included in the image forming apparatus of the seventh embodiment which is accompanied by a block diagram illustrating magnification control executed therein.

An image write section of the seventh embodiment is illustrated in FIG. 24. The seventh embodiment may be different from the sixth embodiment by employing a plurality of temperature detection sensors 2401, 2402 and 2403 for detecting temperature of the fθ lens. Contrary to the first embodiment wherein only one temperature detection sensor 2004 is included, the seventh embodiment may include three sensors, for example, positioned at a center and right and left sides of the fθ lens. The temperature detection section 2404 may include a function as an average calculation section for calculating an average of the detected temperature and send the calculated temperature data Tta to the magnification correction amount storage section 2006. The other sections may be constructed in a substantially similar manner to the sixth embodiment.

Figure 25:
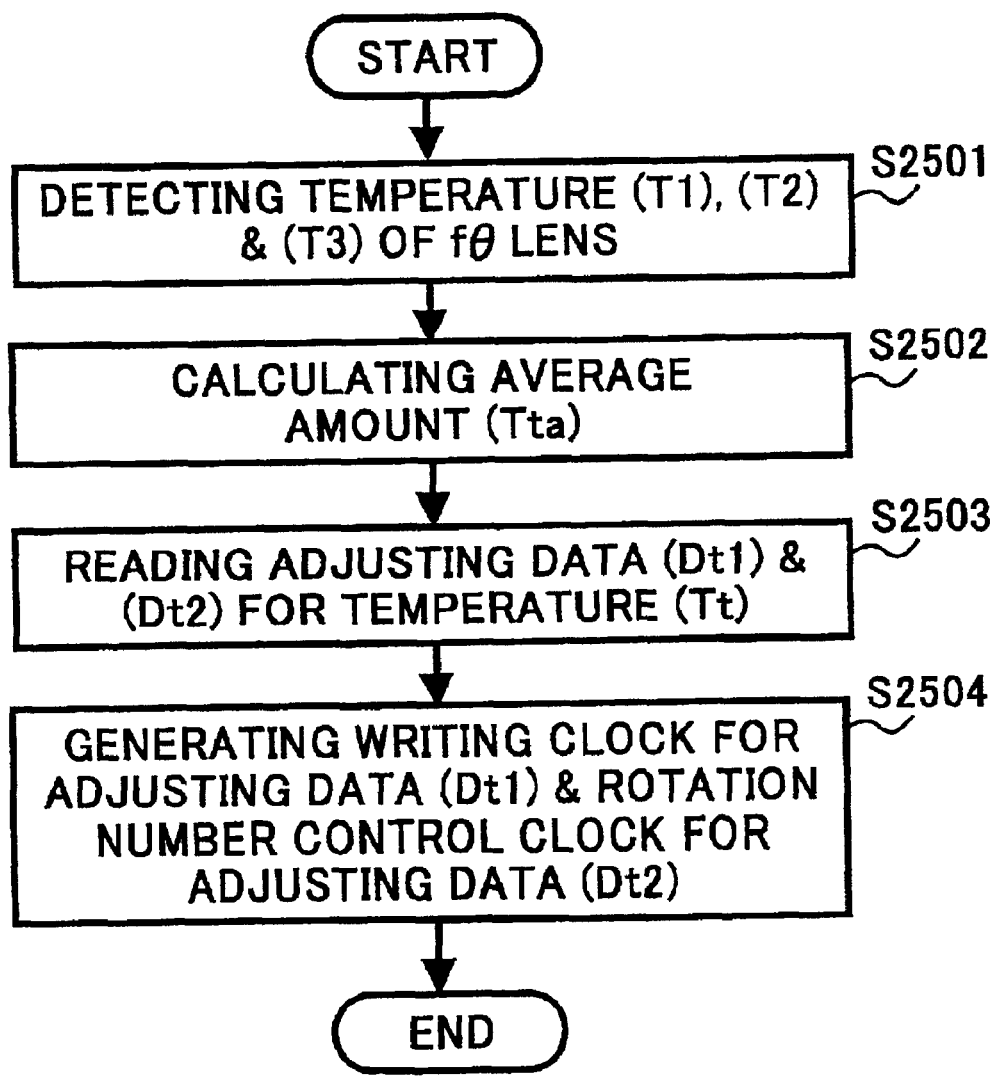
FIG. 25 is a flow diagram illustrating an operational procedure of magnification correction executed in the seventh embodiment.

FIG. 25 is a flow diagram illustrating an operation procedure executed in the magnification correcting section 208 according to the seventh embodiment. All of the temperatures T1, T2, and T3 of the fθ 103 lens may initially be detected (in step S2501). An average Ta of the temperatures T1, T2, and T3 may then be calculated (in step S2502). Then, correction data Dt1 and Dt2 may be read from the correction amount storage section 2006 in accordance with the average temperature Ta (in step S2503) and sent to the magnification correcting section 208. The write clock generation section 302 and the rotation number control use clock generating section 2201, both in the magnification correcting section 208, may generate a prescribed write clock WCLK and a prescribed rotation number control clock PCLK, respectively (in step S2504).

The eighth embodiment will be now described. The image forming apparatus of the eighth embodiment may include substantially the same construction as that of the fourth embodiment illustrated in FIG. 10. Namely, the eighth embodiment may include an image forming apparatus employing a four drum system, wherein four sets of image formation sections and laser beam scanning apparatuses are provided, in order to form a multi color image by superimposing each of four colors (e.g. yellow, magenta, cyan, and black).

In such an image forming apparatus, image magnification correction for each color in the main scanning direction may be executed in a similar manner to those described with reference to the sixth and seventh embodiments.

Specifically, when magnification changes in one or more scanning apparatuses, image deviation accordingly occurs in its main scanning direction. However, the image deviation can be suppressed by appropriately correcting one or more the magnifications.

The ninth embodiment will now be described.

The ninth embodiment may include substantially the same image forming apparatus as that of the eighth embodiment.

Figure 27:
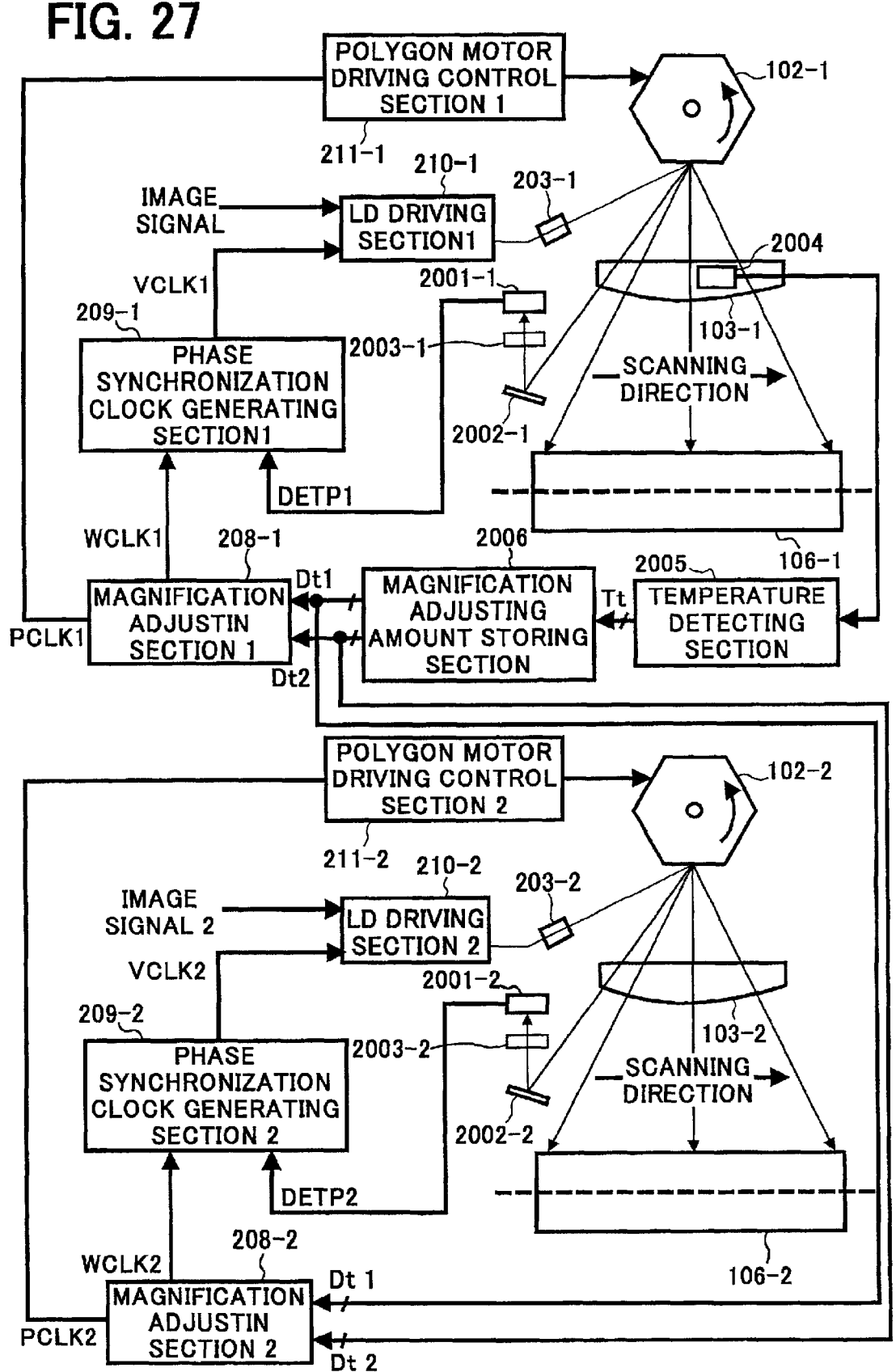
FIG. 27 is a cross-sectional view of a pair of image writing sections of an image forming apparatus of the ninth embodiment, which is accompanied by a pair of block diagrams illustrating magnification, control executed by a common magnification correction amount storage device.

FIG. 27 is a diagram illustrating an image write unit in the image forming apparatus of the ninth embodiment.

One temperature detection sensor 2004 may be provided for detecting temperature of the fθ lens 103 disposed within a laser beam scanning apparatus. Both of a plurality of write clocks WCLK (n) (wherein n varies from 1 to N and N represents the number of laser beam scanning apparatuses) and rotation number control clocks PCLK (n) (wherein n varies from 1 to N and N represents the number of laser beam scanning apparatuses) may be generated in all of the image write units based on temperature detected by the sensor for the purpose of correcting image magnification. In this embodiment, n=2 may be utilized as one example.

The construction may be substantially the same as that illustrated in FIG. 20, and an operational procedure to be executed in the magnification correcting section 208 may also be substantially the same as that described in the sixth embodiment.

Since detection temperature is a typical representative to be referred to when image magnification error is corrected in each of the image write unit, this embodiment is preferably directed to a case in which a temperature difference between the laser beam scanning devices (i.e. fθ lenses 103) is relatively small. As to the scanning device having a temperature detection objective, a prescribed scanning device may be preferable if it has a temperature only slightly different from that of another scanning device. Thus, in the case of the scanner units illustrated in FIG. 10, for example, any one of two central units may be the objective of temperature detection. If only neighboring laser beam scanning units (i.e. fθ lenses 103) have a slight temperature difference, a pair of temperature detection sensors 2004 may be provided to any two laser beam scanning units not neighboring each other. Namely, each of the temperatures may be detected and the magnification of the neighboring laser beam scanning units may be corrected based on the temperature.

Thus, the pair of image write units may necessarily be arranged in such a situation in a manner as illustrated in FIG. 27.

The other sections may be constructed in a similar manner to that of the sixth embodiment.

The tenth embodiment will now be described. A construction of an image forming apparatus of the tenth embodiment may substantially the same as that described with reference to FIG. 11. A laser beam scanning apparatus of the tenth embodiment may be different from that of the ninth embodiment as follows.

A plurality of image formation units arranged around a PC member of the tenth embodiment may substantially be the same as those of the ninth embodiment. The laser beam scanning device of the tenth embodiment may employ a polygon mirror which deviates and scans different colors of laser beams by its upper and lower side surfaces, respectively. In addition, four colors of laser beams may scan the PC members, when distributed and the scans may be performed around the polygon mirror as a swinging center.

Each color laser beam may be deflected by the polygon mirror, may pass through the fθ lens, may be reflected by the first and second mirrors, may pass through the BTL, may be reflected by the third mirror and then may scan the PC member.

Figure 28:
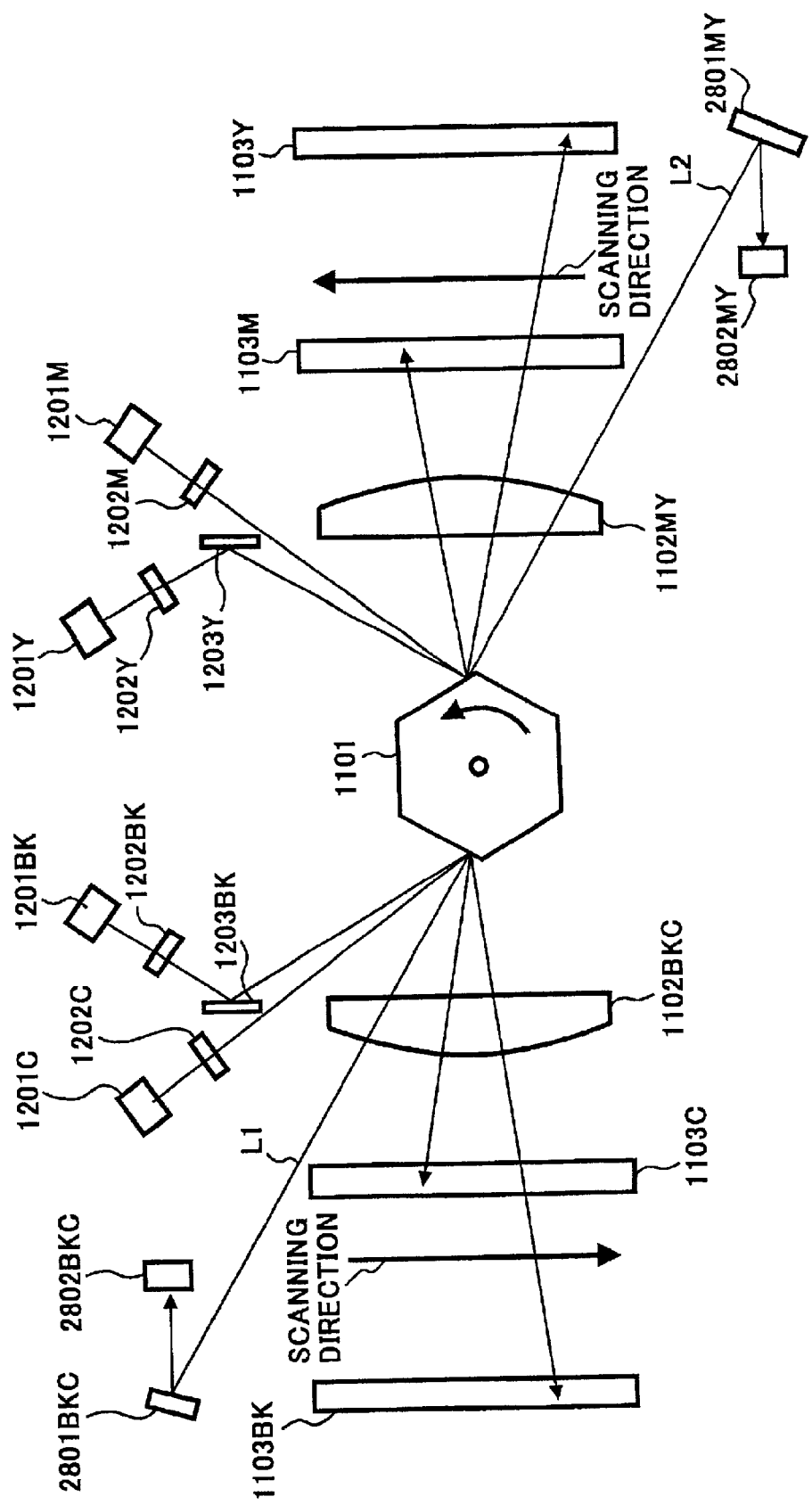
FIG. 28 is a cross-sectional view of a laser beam scanning device in an image forming apparatus of the tenth embodiment.

FIG. 28 is a plan view of the laser beam scanning units illustrated in FIG. 11. Each of laser beams from the LD unit 1201BK and 1201Y may pass through the CYL 1202BK and 1202Y, may be reflected by the reflection mirror 1203BK and 1203Y, respectively, and may enter into a lower side surface of the polygon mirror 1101. The laser beams may be deflected by the rotating polygon mirror 1101, may pass through the fθ lens 1102BK and 1102Y, and may be reflected by the first mirrors 1103 BK and 1103Y.

Similarly, each of the laser beams from the LD units 1201C and 1201M may pass through the CYL 1202C and 1202M, respectively, and enter into the upper side surface of the polygon mirror 1101. The laser beam L2 may be deflected by the rotating polygon mirror 1101, may pass through the fθ lenses 1102C and 1102M, and may be reflected by the first mirrors 1103C and 1103M, respectively.

In the tenth embodiment, a pair of synchronization sensors 2802BKC and 2802MY may be provided prior to an image write start position in the main scanning direction for detecting laser beams L1 and L2, respectively. In addition, the pair of laser beams L1 and L2 passing through the fθ lenses 1102BKC and 1102M may be reflected and condensed by the CMY 2801BKC and 2801MY, respectively, and may enter into the synchronization sensors 2802BKC and 2802MY, respectively. Such synchronization sensors 2802BKC and 2802MY may be provided so as to detect a laser beam scanning synchronization signal as a synchronization detection signal. In this embodiment, both of the laser beams L1 and L2 from the LD units 1201BK, 1201C, 1201Y, and 1201M may use the common CYM 2801BKC or 2801MY and the synchronization sensor 2802BKC or 2802MY. Since two laser beams L1 and L2 enter into the common synchronization sensor 2082BKC and 2082MY, entering timings for the beams may be differentiated so as to be separately detected.

However, two sensors can be provided for each of laser beams L1 and L2. As noted from FIG. 28, scannings for the Y and M processes may be oppositely executed to those for the BK and C color processes.

FIG. 26 illustrates the relationship between a deviation amount of a laser beam passing through the fθ lens in the main scanning direction and changes in the temperature of the scanning device (i.e., fθ lens 1102). As noted therefrom, when the temperature rises from a to b, a position of the beam substantially does not change in the vicinity of the center of the fθ lens 1102 even though the temperature has increased. However, the laser beam may deviate outwardly in the main scanning direction by a larger amount, the closer it is to the ends of the fθ lens 1102. Such phenomenon may also appear in an opposite side of the fθ lens 1102.

Thus, when the temperature is (b), an image may be enlarged by double of the deviation amount Y in the vicinity of the image ends in the main scanning direction, and is different from when the temperature is (a). In addition, a difference 'X–Y' between the vicinity of the synchronization sensor and that of the image ends may be a write start positional changing amount in the main scanning direction.

Figure 29:
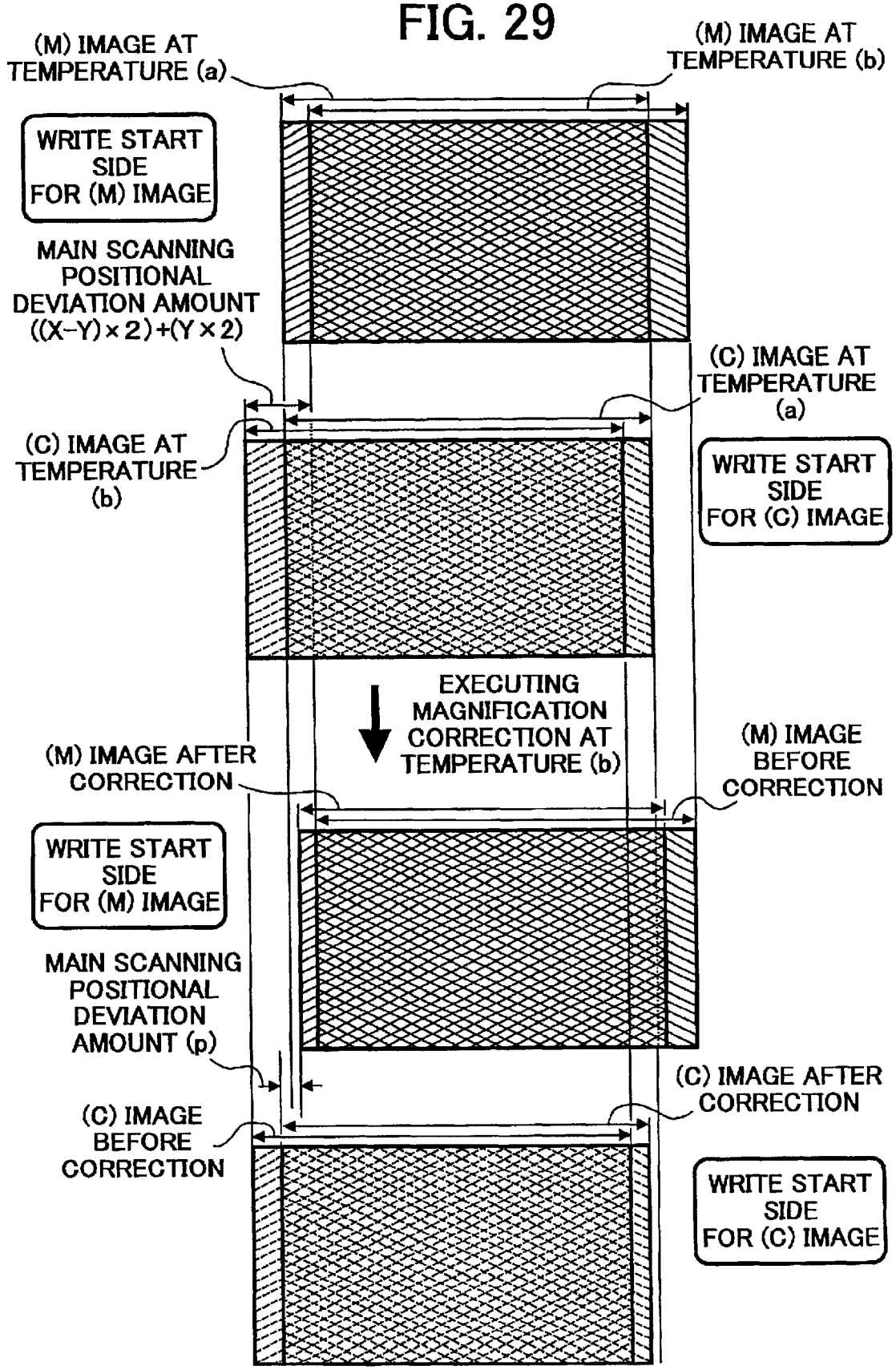
FIG. 29 is a diagram illustrating typical models for showing positional deviating condition of a plurality of mono color images in the main scanning direction, which are cause by temperature change and the magnification correction executed in the ninth embodiment.

FIG. 29 illustrates an image positional moving amount in the main scanning direction when magnification correction is executed. Since each laser beam is distributed and scans using the polygon mirror 1101 as a swinging center, image magnification change, described with reference to FIG. 26, may create and present image position movement in the main scanning direction. If magenta and cyan images (M) and (C) are to be formed, for example, the scanning directions for the two colors may be opposite of each other. Even if each of the color images is separately illustrated up and down for purpose of easy comprehension, those two color images are superimposed on the other. In addition, a write start position for the M image are supposed to be on a left side, and the write start position for the C image are supposed to be on a right side. Further, both the magnification and the write start position are supposed to change by substantially the same amount as to both of the M and C images. In addition, both ends of an image in the main scanning direction to be formed is supposed to correspond to the vicinities of both of the image ends in the main scanning direction illustrated in FIG. 26.

Both magnification and main scanning position of respective M and C images may coincide with each other at temperature (a). When the temperature rises to (b), the M image may be enlarged by (Y×2) and the main scanning direction write start position may deviate rightward by (X−Y), as illustrated in FIG. 26. The C image may be enlarged by (Y×2) and the main scanning direction write start position may deviate leftward by (X−Y). As a result, the M and C images may deviate from each other in the main scanning direction by ((X−Y)×2+(Y×2)). Then, magnification error may be corrected in the above-described manner. When the magnification error has been corrected, the enlarged amount of both of the M and C images can be corrected, but the write start position in the main scanning direction cannot perfectly be corrected and a deviation amount remains by (p).

A correction method for correcting the write start position in the main scanning direction will be now described.

Figure 30:
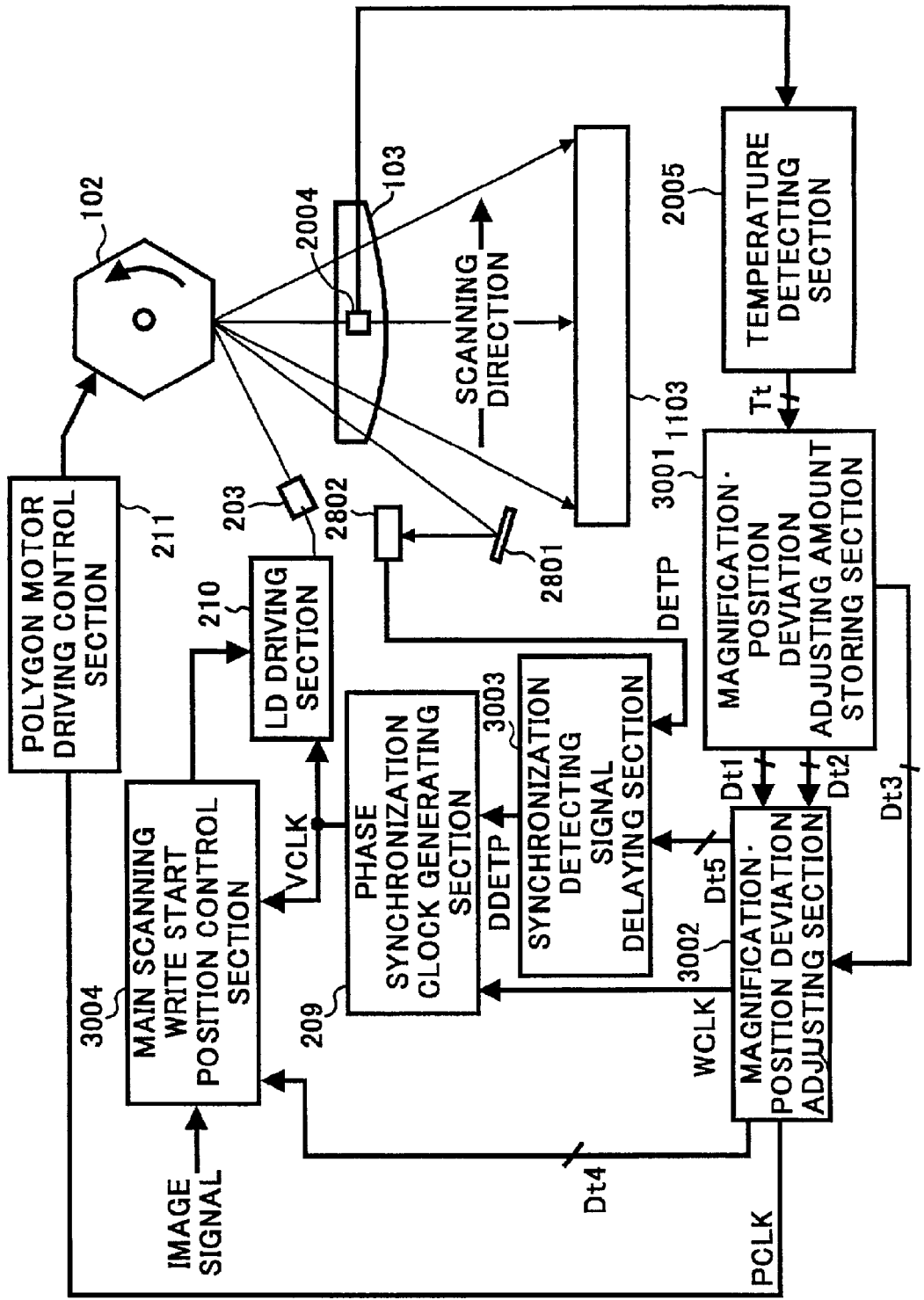
FIG. 30 is a cross-sectional view of an image writing section included in the image forming apparatus of the tenth embodiment, which is accompanied by a block diagram illustrating magnification control executed therein.

FIG. 30 illustrates an image write section that corresponds to the image write section for one of the mono-colors illustrated in FIG. 28. The image write section of this embodiment may be different from that of the sixth embodiment illustrated in FIG. 20 by employing a magnification and positional deviation correction amount storage section 3001. Also, a positional deviation correction section 3002, a synchronization detection signal delay section 3003 for correcting positional deviation, and a main scanning direction write start position control section 3004, may be different from the sixth embodiment. The other sections thereof may be similar to corresponding sections of the image write section of the sixth embodiment.

Similar to the sixth embodiment, a temperature detection sensor 2004 may be provided in the fθ lens 103 for detecting temperature of the fθ lens. Temperature data Tt may be generated when output of the temperature detection sensor 2004 is sent to the temperature detection section 2005. The magnification and positional deviation amount storage section 3001 may store frequency set data for a write clock WCLK, frequency set data for a polygon rotation number control clock PLCK, and image positional deviation correction data, all corresponding to temperature of the fθ lens 103. All these data can be obtained from a positional deviation amount of the laser beam which is produced by a change in temperature of the fθ lens 103. When the temperature data Tt is sent to the correction amount storage section 3001, a pair of frequency set data Dt1 and Dt2 for the write clock WCLK and the polygon rotation number control use clock PCLK, respectively, and image positional deviation correction data Dt3 may be output corresponding to the temperature data Tt. Those output data may then be sent to the magnification and positional deviation correction section 3002.

Figure 31:
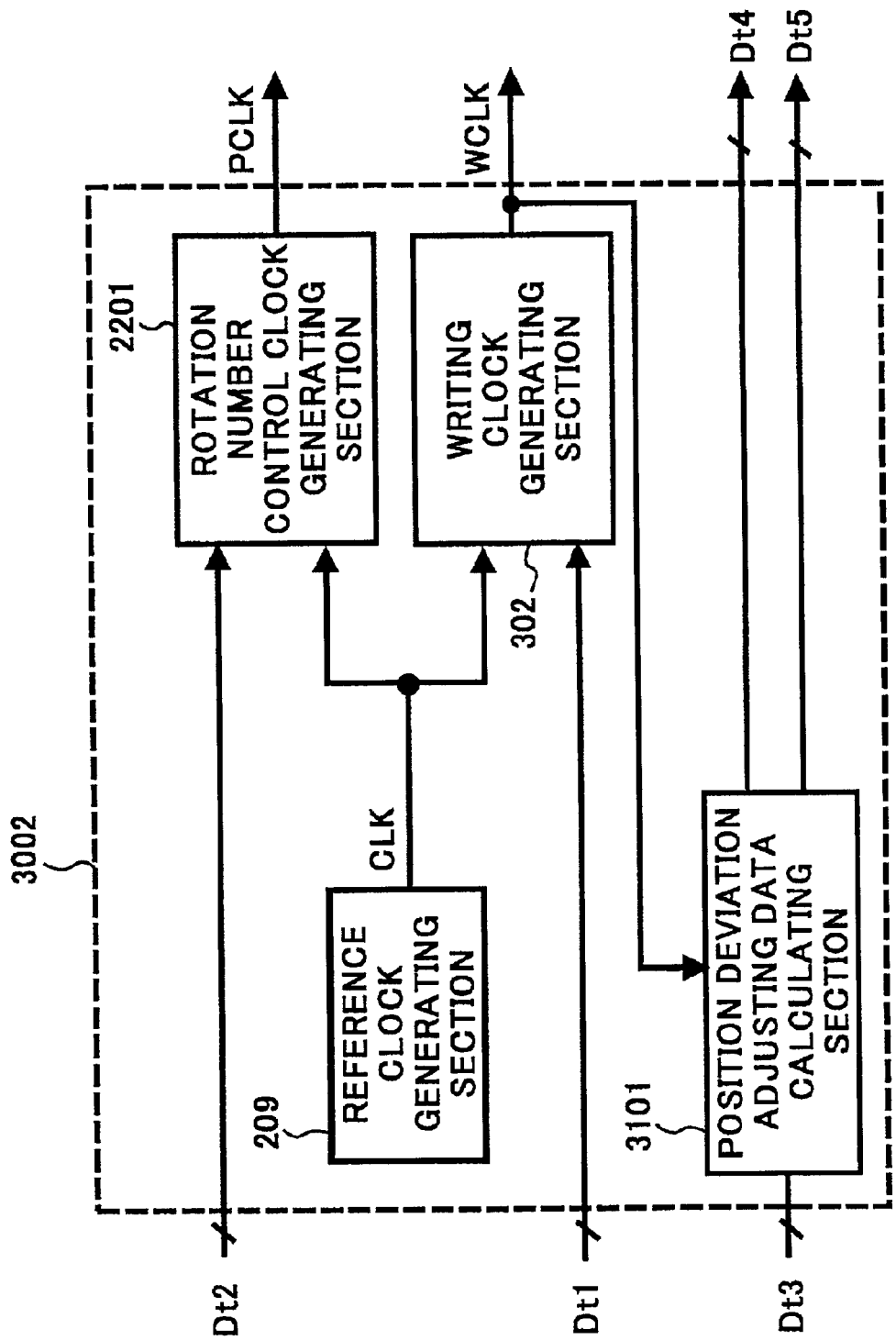
FIG. 31 is a block diagram illustrating a construction of a magnification and positional deviation correcting section of the tenth embodiment.

FIG. 31 illustrates details of the magnification and positional deviation correction section 3002. Similar to the sixth embodiment, a clock CLK from the reference clock generation section 209 may be sent to both of the write clock generation section 302 and the rotation number control use clock generation section 2201. Subsequently, both of clocks WCLK and PCLK may be generated when both of the frequency set data (i.e. correction data) Dt1 and Dt2 are set to the rotation number control use clock generation section 2201 and the write clock generation section 302, respectively. A positional deviation correction data calculation section 3101 may be provided to generate correction data Dt4 having an integer multiple of one cycle of the write clock WCLK, and correction data Dt5 having less than one cycle of the write clock WCLK from both of the write clock WCLK and image position deviation correction data Dt3. Each of the correction data Dt4 and Dt5 may then be sent to respective of the main scanning direction write start position control section 3004 and the synchronization detection signal delay section.

Since the image positional deviation correction data Dt3 may represent a positional deviation amount corresponding to temperature, such as A mm at temperature T1 and B mm at temperature T2, it may be required to be converted into a prescribed form, such as a prescribed number of pixels corresponding to the A mm, so as to accord with a correction manner practiced by the image write section. Thus, even though the image positional deviation correction data Dt3 is the same, positional deviation correction data Dt4 and Dt5 are different from the other depending upon an image write section. At a time of the conversion, since a positional deviation amount is occasionally calculated as if less than one cycle of the WCLK, a deviation amount, which is an integer multiple of one cycle of the WCLK, may be the correction data Dt4, and the deviation amount minus one cycle of the WCLK may be the correction data Dt5.

Back to FIG. 30, the synchronization detection signal delay section 3003 may delay a synchronization detection signal DETP sent from the synchronization sensor 2802 by a prescribed amount corresponding to the positional deviation correction data Dt5. A synchronization detection signal DDETP (delayed detection pulse), which is delayed by the deviation amount of less than one cycle of the WCLK, may then be generated and sent to the phase synchronization clock generation section 209.

The clock WCLK may be changed into a clock VCLK by the phase synchronization clock generation section 209 in synchronism with the DDETP. The clock VCLK may then be sent to both of the LD driving section that controls lighting of the laser (beam) and the main scanning direction write start position control section 3004. The main scanning direction write start position control section 3004 may control a timing of sending an image signal to the LD drive section 210 by a unit of one cycle of the VCLK.

Figure 32:
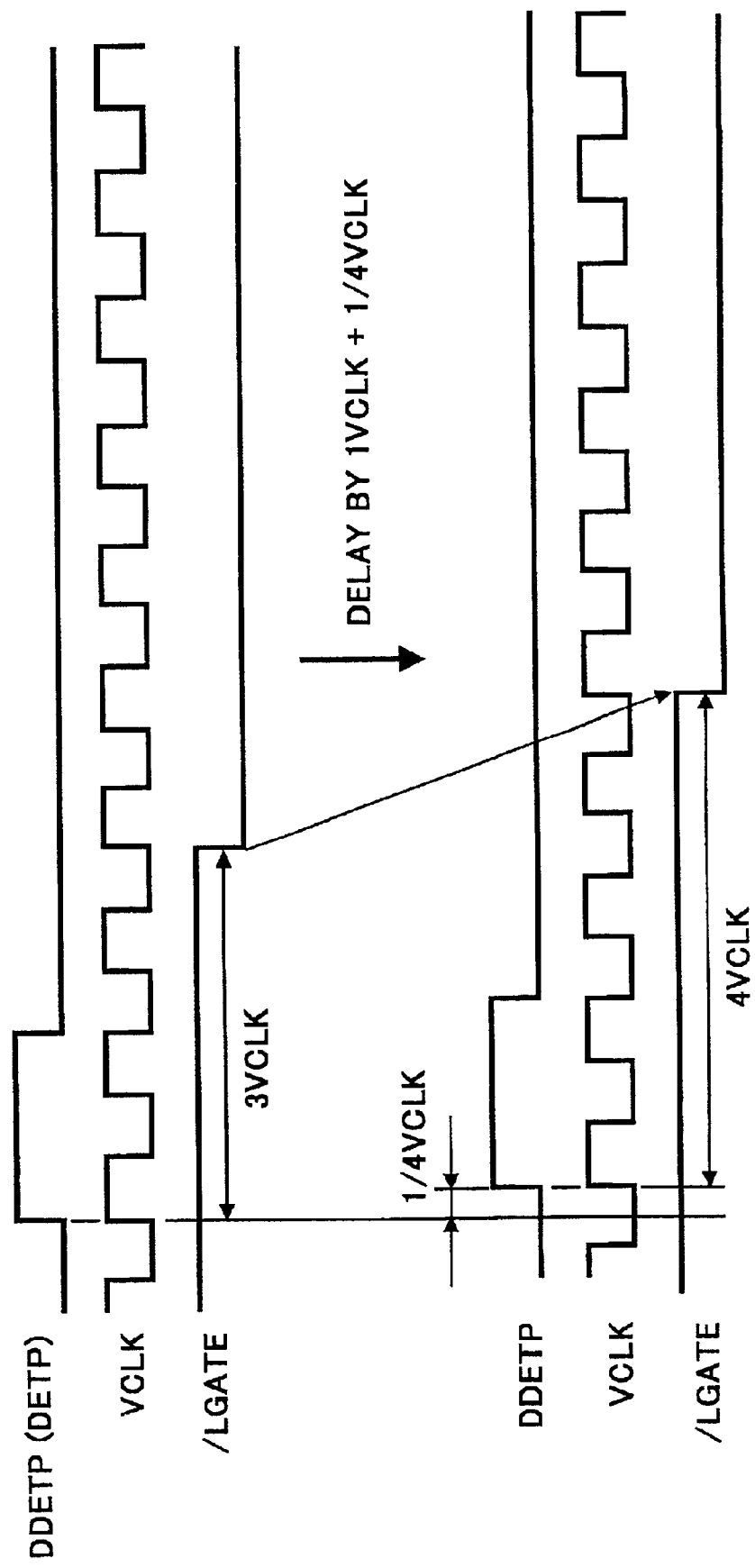
FIG. 32 is a timing diagram illustrating timing of executing main scanning direction write start position correction in the tenth embodiment.

FIG. 32 illustrates a timing diagram illustrating a timing of correction of a write start position in the main scanning direction. As noted from FIG. 32, a stand up edge of the DETP may be a reference for write start in the main scanning direction. The write start may be supposed to be commenced at the third clock of the write clock VCLK. In this situation, the synchronization detection signal delay section 3003 (see FIG. 30) may not delay the DETP. Thus, the DETP may be equal to the DDETP (DETP=DDETP). "/LGATE" may be a gate signal of the main scanning direction. Image data may be sent to the LD drive unit 203 (see FIG. 30) when the "/LGATE" signal is at low level as illustrated in the upper side of FIG. 32.

If the magnification error is to be corrected and the write start position in the main scanning direction is to be delayed by one and a quarter cycles of the VCLK, the synchronization detection signal delay section 3003 may delay the DETP by a quarter cycle of the VCLK and send it to the phase synchronization clock generation section 209. In addition, the main scanning direction write start position control section 3004 may delay the timing of the "/LGATE" by one cycle of the VCLK. As a result, even though the "/LGATE" has been validated when delayed by three clocks as illustrated in the upper side of FIG. 32, it is after the correction validated when delayed by four and a quarter clocks as illustrated in the lower side of FIG. 32. Thus, positional deviation may be corrected by one and a quarter clocks of the VCLK.

Figure 33:
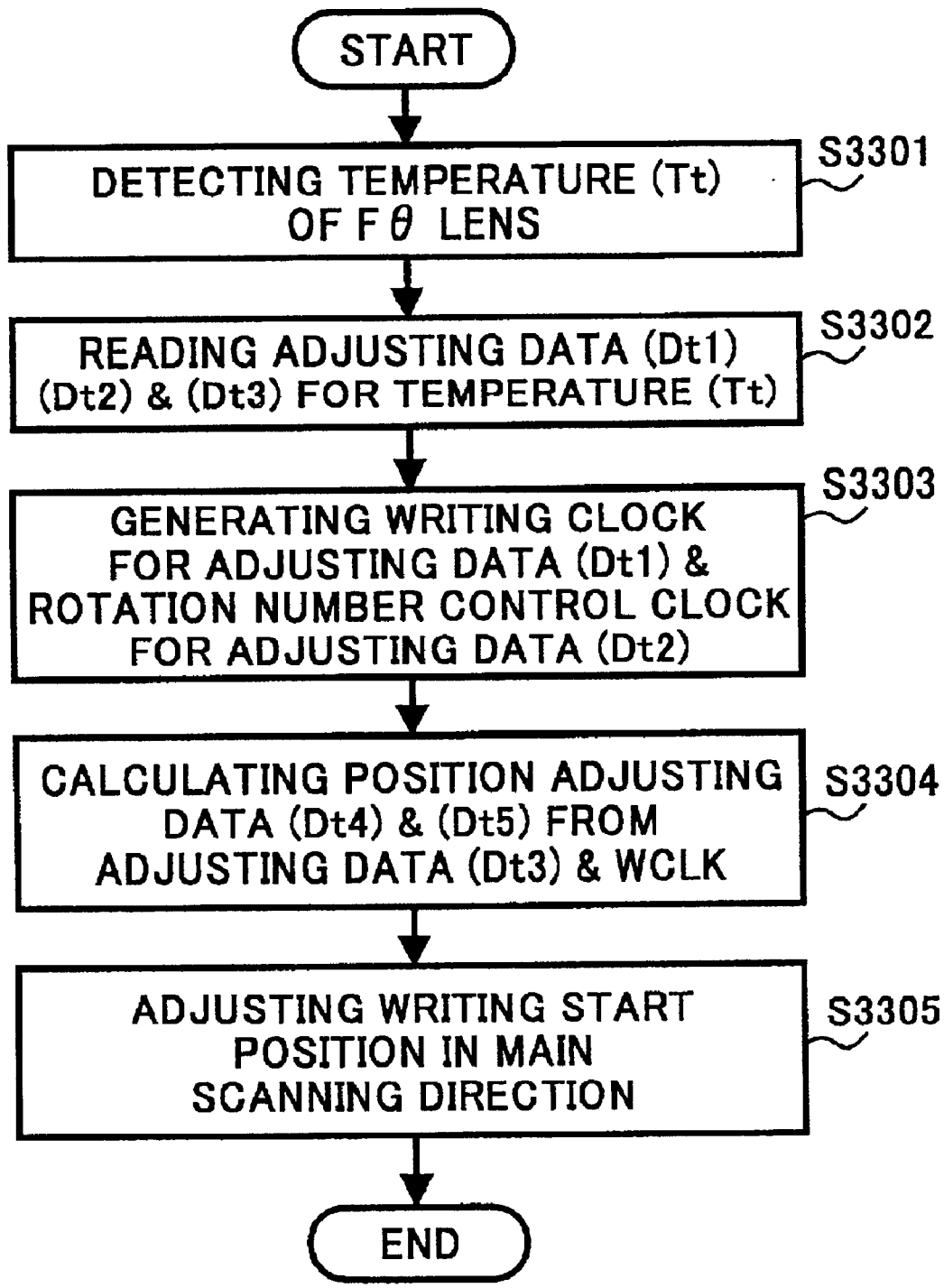
FIG. 33 is a flow diagram illustrating operational procedures of the magnification correction and the main scanning direction write start position correction executed in the tenth embodiment.

FIG. 33 is a flow diagram illustrating an operational procedure of both of the main scanning direction positional correction operation and magnification correction. In this operation, temperature Tt of the fθ lens may initially be detected (in step 3301). A plurality of correction data Dt1, Dt2, and Dt3 corresponding to the temperature Tt may be read from the correction amount storage section 3001 (in step 3302) and may be sent to the magnification and positional deviation correction section 3002. The magnification and positional deviation correction section 3002 may then generate both of a write clock corresponding to the correction data Dt1 and a rotation number control use clock corresponding to the correction data Dt2 (in step S3303). Subsequently, both positional deviation correction data Dt4 and Dt5 may be calculated from the correction data Dt3 and the write clock WCLK generated (in step S3304). Then, the write start position in the main scanning direction may be corrected in accordance with both of the positional deviation correction data Dt4 and Dt5 (in step S3305).

These operations may be practiced just before image formation. When printing is successively executed, since temperature is supposed to change during the printing and result in both magnification change and positional deviation, such operations may preferably be practiced between sheets (i.e. between image formations). If an interval between sheets is too short, it may be extended to a prescribed level so that the above-described operations can be practiced.

The eleventh embodiment will be now described. A construction of an image forming apparatus of the eleventh embodiment may substantially the same as that of the first embodiment.

Figure 34:
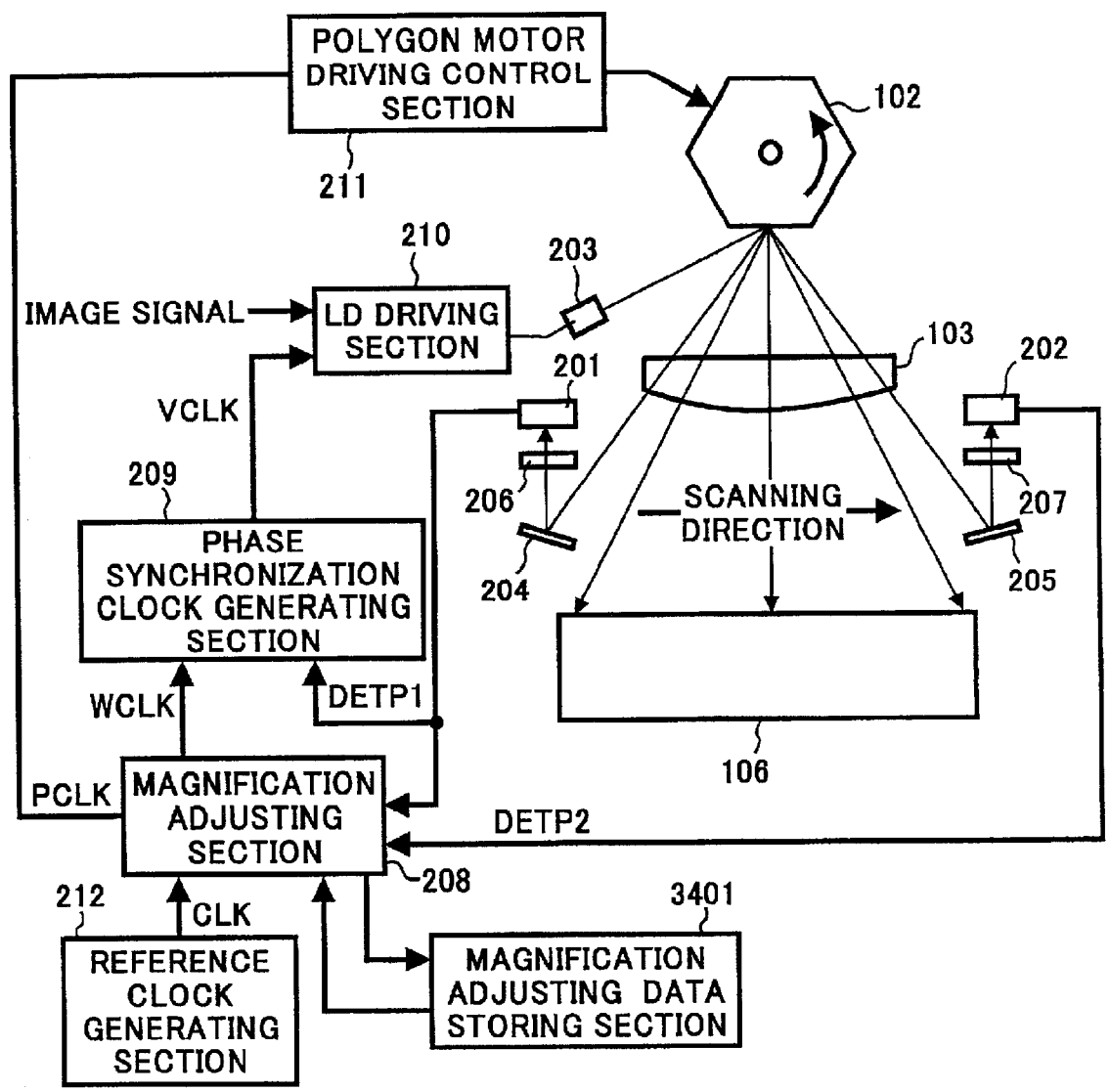
FIG. 34 is a cross-sectional view of an image writing section of an image forming apparatus of the eleventh embodiment, which is accompanied by a block diagram illustrating magnification control executed therein.

FIG. 34 is a plan view of the laser beam scanning apparatus illustrated in FIG. 1, and illustrates an image write section of this embodiment. The image write section may additionally include a peripheral control unit. The image write section may be different from that of the first embodiment by employing a magnification correction data storage section 3401.

Namely, a pair of sensors 201 and 202 may be provided at both sides of the main scanning direction of the laser beam.

The reflected laser beams may pass through the fθ lens and may be reflected by the pair of mirrors 204 and 205. The laser beam L may then be condensed by the pair of lenses 206 and 207 and may enter into the pair of sensors 201 and 202, respectively. The sensor 201 may function as a synchronization detection sensor for detecting a laser beam scanning synchronization signal as a synchronization detection signal.

Owing to scanning of the laser beam, the pair of sensors 201 and 202 may output signals DETP1 and DETP2. The DETP1 and DETP2 may be sent to the magnification correcting section 208.

The magnification correcting section 208 may determine and generate a prescribed clock frequency for modulating a laser beam. In addition, the magnification correcting section 208 may determine and generate a clock frequency for determining a prescribed rotation number of the polygon mirror 102. Further, from a change in image magnification in the main scanning direction that is produced by the above two clock frequencies, a time difference between the DETP1 and DETP2 may be measured. In addition, the magnification correcting section 208 may include a function of changing each of the clock frequencies by referring to such a measuring result and correction data sent from the magnification correction data storage section 3401.

The clock WCLK generated by the magnification correcting section 208 and the synchronization detection signal DETP1 may be sent to the phase synchronization clock generation section 209. A clock VCLK may then be generated by the phase synchronization clock generation section 209 in synchronism with the DETP1, and may then be sent to the LD drive section 210 that controls lighting of the laser beam. On the other hand, the clock PCLK generated by the magnification correction may be sent to the polygon motor drive control section 211, so that the polygon mirror 102 may be controlled to rotate at a prescribed number of rotations in accordance with the frequency of the clock PCLK. The LD drive section 210 may control lighting of the laser beam responsive to an image signal synchronizing with the clock VCLK. The LD unit 203 may generate a laser beam under the control of the LD drive section 210.

The laser beam may then be reflected by the polygon mirror 102 and may scan the PC member 106 after passing through the fθ lens 103.

Figure 35:
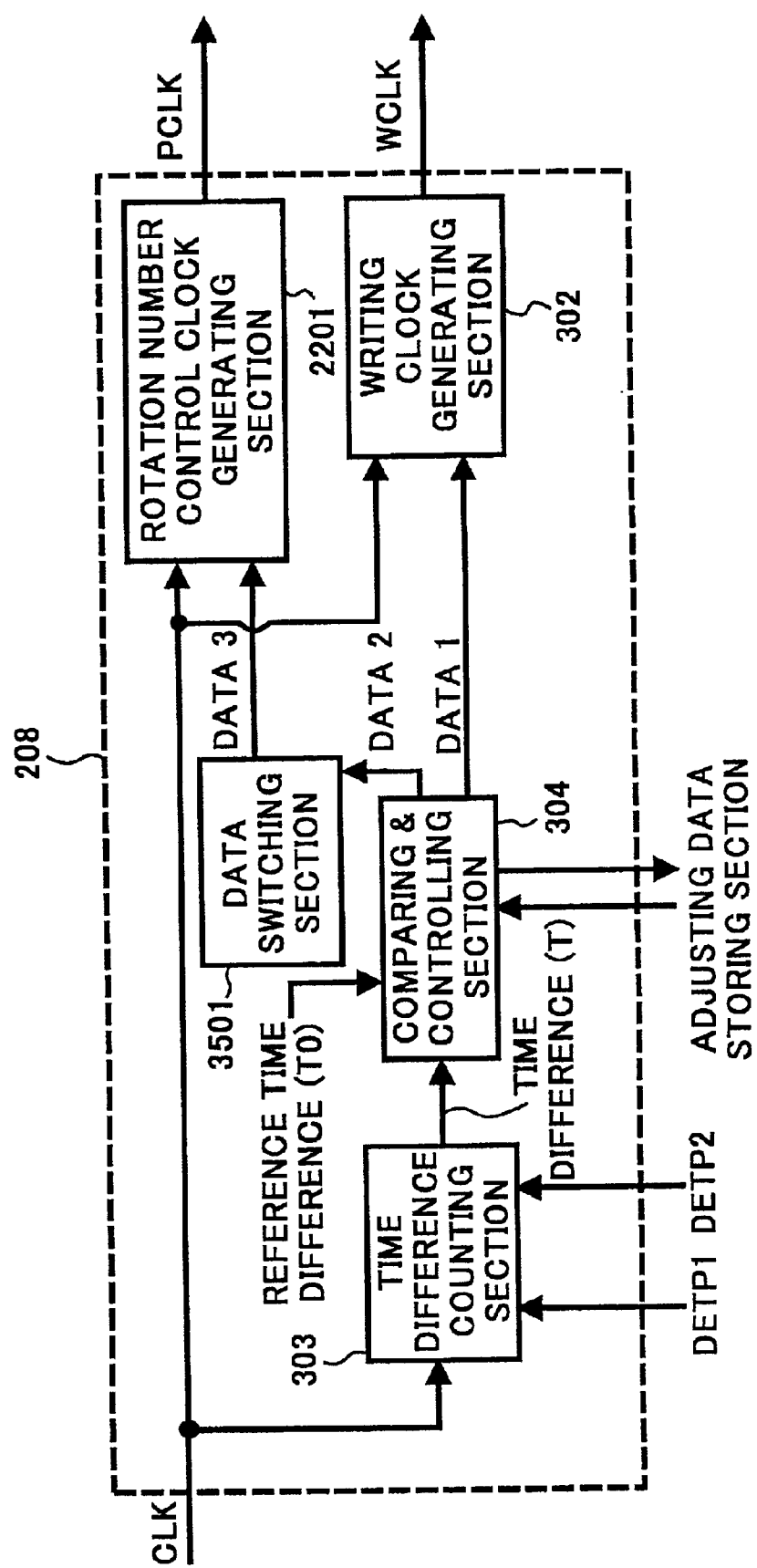
FIG. 35 is a block diagram illustrating a construction of a magnification correcting section of the eleventh embodiment.
Figure 36:
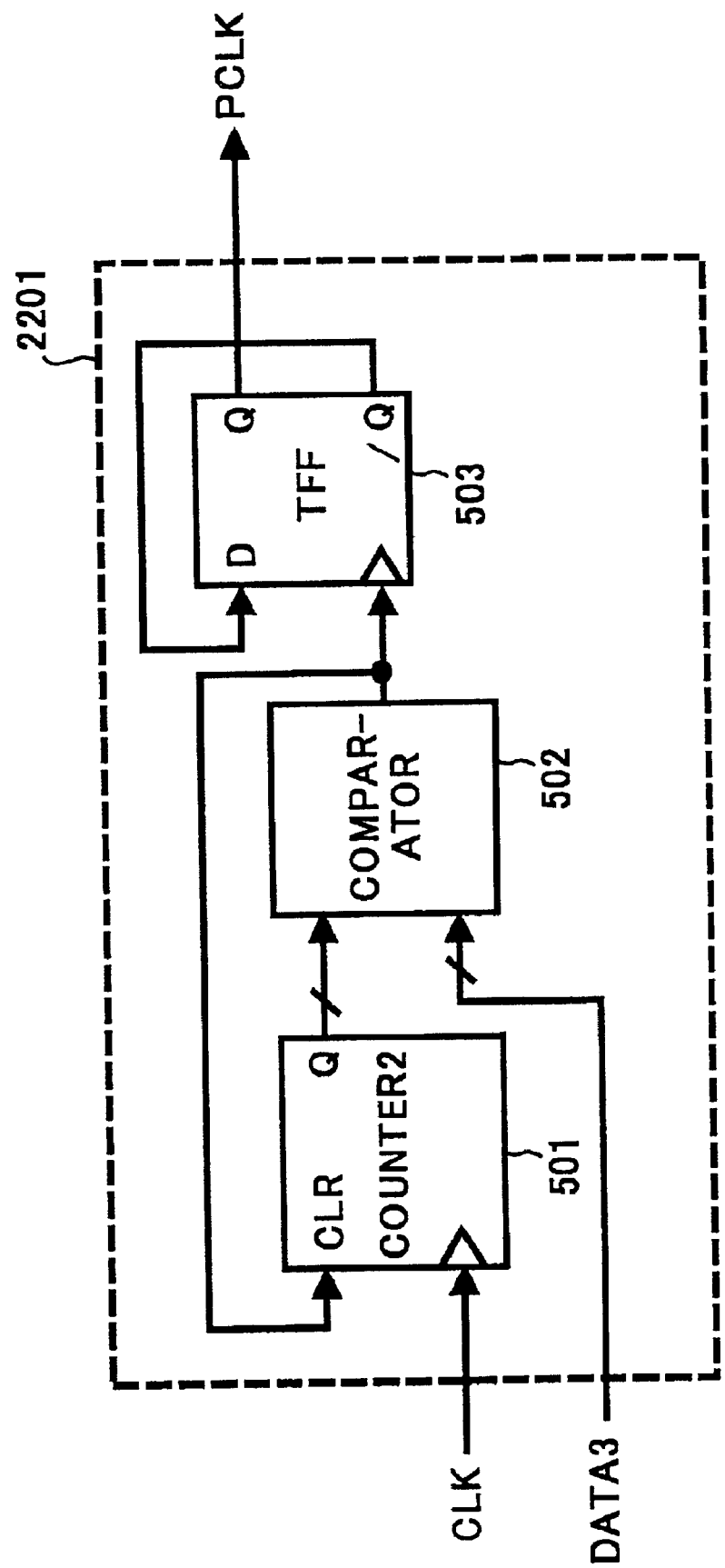
FIG. 36 is a block diagram illustrating a construction of a rotation number control clock generating section of the eleventh embodiment.
Figure 37:
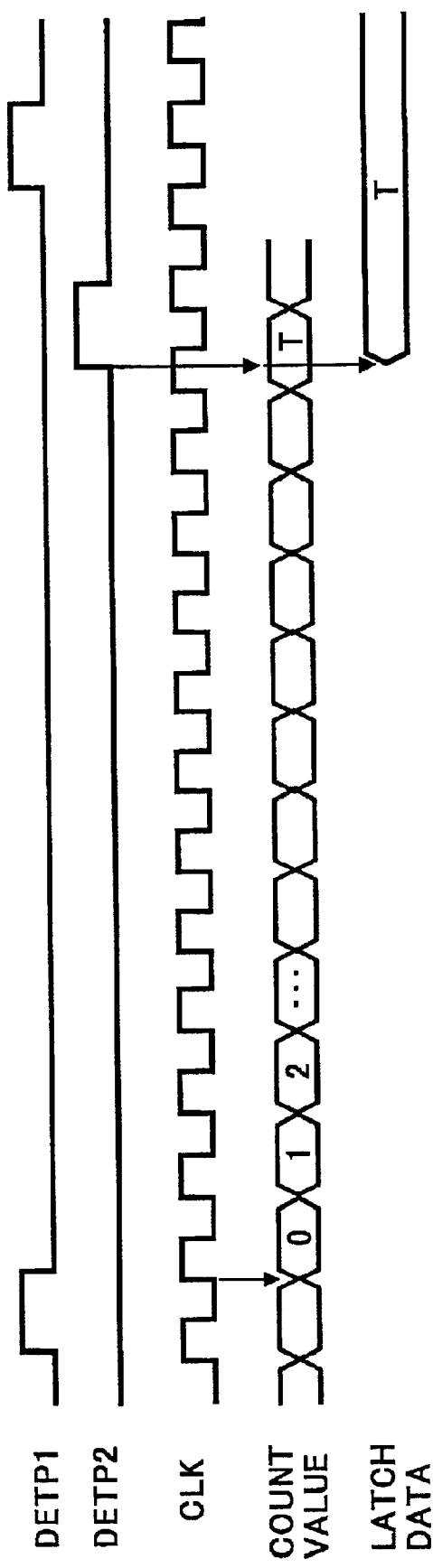
FIG. 37 is a timing diagram illustrating signal generation timing in a time difference counting section of the eleventh embodiment illustrated in FIG. 35.

FIG. 35 is a block diagram illustrating a construction of the magnification correcting section 208 illustrated in FIG. 34. The clock CLK from the reference clock generation section 212 may be sent to both of the polygon motor use rotation number control clock generating section 2201 and the write clock generation section 302, so that clocks WCLK and PCLK may be generated by the data 1 and 3, respectively. As illustrated in FIG. 36, the polygon motor rotation number control clock generation section 2201 may include a counter 501, a comparator 502, and a T-flop flop 503, and may generate the clock PCLK by setting a half cycle of necessary frequency minus one to the comparator 502. Thus, such an amount may necessarily be set to the data 3.

In this embodiment, a time difference T between the DETP1 and DETP2 may be measured and sent to the comparing and controlling section 304 with the help of the reference clock CLK.

The time difference count section 303 may be similar to that of the first embodiment illustrated in FIG. 4. However, as noted from FIG. 4, the counter 401 may be cleared by the DETP and may start counting clocks CLK. A count value obtained by the counting may be sent to the latch 402, which is latched by a stand up edge of the DETP2. Such timing may be illustrated in a timing diagram of FIG. 37.

In addition, as noted from FIG. 35, the time difference count section 303 may send the time difference T (a count value) to the comparing and controlling section 304, and then be compared with the reference time difference T0. Both of correction data 1 and 2 may be read from the correction data storage section 340 (see FIG. 34) in accordance with the comparison result.

These correction data 1 and 2 may then be sent to both of the write clock generation section 302 and the data switching section 3501. When the data switching section 3501 receives the magnification correction use data from the comparing and controlling section 304 during the sending of the data 3 to the rotation number control clock generation section 2201 to rotate the polygon motor 101 at a prescribed low speed, the data switching section 3501 may switch data in a prescribed manner, so that the data 2 is equal to the data 3. Both of clocks WCLK and PCLK may then be generated.

Figure 38:
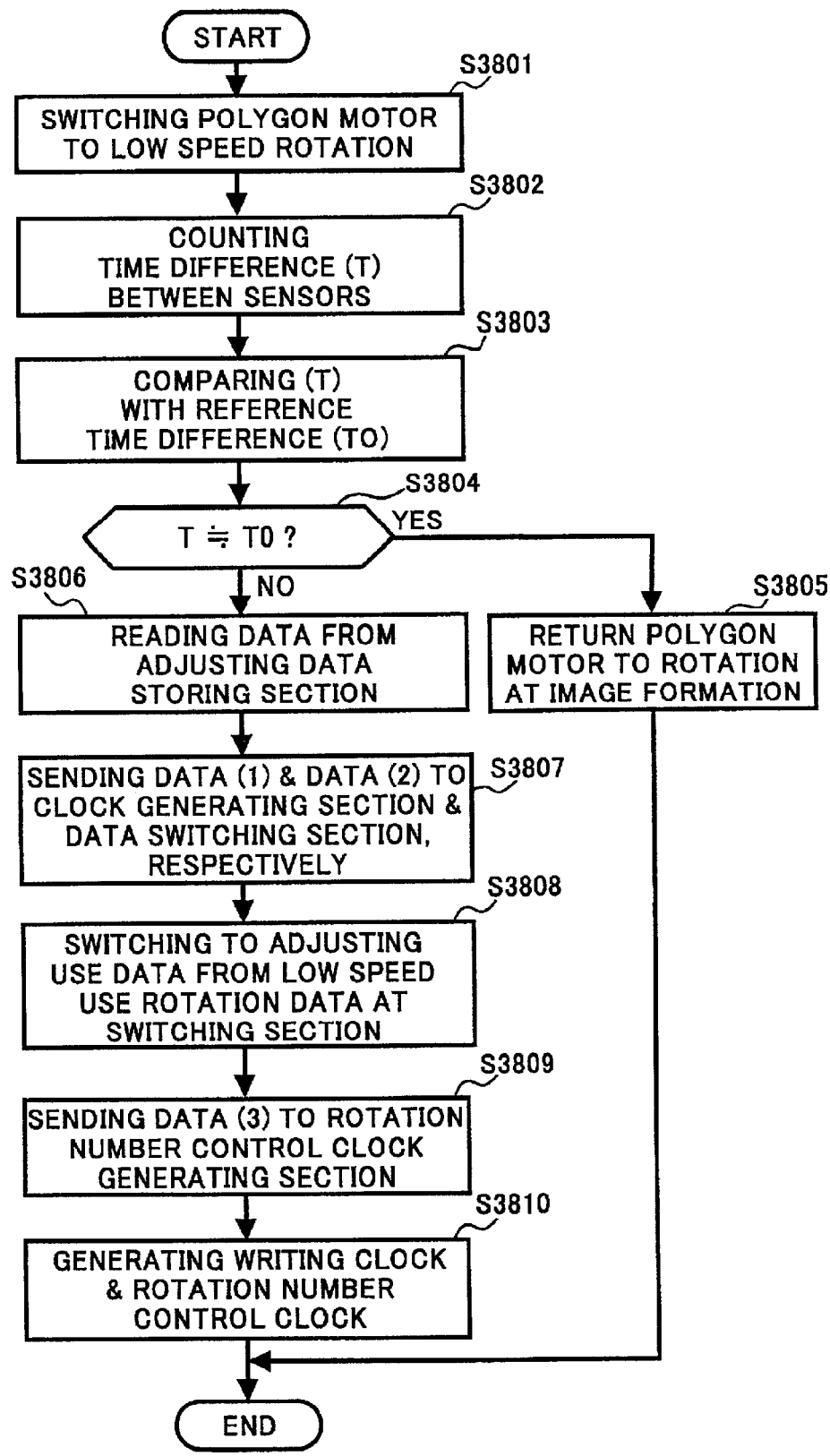
FIG. 38 is a flow diagram illustrating an operational procedure of the magnification correcting section of the eleventh embodiment.

FIG. 38 is a flow diagram illustrating an operation procedure executed in the magnification correcting section 208.

The polygon motor may be switched to low speed rotation (in step S3801). For example, if the practically used polygon motor 101 can change its rotation number ranging from 10,000 to 20,000 rpm, it is switched to the lowest rotation number 10,000 rpm. Then, a time difference T between the sensors 201 and 202 may be counted (in step S3802) and compared with the reference time difference T0 (in step S3803). If the time difference T is substantially equal to the reference time difference T0 (Yes, in step S3804), a rotation number of the polygon motor 101 may be returned to a condition at the time of image formation (e.g. 20,000 rpm), and the operation may be completed. In this situation, both of the write clock WCLK and the polygon use clock PCLK may not be changed because an image is not enlarged in the main scanning direction.

If the time difference T is not equal to the reference time difference T0 (No, in step S3808), the correction table in the correction data storage section 3401 may be referred to (in step S3806). The correction data 1 and 2 corresponding to the difference between the time difference T and the reference time difference T0 may be sent from the comparing and controlling section 304 to the clock generation section 302 and the data switching section 3501, respectively (in step S3807). Since the difference rarely perfectly coincides with data of the correction use table, the closest data may be necessarily selected. The data switching section 3501 may switch from low speed rotation data to correction data (in step S3808) and the send the data 3 (=data 2) to the rotation number control clock generation section 2201 (in step S3809). The clock generation sections 302 and 2201 may generate both of a write clock WCLK and a rotation number control clock PCLK, respectively, corresponding to both of the correction data 1 and 3 (i.e. =2), respectively (in step S3810).

When comparing the time difference T with the reference time difference T0, determination may essentially be as to whether one is perfectly equal to the other. However, the time difference T may be determined as not different from the reference time difference T0, if the difference therebetween is within a prescribed allowable magnification error range. Thus, when the time difference is larger than the prescribed allowable magnification error range, both of the write clock frequency and the rotation number control clock frequency may be changed.

As illustrated in FIG. 13, an amount of positional deviation of the laser beam which is created by temperature change causes the laser beam to expand and accordingly, the image is enlarged as the temperature rises. On the other hand, as illustrated in FIG. 14, a change in time difference between sensors which is produced by temperature change causes an increase in the temperature and may result in a shortening of the time difference.

Since a magnification changing amount can be known from the time difference comparison result, namely, from the relationship between the positional deviation amount and the temperature difference, the correction use table may be preferably formed based on the relationship. Since there is a slight difference that never becomes large depending upon a lens or an image forming apparatus, a representative amount can preferably be measured beforehand.

It is also preferable that the lowest number rotations be utilized so that uneven rotation, jitter, etc. do not appear when lowering the rotation speed of the polygon motor.

The twelfth embodiment will now be described. Both of an image forming apparatus and an image write section having substantially the same constructions, respectively, as those of the first embodiment illustrated in FIGS. 1 and 2 may be included in this embodiment.

Figure 39:
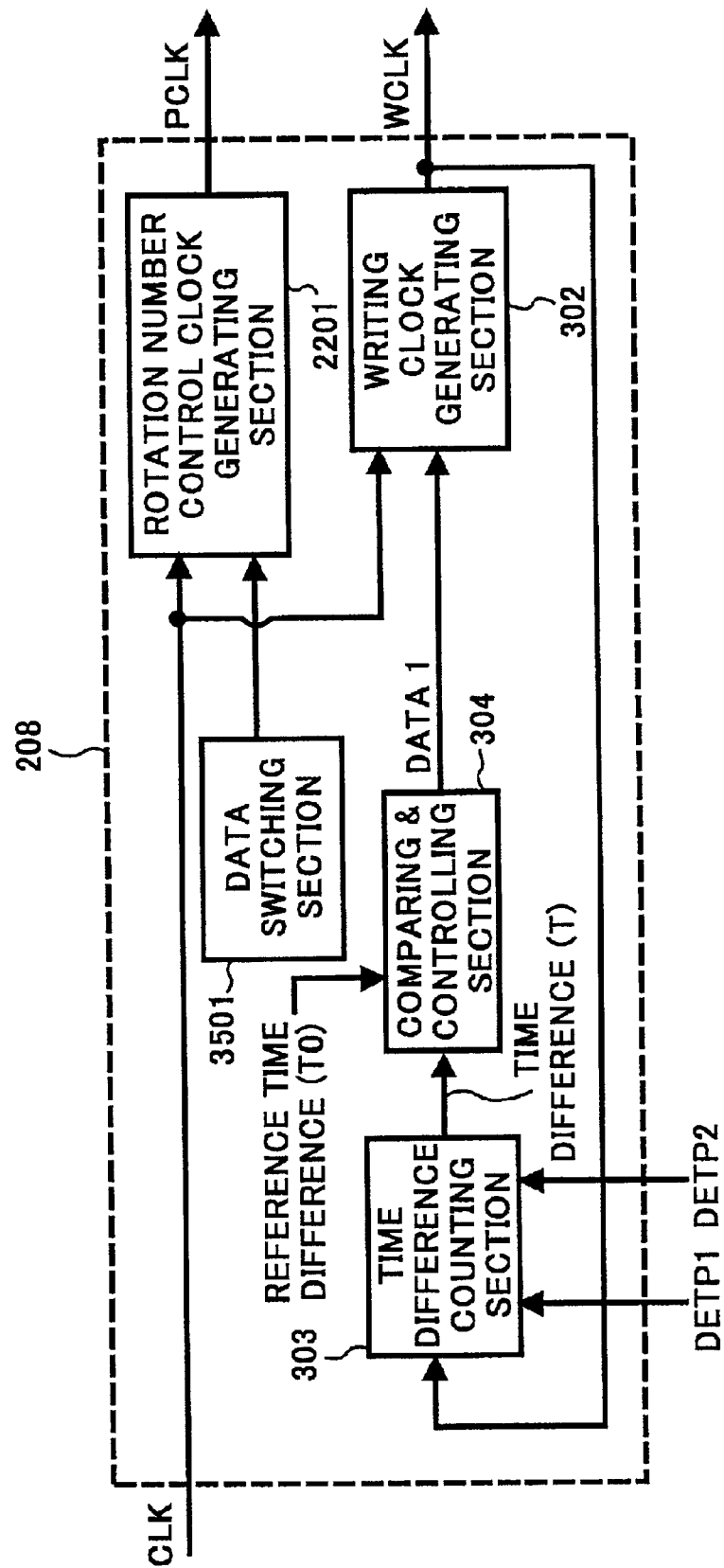
FIG. 39 is a block diagram illustrating a construction of a magnification correcting section of the twelfth embodiment.

FIG. 39 is a block diagram illustrating a construction of a magnification correcting section 208 of the twelfth embodiment. The difference from the eleventh embodiment illustrated in FIG. 35 may be that the time difference count section 803 in this embodiment may count time difference using write clocks WCLK, not using the reference clock CLK. Also, the difference may be that the comparison result may not be sent to the data switch section 3501 and magnification correction may be executed only by changing the write clock WCLK. In addition, the data switch section 3501 may switch data to be sent to the rotation number control clock generation section 2201 in response to a change from magnification correction to image formation, vice versa. The other sections in this embodiment may be similarly constructed to those of the eleventh embodiment.

Figure 40:
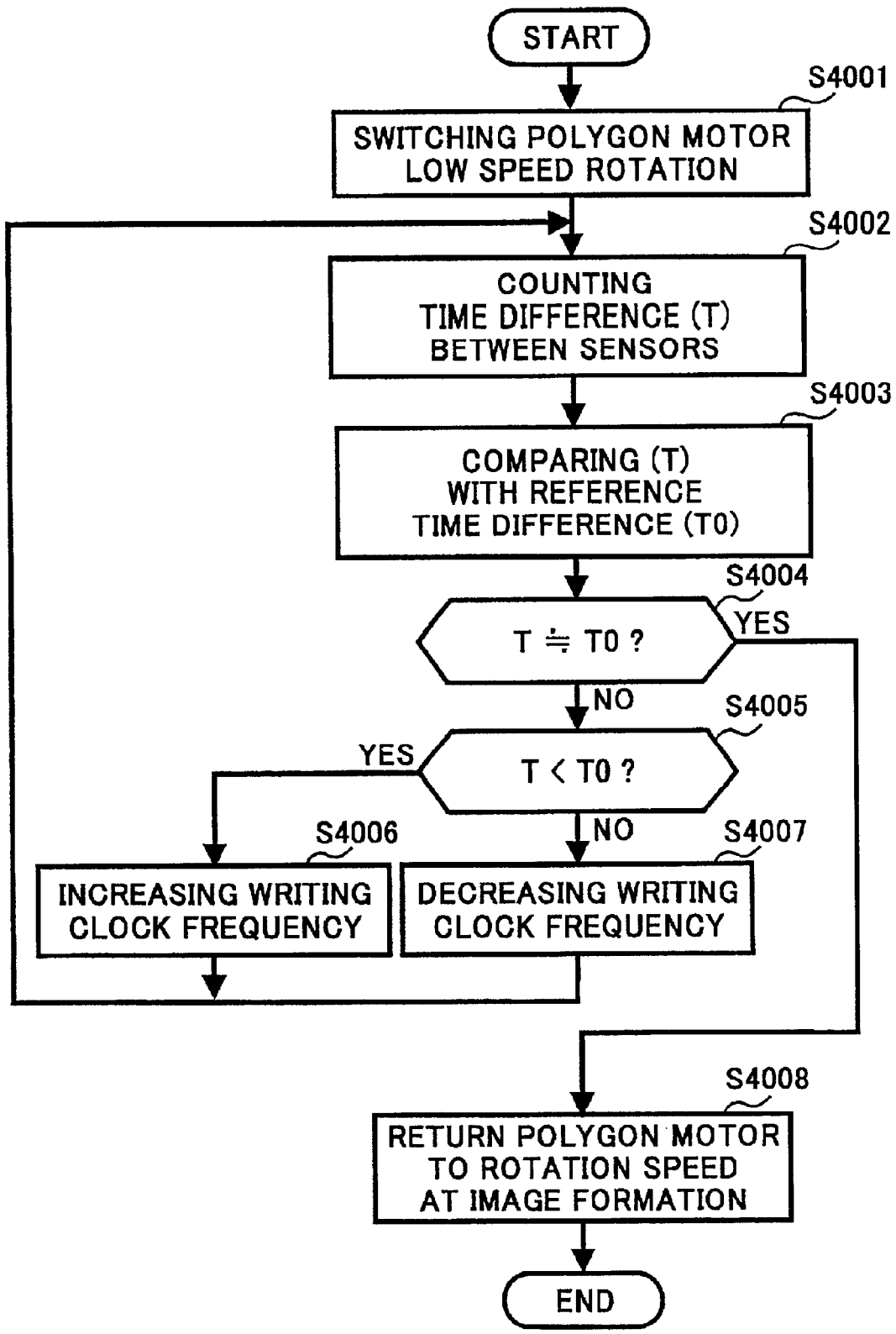
FIG. 40 is a flow diagram illustrating an operational procedure of the magnification correcting section of the twelfth embodiment.

FIG. 40 is a flow diagram illustrating an operational procedure executed in the magnification correcting section 208 of this embodiment. When low speed rotation use data is initially sent from the data switch section 3501 to the rotation number control clock generation section 2201, the polygon motor 101 may be switched to low speed rotation (in step S4001).

For example, when the polygon motor 101 can change its rotation number ranging from 1,000 to 20,000 rpm, it is switched to the lowest 10,000 rpm. Then, the time difference T between sensors 201 and 202 may be counted (in step S4002) and compared with the reference time difference T0 (in step S4003). If the time difference T is substantially equal to the reference time difference T0 (Yes, in step 4004), the rotation number of the polygon motor 101 may be returned to an image formation condition such as 20,000 rpm for the purpose of image formation (in step 4008). The operation may then be completed.

Thus, the write clock WCLK may not be changed.

If the time difference T is smaller than the reference time difference T0 (No, in step 4004, and Yes, in step 4005), since an image is enlarged in the main scanning direction, the write clock frequency may be increased (in step 4006). If the time difference T is larger than the reference time difference T0 (No, in step 4005), since an image is reduced in the main scanning direction, the write clock frequency may be decreased (in step 4007).

Subsequently, the flow returns to step S4002 and the time difference T may be counted again and compared with the reference time difference T0. Such operation steps may be repeated until when the time difference T is substantially equal to the reference time difference T0 (steps S4002–S4007).

As described earlier, the write clock frequency may be changed only when the difference between the time difference T and reference time difference T0 exceeds a prescribed level that corresponds to the magnification allowable error range.

As noted from FIG. 13, which illustrates an amount of positional deviation of the laser beam which is created by temperature change, the laser beam expands and accordingly the image is enlarged in the main scanning direction as the temperature rises. As noted from FIG. 14, which illustrates a relationship between time difference between sensors and temperature change, the time difference is small as the temperature rises. Since a magnification changing amount corresponding to the difference between the time difference T and reference time difference T0 can be recognized from relationship between the positional deviation amount and the time difference, correction performance may be improved if both of increase and decrease bands of the write clock frequency are predetermined therefrom. Since it only slightly changes depending on a lens or an image forming apparatus, a representative relationship may typically be measured beforehand.

Further, when decreasing the rotation number of the polygon motor, substantially the lowest rotation number may be preferable so that uneven rotation, jitter, etc. do not occur.

The thirteenth embodiment will now be described. Both of an image forming apparatus and an image write section having similar constructions to those of the eleventh embodiment described with reference to FIGS. 1 and 34, respectively, may be included in the thirteenth embodiment.

Figure 41:
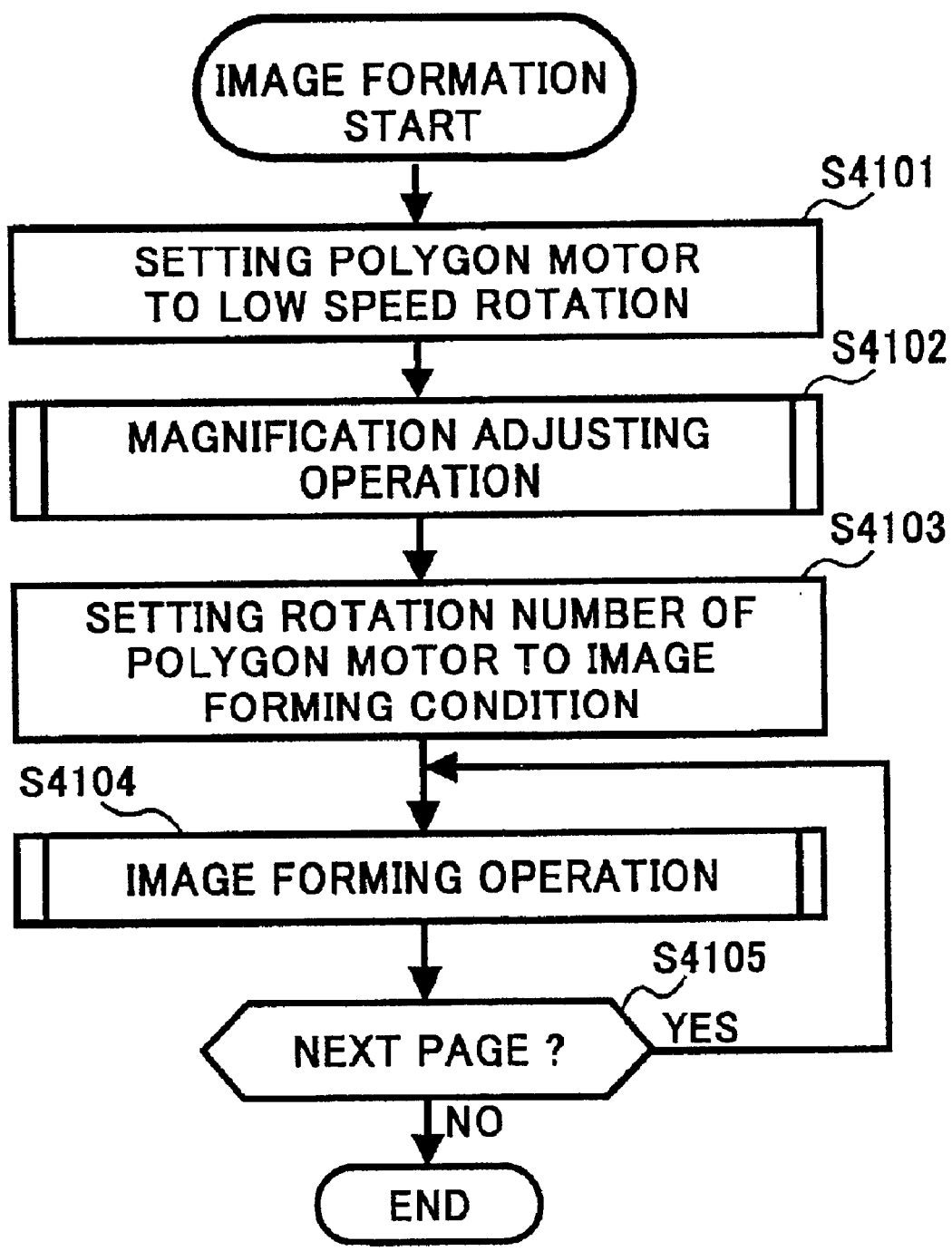
FIG. 41 is a flow diagram illustrating an operational procedure of image formation executed in the thirteenth embodiment.

FIG. 41 is a flow diagram illustrating an image formation procedure executed by the image forming apparatus of this embodiment. When image formation such as paper feeding is commenced, the polygon motor 101 may be rotated at a low speed (in step S4101). For example, if the polygon motor 101 can change the rotation number from 10,000 and 20,000 rpm, it may be rotated at the lowest rotation number of 10,000 rpm because the time difference T can be more precisely measured than when the polygon motor 101 rotates at the highest rotation number of 20,000 rpm. Thus, the flow may enter into and execute magnification correction in a similar manner to that of any one of the earlier described embodiments (in step S4102). After completing the magnification correction, the polygon motor 101 may be rotated at a prescribed rotation number, such as 20,000 rpm, to perform image formation (in step S4103). The flow may then enter into the image formation (in step S4104). If the next page of a document to be printed does not exist, the procedure may be terminated (in step S4105)

Since the polygon motor 101 is substantially rotated at a low speed and magnification error is corrected every time when image formation is started, image magnification may be kept substantially the same as from the first output of the image, even though change occurs in the environment (e.g. temperature change). Thus, high quality of an image may be obtained, while preventing color deviation.

The fourteenth embodiment will now be described. Both of an image forming apparatus and an image write section, similar to those of the first embodiment described with reference to FIGS. 1 and 2, may be included in the fourteenth embodiment.

Figure 42:
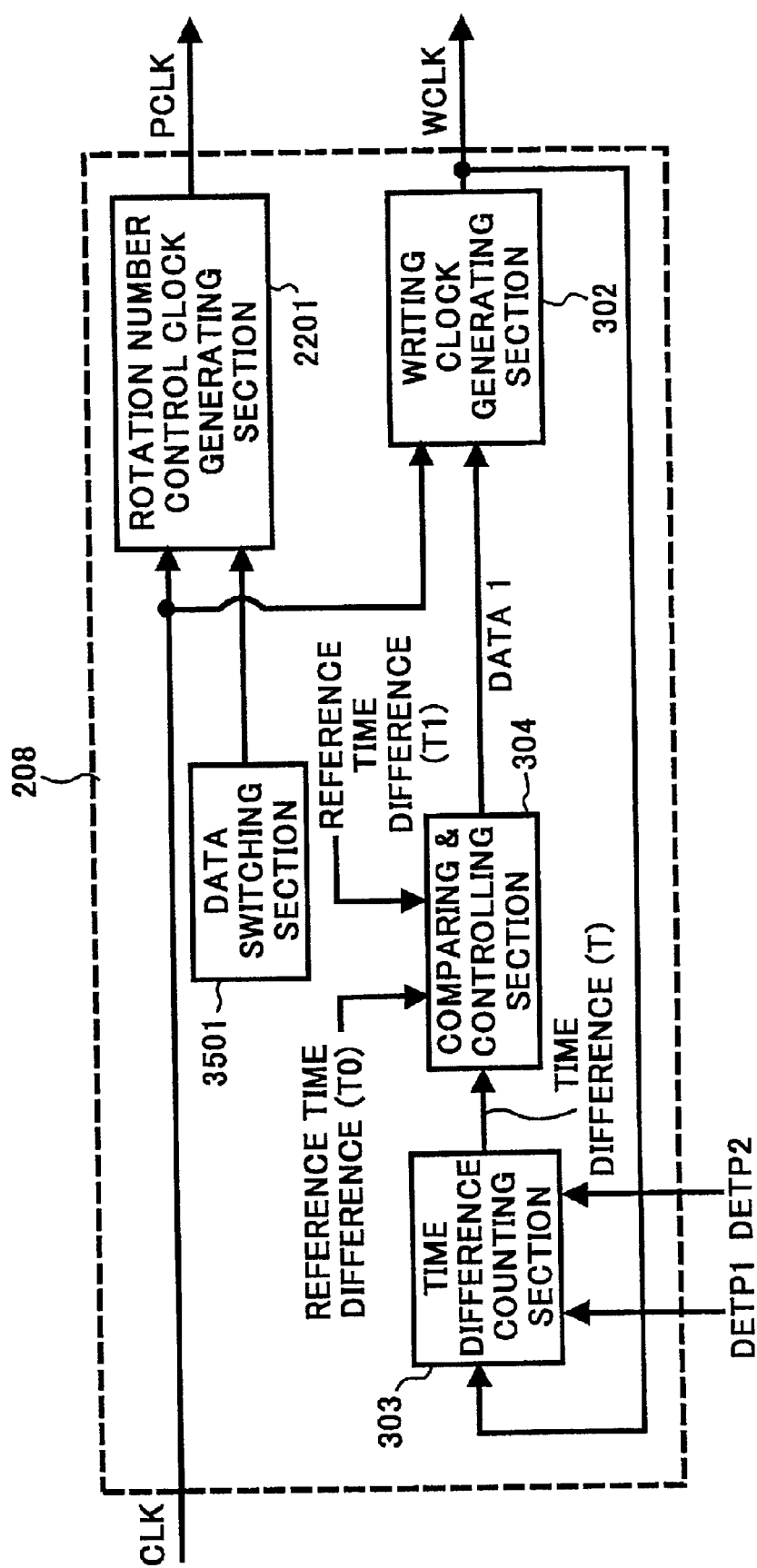
FIG. 42 is a block diagram illustrating a construction of a magnification correcting section of the fourteenth embodiment.

FIG. 42 is a block diagram illustrating a construction of the magnification correcting section 208 of this embodiment.

The magnification correcting section 208 may be different from that of the twelfth embodiment, in that the comparing and controlling section 304 compares a time difference T not only with the reference time difference T0, but also with a time difference T1. The time difference T1 may be a reference used when the time difference rotation number of the polygon motor 101 is decreased to a prescribed level to be precisely compared with the T. The other sections of this embodiment may be similar to those of the twelfth embodiment.

FIG. 43 is a flow diagram illustrating an operational procedure practiced by the magnification correcting section 208 in this embodiment. This flow diagram supposes a case wherein a plurality of prints are continuously performed.

A time difference T between sensors 201 and 202 may initially be counted (in step S4301). At this moment, since the image formation, for example, paper feed, image write, sheet ejection, etc., is in progress, the polygon motor 101, of course, is rotating at a prescribed rotation number for the image formation. Then, the time difference T may be compared with the reference time difference T0. If the time difference T is substantially equal to the reference time difference T0 (Yes, in step S4302), the image formation is continued as it is, and the above-described comparison may also be continued (in steps S4301–S4302). In this situation, the reference time difference T0 may be a reference of determining if magnification correction is required.

In step S4302, if time difference T is either smaller or larger than reference time difference T0 as a result of the determination, it is further determined if image write is in progress (in step S4303). This is because, when image write is in progress, the rotation number of the polygon motor 101 should be inhibited to change. If image write is not in progress, the apparatus is brought into an image formation-temporary stop condition (in step S4304), and the polygon motor is switched to rotate at low speed (in step S4305).

For example, if the polygon motor 101 can change its rotation number from 10,000 to 20,000 rpm, and currently rotates at the 20,000 rpm, it is rotated at around the rotation number of 10,000 rpm.

Then, a time difference T between sensors 201 and 202 may be counted (in step S4306), and is compared with the reference time difference T1 (in step S4307). In this comparison (No, in step S4308), if the time difference T is smaller than the reference time difference T1 (Yes, in step S4309), since an image is enlarged in the main scanning direction, the write clock frequency is increased (in step S4310).

To the contrary, if the time difference T is larger than the reference time difference T1 (No, in step S4309), since an image is reduced in the main scanning direction, the write clock frequency is decreased (in step S4311). Again, a time difference is counted (in step S4306), and is compared with the reference time difference T1, and the above-described flow may be repeated until the time difference T substantially equal to the reference time difference T1. When time difference T is nearly equal to the reference time difference T1 (Yes in step 4308), the rotation number of the polygon motor 101 may be returned to the level such as 20,000 rpm to be used for image formation (in step S4312). Simultaneously, the image formation temporary stop condition may be cleared and image formation may be started again (in step S4313).

When the above-described operations are practiced between sheet interval during continuous image formation and image write is not in progress, magnification error may be corrected by changing the number of rotations of the polygon motor. If the above-described operations cannot be practiced between sheet interval during continuous image formation and when the image formation is temporary stopped, sheet feed and sheet transportation may be stopped. Otherwise, the magnification correction can be performed between sheets by extending the sheet interval during the continuous image formation.

As described earlier, such frequency change control may be performed only when the comparison result is more than the allowable error range.

In addition, as also described earlier, magnification correction performance may be improved if the range of frequency increase and decrease may be predetermined from the relationship between the image positional deviation amount and the time difference illustrated in FIGS. 13 and 14. In addition, the slowest speed may be utilized so that uneven rotation and jitter does not occur, as described earlier.

The fifteenth embodiment will now be described. This embodiment may include an image forming apparatus having a similar construction to that described in the fourth embodiment illustrated in FIG. 10.

In this image forming apparatus, image magnification correction for each color in the main scanning direction may be performed in a similar manner to those described in any of the eleventh to fourteenth embodiments.

A pair of sensors for detecting a laser beam L may be provided for each color in one case. In another case, a pair of sensors may be provided in any one of the laser beam scanners, and only one sensor for detecting a synchronization signal may be provided in the remaining laser beam scanners. In still another case, a pair of sensors may be provided in any two of the laser beam scanners, and only one sensor for detecting a synchronization signal may be provided in the remaining laser beam scanners. Specifically, when a difference in temperature between laser beam scanners, in particular, fθ lenses 103, is relatively small, a pair of sensors can be provided in any one of the laser beam scanners 1, and magnification of each laser beam scanner can be corrected based on a time difference measured in the one laser beam scanner provided. If a difference in temperature between laser beam scanners (e.g., fθ lenses 103) neighboring each other is relatively small, a pair of sensors may be provided in a plurality of laser beam scanners 1 not neighboring each other, and magnification error of the laser beam scanner neighboring each other may be corrected based on a time difference measured in the plurality of laser beam scanners.

The sixteenth embodiment will now be described. This embodiment may include both of an image forming apparatus and a writing apparatus having substantially the same constructions as those of the fifth embodiment illustrated in FIGS. 11 and 12. In addition, a positional deviation amount of the laser beam appearing due to temperature change and a change in time difference between sensors may be substantially the same as those illustrated in FIGS. 13 and 14.

Namely, if temperature rises from (a) as a reference as illustrated in FIG. 13 to (b), a beam position does not substantially change in the vicinity of the center of the fθ lens. However, the beam may deviate outwardly in the main scanning direction the nearer it is to both ends of the fθ lens. As described earlier, FIG. 13 illustrates only one half of the lens, and substantially the same effect occurs in other half oppositely positioned with respect to the center of the main scanning direction. Thus, when compared with the condition where the temperature is (a), an image may be enlarged two times of a deviation amount (Z) at both end portions of the image when the temperature is (b). In addition, a difference Y may be created which is enlarged between the vicinity of the sensor and that of the image end as a positional shifting amount that is also corrected in the main scanning direction.

Thus, due to rise of temperature from (a) to (b), the M and Y images may deviate in the main scanning direction by (Y×2)+(Z×2) in relation to the BK and C images which are oppositely scanned mono color images. The positional deviation in the main scanning direction may be corrected by a certain amount during the magnification correction.

However, such a deviation of the Y cannot be perfectly corrected, and remains, if simply changing the above-described frequencies. Thus, such a remaining amount of deviation may be corrected by adjusting a write start position in the main scanning direction in a prescribed manner along with the magnification correction.

The image magnification correction in the main scanning direction for each color may be performed in a similar manner to that described in any of the twelfth to fourteenth embodiments.

However, the fourteenth embodiment can not change the rotation number of the polygon motor 10 before all mono-color processes have been completed. Then, this embodiment may stop new sheet feed when the time difference T becomes either smaller or larger than reference time difference T1 in any one of mono-color processes, and the rotation number of the polygon 101 may be changed after all of mono-color processes have been completed and the image formation is temporarily stopped.

In this embodiment, a time difference between a pair of sensors may be counted for each mono-color process, and magnification error is corrected based on the counted time difference. Otherwise, if laser beam scannings are performed in the same direction for prescribed two color processes, a time difference may be counted in any one of mono-color processes, and magnification errors for two colors may be corrected based on the counted amount. Other wise, one set of sensors may count a time difference in any one of mono-color processes, and each color magnification error may be corrected based on the counted amount. In particular, if there exists only a slight difference in temperature in the scanning apparatus (i.e., between fθ lenses), and laser beam scanning may be performed in the same direction for a prescribed plurality of mono-color processes, a time difference may be counted in any one of mono-color processes, and magnification errors for two mono-color processes may be corrected based on the counted data. Otherwise, a time difference may be counted in any one of mono-color processes, and magnification error for each color may be corrected based on the counted data.

In the above-described applicable embodiments, whenever magnification error in the main scanning direction is (r), the magnification error in the sub-scanning direction may correspondingly be corrected in order to form a precise magnification image, for example, by changing a rotation speed of the PC drum.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image forming apparatus comprising:

a light beam generating device configured to generate a light beam;

a light beam modulating device configured to modulate the light beam in accordance with an image signal at a prescribed write clock frequency;

a light beam deflecting device configured to rotate by a prescribed rotation number and deflect the light beam so as to scan an image carrier in a main scanning direction;

a pair of light beam detecting devices configured to detect the light beam, said pair of light beam detecting devices being separately positioned in the main scanning direction;

a time difference determining device configured to determine a time period elapsing from when the light beam is detected by a first of said pair of light beam detecting devices to when the light beam is detected by a second of said pair of light beam detecting devices, said time difference determining device generating a time difference signal at an optional timing of image formation;

a comparing device configured to compare the time difference signal with a reference time difference signal representing preferable magnification so as to recognize magnification error of the light beam in the main scanning direction;

a magnification correcting device configured to correct the magnification error by changing the prescribed write clock frequency and the prescribed rotation number to prescribed levels based on a result of a comparison between the time difference signal and the reference time difference signal by said comparing device; and a visualizing device configured to visualize an image formed on the image carrier after the magnification error is corrected, wherein said time difference determining device determines a time difference by counting clock pulses after lowering a light beam deflection speed of said light beam deflecting device to a prescribed speed.

2. The image forming apparatus according to claim 1, wherein both of the prescribed write clock frequencies and a prescribed pulse clock frequency are changed to prescribed levels, the prescribed levels being obtained from a magnification correction table.

3. The image forming apparatus according to claim 2, wherein each of the prescribed levels corresponds to an amount of time difference.

4. The image forming apparatus according to claim 1, wherein said magnification correcting device changes the prescribed rotation number of said light beam deflecting device if the magnification errors cannot completely be corrected only by changing the prescribed write clock frequency.

5. The image forming apparatus according to claim 4, wherein the prescribed rotation number is changed when said magnification correcting device executes correction of the magnification errors and a prescribed amount of the magnification errors remain.

6. The image forming apparatus according to claim 4, wherein the prescribed rotation number is not changed if the prescribed amount of the magnification errors remaining cannot be corrected by changing the prescribed rotation number.

7. The image forming apparatus according to claim 1, wherein said magnification correcting device changes the prescribed write clock frequency and the prescribed rotation number after initializing a current rotation number of said light beam deflecting device and wherein a new time difference signal is generated and compared with the reference time difference signal.

8. The image forming apparatus according to claim 7, wherein after initializing the current rotation number, the current rotation number returns to the prescribed level of the prescribed rotation number such that the magnification errors substantially do not occur.

9. The image forming apparatus according to claim 1, wherein the prescribed speed of the light beam deflection speed is increased to the prior level after the magnification errors, recognized when the light beam deflection speed is lowered, has been corrected.

10. The image forming apparatus according to claim 1, wherein said light beam deflecting device includes a polygon mirror.

11. The image forming apparatus according to claim 1, wherein the light beam deflection speed is lowered only when the time difference is to be detected during image formation.

12. The image forming apparatus according to claim 11, wherein the light beam deflection speed is returned to a level used for image formation after the magnification error has been corrected.

13. An image forming apparatus for forming a color image by superimposing different mono color images, said image forming apparatus comprising:

a plurality of light beam generating devices configured to generate a plurality of light beams;

a plurality of light beam modulating devices configured to modulate the plurality of light beams in accordance with an applicable mono color image signal at prescribed write clock frequencies;

at least one light beam deflecting device configured to rotate by a prescribed rotation number and deflect the plurality of light beams so as to scan an image carrier in a main scanning direction;

at least one pair of light beam detecting devices configured to detect the plurality of light beams, said at least one pair of light beam detecting devices being separately positioned in the main scanning direction;

a time difference determining device configured to determine a time period elapsing from when the light beam is detected by a first of said at least one pair of light beam detecting devices to when the light beam is detected by a second of said at least one pair of light beam detecting devices, said time difference determining device generating a time difference signal at an optional timing during image formation;

a comparing device configured to compare the time difference signal with a reference time difference signal representing preferable magnification so as to recognize magnification errors of the light beams in the main scanning direction;

a magnification correcting device configured to correct the magnification errors by changing both of the prescribed write clock frequencies of the plurality of light beams and the prescribed rotation number to prescribed levels based on a result of comparison between the time difference signal and the reference time difference signal by the comparing device; and a visualizing device configured to visualize and superimpose different mono color images formed on the image carrier after the magnification errors are corrected, wherein said time difference determining device determines a time difference by counting clock pulses after lowering a light beam deflection speed of said at least one light beam deflecting device to a prescribed speed.

14. The image forming apparatus according to claim 1 or claim 13, wherein said magnification correcting device continuously corrects the magnification errors until a time difference indicated by the time difference signal substantially accords with the reference time difference indicated by the reference time difference signal.

15. The image forming apparatus according to claim 1 or claim 13, wherein the prescribed rotation number is determined by a prescribed pulse clock frequency.

16. The image forming apparatus according to claim 15, wherein both of the prescribed write clock frequencies and the prescribed pulse clock frequency are changed to prescribed levels, the prescribed levels being obtained from a magnification correction table.

17. The image forming apparatus according to claim 16, wherein each of the prescribed levels corresponds to an amount of time difference.

18. The image forming apparatus according to claim 13, wherein said at least one light beam deflecting device and said at least one pair of light beam detecting devices are provided in each of mono color image forming sections so as to correct said magnification error in each of mono color image forming sections.

19. The image forming apparatus according to claim 13, wherein said at least one light beam deflecting device and said at least one pair of light beam detecting devices are provided in any one of mono color image forming sections so as to correct all of the magnification errors occurring in each of the mono color image forming sections based on a time difference determined from signals of said at least one pair of light beam detecting devices.

20. The image forming apparatus according to claim 13, wherein said magnification correcting device changes the prescribed rotation number of said at least one light beam deflecting device if the magnification errors cannot completely be corrected only by changing the prescribed write clock frequencies.

21. The image forming apparatus according to claim 20, wherein the prescribed rotation number is changed when said magnification correcting device executes correction of the magnification errors and a prescribed amount of the magnification errors remain.

22. The image forming apparatus according to claim 20, wherein the prescribed rotation number is not changed if the prescribed amount of the magnification errors remaining cannot be corrected by changing the prescribed rotation number.

23. The image forming apparatus according to claim 13, wherein said magnification correcting device changes the prescribed write clock frequency and the prescribed rotation number after initializing a current rotation number of said at least one light beam deflecting device and wherein a new time difference signal is generated and compared with the reference time difference signal.

24. The image forming apparatus according to claim 23, wherein after initializing the current rotation number, the current rotation number returns to the prescribed level of the prescribed rotation number such that the magnification errors substantially do not occur.

25. The image forming apparatus according to claim 15 or claim 13, further comprising an image write start position adjusting device configured to adjust an image write start position of the light beam in the main scanning direction on the image carrier in accordance with the time difference signal.

26. The image forming apparatus according to claim 13, wherein the prescribed speed of the light beam deflection speed is increased to the prior level after the magnification errors, recognized when the light beam deflection speed is lowered, has been corrected.

27. The image forming apparatus according to claim 13, wherein said at least one light beam deflecting device includes a polygon mirror.

28. The image forming apparatus according to claim 13, wherein the light beam deflection speed is lowered only when the time difference is to be detected during image formation.

29. The image forming apparatus according to claim 28, wherein the light beam deflection speed is returned to a level used for image formation after the magnification error has been corrected.

30. An image forming apparatus comprising:
a light beam generating device configured to generate a light beam;
a light beam modulating device configured to modulate the light beam in accordance with an image signal at a prescribed write clock frequency;
a light beam deflecting device configured to rotate by a prescribed rotation number and deflect the light beam so as to scan an image carrier in a main scanning direction;
an optical unit configured to include an fθ lens configured to convert the light beam from substantially a uniform angular speed to substantially a uniform speed;
a temperature detecting device formed in said optical unit and configured to detect temperature of said optical unit;
a magnification correcting device configured to correct magnification error of the light beam in the main scanning direction by changing the prescribed write clock frequency and the prescribed rotation number to prescribed levels in accordance with the temperature detected by said temperature detecting device; and
a visualizing device configured to visualize an image formed on the image carrier, wherein the temperature of said optical unit is a temperature of said fθ lens.

31. The image forming apparatus according to claim 30, wherein said prescribed levels of the prescribed write clock frequency and a clock frequency for the prescribed rotation number are stored in a prescribed reference table corresponding to the temperature.

32. An image forming apparatus for forming a color image by superimposing different mono color images, said image forming apparatus comprising:
a plurality of light beam generating devices configured to generate a plurality of light beams;
a plurality of light beam modulating devices configured to modulate the plurality of light beams, respectively, in accordance with an applicable mono color image signal at a plurality of prescribed write clock frequencies;
at least one light beam deflecting device configured to rotate by a prescribed rotation number and deflect the plurality of light beams so as to scan an image carrier in a main scanning direction;
at least one optical unit configured to include an fθ lens configured to convert the plurality of light beams from substantially the uniform angular speed to substantially the uniform speed;
at least one temperature detecting device configured to detect temperature of the optical unit;
a magnification correcting device configured to correct the magnification errors in the main scanning direction by changing the plurality of write clock frequencies of the plurality of laser beams and the prescribed rotation number of said at least one light beam deflecting device to prescribed levels in accordance with the temperature of said at least one optical unit; and
a visualizing device configured to visualize and superimpose different mono color images formed on the image carrier after the magnification errors are corrected,
wherein the prescribed rotation number is changed to a substantially smallest level as color deviation does not occur in a sub-scanning direction.

33. The image forming apparatus according to claim 32, wherein the temperature of said at least one optical unit is a temperature of said fθ lens.

34. The image forming apparatus according to claim 32, wherein said at least one temperature detecting device is a plurality of temperature detecting devices which are employed so as to detect a temperature of said fθ lens such that outputs of said plurality of temperature detecting devices are averaged as temperature data.

35. An image forming apparatus comprising:
- a light beam generating device configured to generate a light beam;
- a light beam modulating device configured to modulate the light beam in accordance with an image signal at a prescribed write clock frequency;
- a light beam deflecting device configured to rotate by a prescribed rotation number and deflect the light beam so as to scan an image carrier in a main scanning direction;
- a pair of light beam detecting devices configured to detect the light beam, said pair of light beam detecting devices being separately positioned in the main scanning direction;
- a time difference determining device configured to determine a time period elapsing from when the light beam is detected by a first of said pair of light beam detecting devices to when the light beam is detected by a second of said pair of light beam detecting devices, said time difference determining device generating a time difference signal at an optional timing of image formation;
- a comparing device configured to compare the time difference signal with a reference time difference signal representing preferable magnification so as to recognize magnification error of the light beam in the main scanning direction;
- a magnification correcting device configured to correct the magnification error by changing the prescribed write clock frequency and the prescribed rotation number to prescribed levels based on a result of a comparison between the time difference signal and the reference time difference signal by said comparing device; and
- a visualizing device configured to visualize an image formed on the image carrier after the magnification error is corrected,
- wherein said light beam deflecting device starts rotating at a low speed when the image formation is commenced, and wherein the time difference is then detected.

36. The image forming apparatus according to claim 35, wherein the image formation includes sheet feeding.

37. The image forming apparatus according to claim 36, wherein the light beam deflection speed is increased by changing the clock pulses to a level used for the image formation after completion of the correction of the magnification errors.

38. An image forming apparatus for forming a color image by superimposing different mono color images, said image forming apparatus comprising:
- a plurality of light beam generating devices configured to generate a plurality of light beams;
- a plurality of light beam modulating devices configured to modulate the plurality of light beams in accordance with an applicable mono color image signal at prescribed write clock frequencies;
- at least one light beam deflecting device configured to rotate by a prescribed rotation number and deflect the plurality of light beams so as to scan an image carrier in a main scanning direction;
- at least one pair of light beam detecting devices configured to detect the plurality of light beams, said at least one pair of light beam detecting devices being separately positioned in the main scanning direction;
- a time difference determining device configured to determine a time period elapsing from when the light beam is detected by a first of said at least one pair of light beam detecting devices to when the light beam is detected by a second of said at least one pair of light beam detecting devices, said time difference determining device generating a time difference signal at an optional timing during image formation;
- a comparing device configured to compare the time difference signal with a reference time difference signal representing preferable magnification so as to recognize magnification errors of the light beams in the main scanning direction;
- a magnification correcting device configured to correct the magnification errors by changing both of the prescribed write clock frequencies of the plurality of light beams and the prescribed rotation number to prescribed levels based on a result of comparison between the time difference signal and the reference time difference signal by the comparing device; and
- a visualizing device configured to visualize and superimpose different mono color images formed on the image carrier after the magnification errors are corrected,
- wherein said at least one light beam deflecting device starts rotating at a low speed when the image formation is commenced, and wherein the time difference is then detected.

39. The image forming apparatus according to claim 38, wherein the image formation includes sheet feeding.

40. The image forming apparatus according to claim 39, wherein said light beam deflection speed is increased by changing the clock pulses to a level used for image formation after completion of the correction of the magnification errors.

41. An image forming apparatus comprising:
- a light beam generating device configured to generate a light beam;
- a light beam modulating device configured to modulate the light beam in accordance with an image signal at a prescribed write clock frequency;
- a light beam deflecting device configured to rotate by a prescribed rotation number and deflect the light beam so as to scan an image carrier in a main scanning direction;
- a pair of light beam detecting devices configured to detect the light beam, said pair of light beam detecting devices being separately positioned in the main scanning direction;
- a time difference determining device configured to determine a time period elapsing from when the light beam is detected by a first of said pair of light beam detecting devices to when the light beam is detected by a second of said pair of light beam detecting devices, said time difference determining device generating a time difference signal at an optional timing of image formation;
- a comparing device configured to compare the time difference signal with a reference time difference signal representing preferable magnification so as to recognize magnification error of the light beam in the main scanning direction;
- a magnification correcting device configured to correct the magnification error by changing the prescribed write clock frequency and the prescribed rotation number to prescribed levels based on a result of a comparison between the time difference signal and the reference time difference signal by said comparing device; and a visualizing device configured to visualize an image formed on the image carrier after the magnification error is corrected, wherein a time difference is determined without lowering a light beam deflection speed if the image formation is in progress, and the time difference is compared with a first reference time difference so that only existence of the magnification errors can be recognized, and wherein the light beam deflection speed is lowered when said magnification error can be recognized, wherein a new time difference is determined and compared with a second reference time difference, and wherein the magnification errors recognized from comparison between the new time difference and the second time difference is corrected.

42. An image forming apparatus comprising:

a light beam generating device configured to generate a light beam;

a light beam modulating device configured to modulate the light beam in accordance with the image signal at a prescribed write clock frequency;

a light beam deflecting device configured to rotate by a prescribed rotation number and deflect the light beam so as to scan an image carrier in a main scanning direction;

a pair of light beam detecting devices configured to detect the light beam, said pair of light beam detecting devices being separately positioned in the main scanning direction;

a time difference determining device configured to determine a time period elapsing from when the light beam is detected by a first of said pair of light beam detecting devices to when the light beam is detected by a second of said pair of light beam detecting devices, said time difference determining device generating a time difference signal at an optional timing of image formation;

a comparing device configured to compare the time difference signal with a reference time difference signal representing preferable magnification so as to recognize magnification error of the light beam in the main scanning direction;

a magnification correcting device configured to correct the magnification error by changing the prescribed write clock frequency and the prescribed rotation number to prescribed levels based on a result of a comparison between the time difference signal and the reference time difference signal by said comparing device; and a visualizing device configured to visualize an image formed on the image carrier after the magnification error is corrected, wherein the magnification errors are corrected at a prescribed timing corresponding to an interval of sheets fed to the image carrier.

43. The image forming apparatus according to claim 42, wherein the interval of sheets fed is expanded to a prescribed interval if the interval of sheets fed is insufficient to correct the magnification errors.

44. An image forming apparatus comprising:

a light beam generating device configured to generate a light beam;

a light beam modulating device configured to modulate the light beam in accordance with an image signal at a prescribed write clock frequency;

a light beam deflecting device configured to rotate by a prescribed rotation number and deflect the light beam so as to scan an image carrier in a main scanning direction;

a pair of light beam detecting devices configured to detect the light beam, said pair of light beam detecting devices being separately positioned in the main scanning direction;

a time difference determining device configured to determine a time period elapsing from when the light beam is detected by a first of said pair of light beam detecting devices to when the light beam is detected by a second of said pair of light beam detecting devices, said time difference determining device generating a time difference signal at an optional timing of image formation;

a comparing device configured to compare the time difference signal with a reference time difference signal representing preferable magnification so as to recognize magnification error of the light beam in the main scanning direction;

a magnification correcting device configured to correct the magnification error by changing the prescribed write clock frequency and the prescribed rotation number to prescribed levels based on a result of a comparison between the time difference signal and the reference time difference signal by said comparing device; and a visualizing device configured to visualize an image formed on the image carrier after the magnification error is corrected, wherein new sheet feed is stopped when a time difference is substantially different from a reference time difference, and wherein the magnification errors are then corrected.

45. An image forming apparatus, comprising:

light beam generating means for generating a light beam;

light beam modulating means for modulating the light beam in accordance with an image signal at a prescribed write clock frequency;

light beam deflecting means for deflecting the light beam for scanning an image carrier in a main scanning direction, said light beam deflecting means rotating by a prescribed rotation number;

a pair of light beam detecting means for detecting the light beam, said pair of light beam detecting means being separately positioned in the main scanning direction;

time difference determining means for determining a time period elapsing from when the light beam is detected by a first of said pair of light beam detecting means to when the light beam is detected by a second of said pair of light beam detecting means, said time difference determining means generating a time difference signal at an optional timing of image formation;

comparing means for comparing the time difference signal with a reference time difference signal and recognizing magnification errors of the light beam in the main scanning direction, said reference time difference signal representing preferable magnification in the main scanning direction;

magnification correcting means for correcting the magnification errors by changing the prescribed write clock frequency and the prescribed rotation number to prescribed levels based on a result of a comparison between the time difference signal and the reference time difference signal by said comparing means; and visualizing means for visualizing an image formed on the image carrier after the magnification errors are corrected, wherein said time difference determining means determines a time difference by counting clock pulses after lowering a light beam deflection speed of said light beam deflecting means to a prescribed speed.

46. An image forming apparatus for forming a color image by superimposing a plurality of different mono color images, said image forming apparatus comprising:

light beam generating means for generating a plurality of light beams;

light beam modulating means for modulating the plurality of light beams in accordance with an applicable mono color image signal at prescribed write clock frequencies;

light beam deflecting means for deflecting the plurality of light beams for scanning an image carrier in a main scanning direction, said light beam deflecting means rotating by a prescribed rotation number;

a pair of light beam detecting means for detecting the plurality of light beams, said pair of light beam detecting means being separately positioned in the main scanning direction;

time difference determining means for determining a time period elapsing from when the plurality of light beams are detected by a first of said pair of light beam detecting means to when the plurality of light beams are detected by a second of said pair of light beam detecting means, said time difference determining means generating a time difference signal at an optional timing during image formation;

comparing means for comparing the time difference signal with a reference time difference signal representing preferable magnification for recognizing magnification errors of the plurality of light beams in the main scanning direction;

magnification correcting means for correcting the magnification errors by changing both of the prescribed write clock frequencies of the plurality of light beams and the prescribed rotation number to prescribed levels based on a result of comparison between the time difference signal and the reference time difference signal by said comparing means; and visualizing means for visualizing and superimposing a plurality of different mono color images formed on the image carrier after the magnification errors are corrected, wherein said time difference determining means determines a time difference by counting clock pulses after lowering a light beam deflection speed of said one light beam deflecting means to a prescribed speed.

47. An image forming apparatus, comprising:

light beam generating means for generating a light beam;

light beam modulating means for modulating the light beam in accordance with an image signal at a prescribed write clock frequency;

light beam deflecting means for deflecting the light beam for scanning an image carrier in a main scanning direction, said light beam deflecting means rotating by a prescribed rotation number;

optical means for converting the light beam from substantially a uniform angular speed to substantially a uniform speed, said optical means including an fθ lens;

temperature detecting means, formed in said optical means, for detecting temperature of said optical means;

magnification correcting means for correcting magnification error of the light beam in the main scanning direction by charging the prescribed write clock frequency and the prescribed rotation number to prescribed levels in accordance with the temperature detected by said temperature detecting means; and visualizing means for visualizing an image formed on the image carrier, wherein the temperature of said optical means is a temperature of said fθ lens.

48. An image forming apparatus for forming a color image by superimposing different mono color images, said image forming apparatus comprising:

light beam generating means for generating a plurality of light beams;

light beam modulating means for modulating the plurality of light beams in accordance with an applicable mono color image signal at a plurality of prescribed write clock frequencies;

light beam deflecting means for deflecting the plurality of light beams for scanning an image carrier in a main scanning direction, said light beam deflecting means rotating by a prescribed rotation number;

optical means for converting the plurality of light beams from substantially a uniform angular speed to substantially a uniform speed, said optical means including an fθ lens;

temperature detecting means for detecting temperature of said optical means;

image magnification correcting means for correcting magnification errors in the main scanning direction by changing the plurality of write clock frequencies of the plurality of laser beams and the prescribed rotation number of said light beam deflecting means to prescribed levels in accordance with the temperature of said optical means; and visualizing means for visualizing and superimposing different mono color images formed on the image carrier after the magnification errors are corrected, wherein the prescribed rotation number is changed to a substantially smallest level as color deviation does not occur in a sub-scanning direction.

49. A method for forming an image, said method comprising the steps of:

generating a light beam;

modulating the light beam in accordance with an image signal at a prescribed write clock frequency;

deflecting the light beam by rotating a light beam deflecting device by a prescribed rotation number so as to scan an image carrier in a main scanning direction;

detecting the light beam at separate positions in the main scanning direction;

determining a time period elapsing from when the light beam is detected at a first of the separate positions to when the light beam is detected by a second of the separate positions;

generating a time difference signal at an optional timing of image formation;

comparing the time difference signal with a reference time difference signal representing preferable magnification;

recognizing magnification errors of the light beam in the main scanning direction based on a result of said comparing;

correcting the magnification errors by changing the prescribed write clock frequency and the prescribed rotation number to prescribed levels; and visualizing an image formed on the image carrier after the magnification errors is corrected, wherein said light beam deflecting device starts rotating at a low speed when the image formation is then commenced, and wherein a time difference is then detected.

50. The method according to claim 49, wherein said correcting the magnification errors includes changing the prescribed rotation number of said light beam deflecting device if the magnification errors cannot completely be corrected only by changing the prescribed write clock frequency.

51. The method according to claim 49, wherein said correcting the magnification errors includes changing the prescribed write clock frequency and the prescribed rotation number after initializing a current rotation number of said light beam deflecting device, and generating and comparing a new time difference signal with the reference time difference signal.

52. The method according to claim 51, wherein said initializing returns the prescribed rotation number to a prescribed level wherein the magnification errors substantially do not occur.

53. The method according to claim 49, wherein said correcting the magnification errors includes adjusting an image write start position of the light beam in the main scanning direction on the image carrier in accordance with the time difference signal.

54. A method for forming a color image by superimposing a plurality of different mono color images, said method comprising the steps of:
   generating a plurality of light beams;
   modulating the plurality of light beams in accordance with an applicable mono color image signal at a plurality of prescribed write clock frequencies;
   deflecting the plurality of light beams by rotating a light beam deflecting device by a prescribed rotation number so as to scan an image carrier in a main scanning direction;
   detecting the plurality of light beams at separate positions in the main scanning direction;
   determining a time period elapsing from when the plurality of light beams are detected at a first of the separate positions to when the plurality of light beams are detected at a second of the separate positions;
   generating a time difference signal at an optional timing during image formation;
   comparing the time difference signal with a reference time difference signal representing preferable magnification;
   recognizing magnification errors of the plurality of light beams in the main scanning direction based on a result of said comparing;
   correcting the magnification errors by changing both of the plurality of prescribed write clock frequencies of the plurality of light beams and the prescribed rotation number to prescribed levels; and
   visualizing and superimposing different mono color images formed on the image carrier after said correcting the magnification errors is executed,
   wherein said light beam deflecting device starts rotating at a low speed when the image formation is commenced, and wherein a time difference is then detected.

55. The method according to claim 54, wherein said correcting the magnification errors includes changing the prescribed rotation number of said light beam deflecting device if the magnification errors cannot completely be corrected only by changing the plurality of prescribed write clock frequencies.

56. The method according to claim 54, wherein said correcting the magnification errors includes changing the plurality of write clock frequencies and the prescribed rotation number after initializing a current rotation number of said light beam deflecting device, and generating and comparing a new time difference signal with the reference time difference signal.

57. The method according to claim 56, wherein said initializing returns the prescribed rotation number to a prescribed level wherein the magnification errors substantially do not occur.

58. The method according to claim 54, wherein said correcting the magnification errors includes adjusting an image write start position of the plurality of light beams in the main scanning direction on the image carrier in accordance with the time difference signal.

59. A method for forming an image, said method comprising the steps of:
   generating a light beam;
   modulating the light beam in accordance with an image signal at a prescribed write clock frequency;
   deflecting the light beam by rotating a light beam deflecting device by a prescribed rotation number so as to scan an image carrier in a main scanning direction;
   converting the light beam using an f$\theta$ lens from substantially a uniform angular speed to substantially a uniform speed;
   detecting temperature of said f$\theta$ lens with a temperature sensor formed in said f$\theta$ lens;
   correcting magnification errors of the light beam in the main scanning direction by changing the prescribed write clock frequency and the prescribed rotation number to prescribed levels in accordance with the temperature detected in said detecting temperature of said f$\theta$ lens; and
   visualizing an image formed on the image carrier.

60. A method for forming a color image by superimposing different mono color images, said method comprising the steps of:
   generating a plurality of light beams;
   modulating the plurality of light beams in accordance with an applicable mono color image signal at a plurality of prescribed write clock frequencies;
   deflecting the plurality of light beams by rotating a light beam deflecting device by a prescribed rotation number so as to scan an image carrier in a main scanning direction;
   converting the plurality of light beams using an f$\theta$ lens from substantially a uniform angular speed to substantially a uniform speed;
   detecting temperature of said f$\theta$ lens;
   correcting the magnification errors in the main scanning direction by changing a plurality of write clock frequencies of the plurality of laser beams and the prescribed rotation number of said light beam deflecting device to prescribed levels in accordance with the temperature detected in said detecting temperature of said f$\theta$ lens; and
   visualizing and superimposing different mono color images formed on the image carrier after the magnification errors are corrected,
   wherein the prescribed rotation number is lowered to substantially a smallest level as color deviation does not occur in a sub-scanning direction.

61. The method according to claim 60, wherein the substantially smallest level is increased to a prior level after the magnification errors, recognized when a light beam deflection speed is lowered, has been corrected.

62. The method according to claim 61, wherein the light beam deflection speed is lowered only when a time difference is to be detected during the image formation.

63. The method according to claim 61, wherein the light beam deflection speed is returned to a level used in image formation after said correcting of the magnification errors has been completed.

64. The method according to claim 61, wherein the light beam deflection speed is increased by changing clock pulses to a level used in the image formation after said correcting of the magnification errors has been completed.

65. A method for forming an image, said method comprising the steps of:

generating a light beam;

modulating the light beam in accordance with an image signal at a prescribed write clock frequency;

deflecting the light beam by rotating a light beam deflecting device by a prescribed rotation number so as to scan an image carrier in a main scanning direction;

detecting the light beam at separate positions in the main scanning direction;

determining a time period elapsing from when the light beam is detected at a first of the separate positions to when the light beam is detected by a second of the separate positions;

generating a time difference signal at an optional timing of image formation;

comparing the time difference signal with a reference time difference signal representing preferable magnification;

recognizing magnification errors of the light beam in the main scanning direction based on a result of said comparing;

correcting the magnification errors by changing the prescribed write clock frequency and the prescribed rotation number to prescribed levels; and visualizing an image formed on the image carrier after the magnification errors is corrected, wherein a time difference is determined without lowering the light beam deflection speed if the image formation is in progress, and wherein a time difference is compared with a first reference time difference so that only existence of the magnification errors can be recognized, and wherein the light beam deflection speed is lowered when the magnification errors can be recognized, wherein a new time difference is determined and compared with a second reference time difference, and wherein the magnification errors, recognized from comparison between the new time difference and the second reference time difference, is corrected.

66. A method for forming an image, said method comprising the steps of:

generating a light beam;

modulating the light beam in accordance with an image signal at a prescribed write clock frequency;

deflecting the light beam by rotating a light beam deflecting device by a prescribed rotation number so as to scan an image carrier in a main scanning direction;

detecting the light beam at separate positions in the main scanning direction;

determining a time period elapsing from when the light beam is detected at a first of the separate positions to when the light beam is detected by a second of the separate positions;

generating a time difference signal at an optional timing of image formation;

comparing the time difference signal with a reference time difference signal representing preferable magnification;

recognizing magnification errors of the light beam in the main scanning direction based on a result of said comparing;

correcting the magnification errors by changing the prescribed write clock frequency and the prescribed rotation number to prescribed levels; and visualizing an image formed on the image carrier after the magnification errors is corrected, wherein new sheet feed is stopped when a time difference is substantially different from a reference time difference, and wherein the magnification errors are then corrected.

67. An image forming apparatus for forming a color image by superimposing different mono color images, said image forming apparatus comprising:

a plurality of light beam generating devices configured to generate a plurality of light beams;

a plurality of light beam modulating devices configured to modulate the plurality of light beams in accordance with an applicable mono color image signal at prescribed write clock frequencies;

at least one light beam deflecting device configured to rotate by a prescribed rotation number and deflect the plurality of light beams so as to scan an image carrier in a main scanning direction;

at least one pair of light beam detecting devices configured to detect the plurality of light beams, said at least one pair of light beam detecting devices being separately positioned in the main scanning direction;

a time difference determining device configured to determine a time period elapsing from when the light beam is detected by a first of said at least one pair of light beam detecting devices to when the light beam is detected by a second of said at least one pair of light beam detecting devices, said time difference determining device generating a time difference signal at an optional timing during image formation;

a comparing device configured to compare the time difference signal with a reference time difference signal representing preferable magnification so as to recognize magnification errors of the light beams in the main scanning direction;

a magnification correcting device configured to correct the magnification errors by changing both of the prescribed write clock frequencies of the plurality of light beams and the prescribed rotation number to prescribed levels based on a result of comparison between the time difference signal and the reference time difference signal by the comparing device; and a visualizing device configured to visualize and superimpose different mono color images formed on the image carrier after the magnification errors are corrected, wherein a time difference is determined without lowering a light beam deflection speed if the image formation is in progress, and the time difference is compared with a first reference time difference so that only existence of the magnification errors can be recognized, and wherein the light beam deflection speed is lowered when said magnification error can be recognized, wherein a new time difference is determined and compared with a second reference time difference, and wherein the magnification errors recognized from comparison between the new time difference and the second reference time difference is corrected.

68. An image forming apparatus for forming a color image by superimposing different mono color images, said image forming apparatus comprising:

a plurality of light beam generating devices configured to generate a plurality of light beams;

a plurality of light beam modulating devices configured to modulate the plurality of light beams in accordance with an applicable mono color image signal at prescribed write clock frequencies;

at least one light beam deflecting device configured to rotate by a prescribed rotation number and deflect the plurality of light beams so as to scan an image carrier in a main scanning direction;

at least one pair of light beam detecting devices configured to detect the plurality of light beams, said at least one pair of light beam detecting devices being separately positioned in the main scanning direction;

a time difference determining device configured to determine a time period elapsing from when the light beam is detected by a first of said at least one pair of light beam detecting devices to when the light beam is detected by a second of said at least one pair of light beam detecting devices, said time difference determining device generating a time difference signal at an optional timing during image formation;

a comparing device configured to compare the time difference signal with a reference time difference signal representing preferable magnification so as to recognize magnification errors of the light beams in the main scanning direction;

a magnification correcting device configured to correct the magnification errors by changing both of the prescribed write clock frequencies of the plurality of light beams and the prescribed rotation number to prescribed levels based on a result of comparison between the time difference signal and the reference time difference signal by the comparing device; and a visualizing device configured to visualize and superimpose different mono color images formed on the image carrier after the magnification errors are corrected, wherein new sheet feed is stopped when a time difference is substantially different from a reference time difference, and wherein the magnification errors are then corrected.

69. A method for forming a color image by superimposing a plurality of different mono color images, said method comprising the steps of:

generating a plurality of light beams;

modulating the plurality of light beams in accordance with an applicable mono color image signal at a plurality of prescribed write clock frequencies;

deflecting the plurality of light beams by rotating a light beam deflecting device by a prescribed rotation number so as to scan an image carrier in a main scanning direction;

detecting the plurality of light beams at separate positions in the main scanning direction;

determining a time period elapsing from when the plurality of light beams are detected at a first of the separate positions to when the plurality of light beams are detected at a second of the separate positions;

generating a time difference signal at an optional timing during image formation;

comparing the time difference signal with a reference time difference signal representing preferable magnification;

recognizing magnification errors of the plurality of light beams in the main scanning direction based on a result of said comparing;

correcting the magnification errors by changing both of the plurality of prescribed write clock frequencies of the plurality of light beams and the prescribed rotation number to prescribed levels; and visualizing and superimposing different mono color images formed on the image carrier after said correcting the magnification errors is executed, wherein a time difference is determined without lowering the light beam deflection speed if the image formation is in progress, and wherein a time difference is compared with a first reference time difference so that only existence of the magnification error can be recognized, and wherein the light beam deflection speed is lowered when the magnification errors can be recognized, wherein a new time difference is determined and compared with a second reference time difference, and wherein the magnification errors, recognized from comparison between the new time difference and the second reference time difference, is corrected.

70. A method for forming a color image by superimposing a plurality of different mono color images, said method comprising the steps of:

generating a plurality of light beams;

modulating the plurality of light beams in accordance with an applicable mono color image signal at a plurality of prescribed write clock frequencies;

deflecting the plurality of light beams by rotating a light beam deflecting device by a prescribed rotation number so as to scan an image carrier in a main scanning direction;

detecting the plurality of light beams at separate positions in the main scanning direction;

determining a time period elapsing from when the plurality of light beams are detected at a first of the separate positions to when the plurality of light beams are detected at a second of the separate positions;

generating a time difference signal at an optional timing during image formation;

comparing the time difference signal with a reference time difference signal representing preferable magnification;

recognizing magnification errors of the plurality of light beams in the main scanning direction based on a result of said comparing;

correcting the magnification errors by changing both of the plurality of prescribed write clock frequencies of the plurality of light beams and the prescribed rotation number to prescribed levels; and visualizing and superimposing different mono color images formed on the image carrier after said correcting the magnification errors is executed, wherein the magnification errors are corrected at a prescribed timing corresponding to an interval of sheets fed to the image carrier.

71. The method according to claim 70, wherein the interval of sheets fed to the image carrier is expanded to a prescribed interval if the interval of sheets fed to the image carrier is insufficient to correct the magnification errors.

72. A method for forming a color image by superimposing a plurality of different mono color images, said method comprising the steps of:

generating a plurality of light beams;

modulating the plurality of light beams in accordance with an applicable mono color image signal at a plurality of prescribed write clock frequencies;

deflecting the plurality of light beams by rotating a light beam deflecting device by a prescribed rotation number so as to scan an image carrier in a main scanning direction;

detecting the plurality of light beams at separate positions in the main scanning direction;

determining a time period elapsing from when the plurality of light beams are detected at a first of the separate positions to when the plurality of light beams are detected at a second of the separate positions;

generating a time difference signal at an optional timing during image formation;

comparing the time difference signal with a reference time difference signal representing preferable magnification;

recognizing magnification errors of the plurality of light beams in the main scanning direction based on a result of said comparing;

correcting the magnification errors by changing both of the plurality of prescribed write clock frequencies of the plurality of light beams and the prescribed rotation number to prescribed levels; and visualizing and superimposing different mono color images formed on the image carrier after said correcting the magnification errors is executed, wherein new sheet feed is stopped when a time difference is substantially different from a reference time difference, and wherein the magnification errors are then corrected.

* * * * *